US011764579B1

(12) United States Patent
Cooper

(10) Patent No.: US 11,764,579 B1
(45) Date of Patent: Sep. 19, 2023

(54) VEHICLE BATTERY POWER SOURCE LOAD CONTROL

(71) Applicant: J. Carl Cooper, Reno, NV (US)

(72) Inventor: J. Carl Cooper, Reno, NV (US)

(*) Notice: Subject to any disclaimer, the term of this patent is extended or adjusted under 35 U.S.C. 154(b) by 137 days.

(21) Appl. No.: 17/503,707

(22) Filed: Oct. 18, 2021

Related U.S. Application Data

(60) Division of application No. 16/444,280, filed on Jun. 18, 2019, now Pat. No. 11,183,843, which is a continuation-in-part of application No. 16/112,638, filed on Aug. 24, 2018, now Pat. No. 10,840,735, which is a continuation-in-part of application No. 13/481,804, filed on May 26, 2012, now Pat. No. 10,879,727.

(60) Provisional application No. 61/624,360, filed on Apr. 15, 2012, provisional application No. 61/598,564, filed on Feb. 14, 2012, provisional application No. 61/552,722, filed on Oct. 28, 2011, provisional application No. 61/490,253, filed on May 26, 2011.

(51) Int. Cl.
*H02J 3/14* (2006.01)
*H02J 3/38* (2006.01)
*H02J 3/32* (2006.01)
*H02J 9/06* (2006.01)

(52) U.S. Cl.
CPC ............. *H02J 3/14* (2013.01); *H02J 3/32* (2013.01); *H02J 3/322* (2020.01); *H02J 3/38* (2013.01); *H02J 9/06* (2013.01)

(58) Field of Classification Search
CPC .......... H02J 3/14–144; H02J 3/32–322; H02J 3/38–50; H02J 9/04–08; H02J 2310/50–66; B60L 55/00
See application file for complete search history.

(56) References Cited

U.S. PATENT DOCUMENTS

| | | |
|---|---|---|
| 4,888,495 A | 12/1989 | Feron et al. |
| 5,914,467 A | 6/1999 | Jonas et al. |
| 6,172,432 B1 | 1/2001 | Schnackenberg et al. |
| 6,181,028 B1 | 1/2001 | Kern et al. |
| 6,285,178 B1 | 9/2001 | Ball et al. |
| 6,313,632 B1 | 11/2001 | Kojovic et al. |
| 6,671,586 B2 | 12/2003 | Davis et al. |
| 6,686,547 B2 | 2/2004 | Kern et al. |
| 6,891,478 B2 | 5/2005 | Gardner |

(Continued)

OTHER PUBLICATIONS

S. Dinkhah, C. A. Negri, M. He and S. B. Bayne, "V2G for Reliable Microgrid Operations: Voltage/Frequency Regulation with Virtual Inertia Emulation," Jun. 19, 2019, 2019 IEEE Transportation Electrification Conference and Expo (ITEC), 2019, pp. 1-6 (Year: 2019).*

(Continued)

*Primary Examiner* — Rexford N Barnie
*Assistant Examiner* — David A Shiao

(57) ABSTRACT

A method and apparatus for managing an AC backup power source utilizing energy stored in an electric or hybrid vehicle and one or more AC loads powered thereby. The method and apparatus is preferred to be used as a home backup power system comprising a battery contained within an electric or hybrid vehicle providing DC power which is converted to AC backup power, charging the battery, monitoring the amount of power supplied to one or more loads and controlling AC power provided thereto.

82 Claims, 18 Drawing Sheets

(56) References Cited

U.S. PATENT DOCUMENTS

| | | |
|---|---|---|
| 7,015,599 B2 | 3/2006 | Gull et al. |
| 7,053,497 B2 | 5/2006 | Sodermann et al. |
| 7,208,850 B2 | 4/2007 | Turner |
| 7,338,364 B2 | 3/2008 | Baerlocher et al. |
| 7,356,384 B2 | 4/2008 | Gull et al. |
| 7,379,778 B2 | 5/2008 | Hayes et al. |
| 7,402,766 B1 | 7/2008 | Jonas et al. |
| 7,692,332 B2 | 4/2010 | Nordman et al. |
| 7,863,867 B2 | 1/2011 | Ganev et al. |
| 8,159,084 B2 | 4/2012 | Gilpatrick |
| 8,222,548 B2 | 7/2012 | Espeut, Jr. |
| 8,248,058 B2 | 8/2012 | Stair et al. |
| 8,324,755 B2 | 12/2012 | Stair et al. |
| 8,350,405 B2 | 1/2013 | Vicari et al. |
| 8,569,912 B2 | 10/2013 | Lim et al. |
| 8,653,679 B2 | 2/2014 | Lim et al. |
| 8,736,103 B2 | 5/2014 | Vicari et al. |
| 9,088,180 B2 | 7/2015 | Wedel et al. |
| 9,281,715 B2 | 3/2016 | Lim et al. |
| 9,312,665 B2 | 4/2016 | Robinson et al. |
| 9,876,343 B2 | 1/2018 | Lathrop et al. |
| 9,966,761 B1* | 5/2018 | Kim .................... H02J 4/00 |
| 2001/0010032 A1 | 7/2001 | Ehlers et al. |
| 2002/0024332 A1 | 2/2002 | Gardner |
| 2002/0072868 A1 | 6/2002 | Bartone et al. |
| 2002/0084697 A1 | 7/2002 | Radusewicz |
| 2003/0036822 A1 | 2/2003 | Davis et al. |
| 2003/0075982 A1 | 4/2003 | Seefeldt |
| 2004/0007876 A1 | 1/2004 | Braun et al. |
| 2004/0075343 A1 | 4/2004 | Wareham et al. |
| 2004/0078153 A1 | 4/2004 | Bartone et al. |
| 2004/0117330 A1 | 6/2004 | Ehlers et al. |
| 2004/0267385 A1 | 12/2004 | Lingemann |
| 2005/0109387 A1 | 5/2005 | Marshall |
| 2005/0116814 A1 | 6/2005 | Rodgers et al. |
| 2005/0216131 A1 | 9/2005 | Sodermann et al. |
| 2006/0018069 A1 | 1/2006 | Gull et al. |
| 2006/0071554 A1 | 4/2006 | McNamara et al. |
| 2006/0072262 A1 | 4/2006 | Paik et al. |
| 2006/0208574 A1* | 9/2006 | Lasseter ................ H02J 3/38 307/69 |
| 2006/0276938 A1 | 12/2006 | Miller |
| 2007/0008076 A1 | 1/2007 | Rodgers et al. |
| 2007/0010916 A1 | 1/2007 | Rodgers et al. |
| 2007/0053123 A1 | 3/2007 | Filippenko |
| 2007/0222294 A1 | 9/2007 | Tsukida et al. |
| 2007/0222295 A1 | 9/2007 | Wareham et al. |
| 2007/0276547 A1 | 11/2007 | Miller |
| 2007/0282547 A1 | 12/2007 | Howell et al. |
| 2008/0093851 A1 | 4/2008 | Maeda et al. |
| 2008/0203820 A1 | 8/2008 | Kramer et al. |
| 2009/0027932 A1 | 1/2009 | Haines et al. |
| 2009/0150100 A1 | 6/2009 | Piter et al. |
| 2009/0216386 A1 | 8/2009 | Wedel |
| 2009/0224690 A1 | 9/2009 | Xu et al. |
| 2009/0299540 A1 | 12/2009 | AbiSamra |
| 2009/0322154 A1* | 12/2009 | Ichikawa ............... B60L 53/31 307/82 |
| 2010/0007300 A1 | 1/2010 | Hein |
| 2010/0019507 A1 | 1/2010 | Hashimoto et al. |
| 2010/0019574 A1 | 1/2010 | Baldassarre et al. |
| 2010/0038966 A1 | 2/2010 | Espeut, Jr. |
| 2010/0090532 A1 | 4/2010 | Shelton et al. |
| 2010/0134073 A1 | 6/2010 | Kohn |
| 2010/0225167 A1 | 9/2010 | Stair et al. |
| 2010/0328850 A1 | 12/2010 | Remmert |
| 2011/0062888 A1 | 3/2011 | Bondy |
| 2011/0064445 A1 | 3/2011 | Yashiro |
| 2011/0109158 A1* | 5/2011 | Olsen ................ B60L 50/51 307/10.1 |
| 2011/0112704 A1 | 5/2011 | Kibbie |
| 2011/0175450 A1 | 7/2011 | Vicari et al. |
| 2011/0198928 A1 | 8/2011 | Lee |
| 2011/0210606 A1 | 9/2011 | Selker |
| 2011/0254370 A1 | 10/2011 | Wischstadt et al. |
| 2011/0298286 A1 | 12/2011 | Batzler et al. |
| 2012/0053744 A1 | 3/2012 | Manson |
| 2012/0056436 A1 | 3/2012 | Russell et al. |
| 2012/0065786 A1 | 3/2012 | Beraud et al. |
| 2012/0158196 A1 | 6/2012 | Eldershaw et al. |
| 2012/0242145 A1 | 9/2012 | Espeut, Jr. |
| 2012/0292920 A1 | 11/2012 | Yamamura et al. |
| 2013/0066482 A1 | 3/2013 | Li et al. |
| 2013/0103223 A1 | 4/2013 | Liebel |
| 2013/0116847 A1 | 5/2013 | Frampton et al. |
| 2013/0158726 A1 | 6/2013 | Mauk |
| 2013/0159738 A1 | 6/2013 | Mauk et al. |
| 2013/0270908 A1 | 7/2013 | Wedel et al. |
| 2014/0097683 A1* | 4/2014 | Piyabongkarn ........... H02J 3/32 307/26 |
| 2014/0111006 A1 | 4/2014 | Baldassarre |
| 2015/0180236 A1* | 6/2015 | Nakao ................ H02J 3/34 320/103 |
| 2015/0180367 A1 | 6/2015 | Tesch |
| 2015/0180393 A1 | 6/2015 | Tesch |
| 2015/0311843 A1 | 10/2015 | Iles |
| 2016/0152154 A1* | 6/2016 | Mizuno .................. B60L 53/18 307/10.1 |
| 2016/0181861 A1* | 6/2016 | Familiant ................ H02J 9/062 307/66 |
| 2017/0008413 A1 | 1/2017 | Reineccius |
| 2017/0168516 A1 | 6/2017 | King |
| 2017/0214225 A1 | 7/2017 | Ramachandran et al. |
| 2019/0027933 A1 | 1/2019 | Lian et al. |
| 2019/0273393 A1 | 9/2019 | Chen |
| 2020/0122585 A1* | 4/2020 | Bhat .................. G05B 19/0426 |
| 2021/0273453 A1* | 9/2021 | Nishio .................. B60L 50/50 |

OTHER PUBLICATIONS

Saber Falahati, Seyed Abbas Taher, Mohammad Shahidehpour, "Grid frequency control with electric vehicles by using of an optimized fuzzy controller", Jul. 5, 2016, Applied Energy, vol. 178, 2016, pp. 918-928. (Year: 2016).*
Schneider Electric, 8910DPA92V02 Product Data Sheet, copyright 2011.
Generac, Load Control Module brochure, printed Apr. 7, 2010.
Tesla Motors, High Power Connector Installation Manual, (date unknown).
Simon Cohen, Which apps would you like to see on the iPad?, Feb. 10, 2010.
Lasko, 30" Tall Digital Ceramic Pedestal Heater with Remote, Model 5350, 03/06.
Generac, Nexus LTS connections, (date unknown).
Generac, Technical Manual Nexus Smart Switch, Apr. 22, 2010.
Generac, Technical Manual Nexus LTS Load Shed Switch, Aug. 16, 2010.
Cummins, Automatic transfer switches, copyright 2007.
Cummins, GGHE Generator set data sheet, copyright 2009.
Cummins, GGMA Generator set data sheet, copyright 2009.
Kirk A. Kleinschmidt, A Closer Look at Inverter Generators, ca. 2008.
Cummins, PowerCommand 3100 Digital generator set control, copyringt 2008.
Generac, RTSS Load Shed Automatic Transfer Switch Technical Manual, Rev. C, May 2, 2008.
Generac Power Systems, Inc. (Aug. 14, 2020) Owners Manual For PWRcell Automatic Transfer Switch, Rev B. Generac Power Systems, Inc. Waukesha, WI 53189, USA. Retrieved from https://www.generac.com/service-support/product-support-lookup/product-support-details?productid=d2736fee-be12-4237-a6cb-b4f029652a44&serialNumber=CXSC100A3&registered=false.
Generac Power Systems, Inc. (Aug. 28, 2019) Generac Pwrcell Solar + Battery Storage System Rev 10/20. Generac Power Systems, Inc. Waukesha, WI 53189, USA. Retrieved from https://www.generac.com/generaccorporate/media/library/content/clean%20energy/pwrcell_consumer_brochure.pdf?ext=.pdf.
Generac Power Systems, Inc. (Nov. 5, 2020) Owner's Manual Generac PWRcell Inverter Rev. C. Generac Power Systems, Inc.

(56) References Cited

OTHER PUBLICATIONS

Waukesha, WI 53189, USA. Retrieved from https://www.generac.com/service-support/product-support-lookup/product-support-details?productid=8ba6048c-9b6d-46a1-acb9-27af74be6b74.

Generac Power Systems, Inc. (Jul. 29, 2020) Line Diagrams PWR Cell. Generac Power Systems, Inc. Waukesha, WI 53189, USA. Retrieved from https://www.generac.com/service-support/product-support-lookup/product-support-details?productid=8ba6048c-9b6d-46a1-acb9-27af74be6b74.

Generac Power Systems, Inc. (Nov. 16, 2018) Generac Owner's/Installation Manual Smart Management Module (SMM) Rev. B Nov. 16, 2018. Generac Power Systems, Inc. Waukesha, WI 53189, USA.

Generac Power Systems, Inc. (Mar. 26, 2019) Generac Owner's/Installation Manual 100A Smart Management Module (SMM) Rev. A Nov. 16, 2018. Generac Power Systems, Inc. Waukesha, WI 53189, USA.

\* cited by examiner

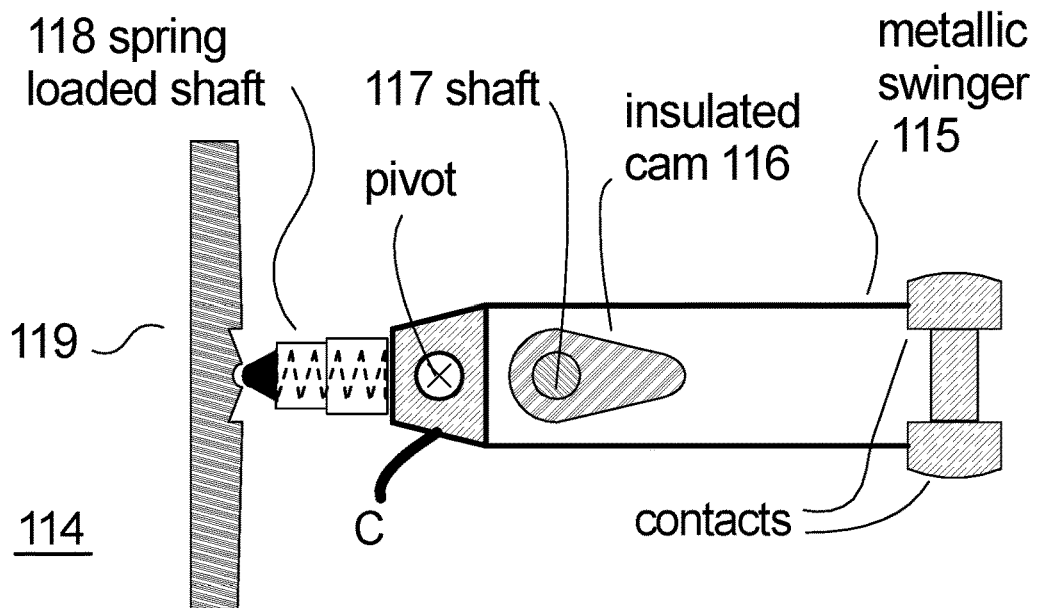
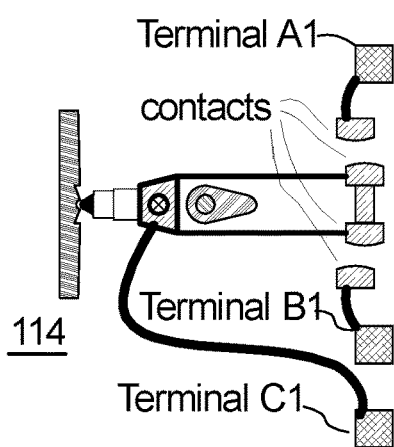 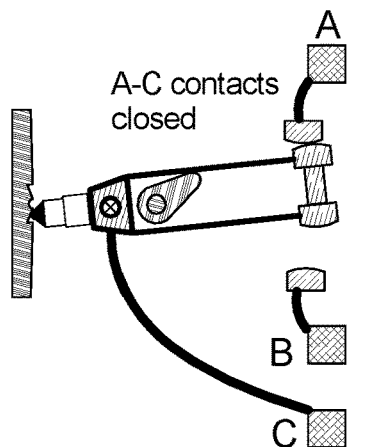 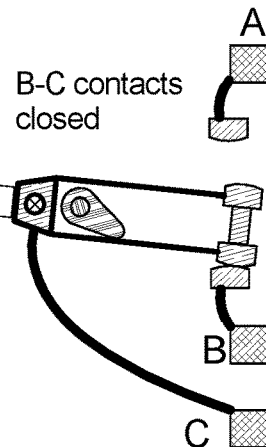
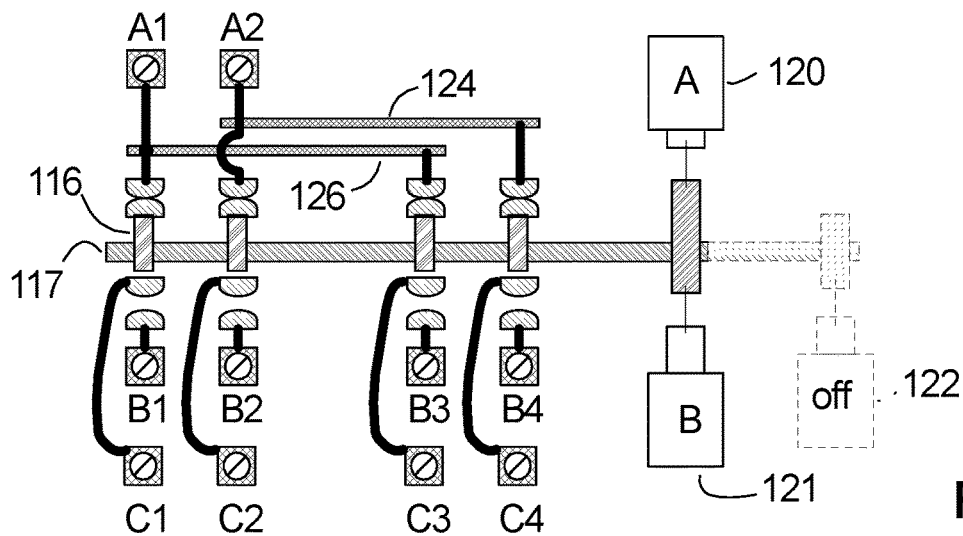
Figure 23A
Figure 23B  Figure 23C  Figure 23D
Figure 23E

VEHICLE BATTERY POWER SOURCE LOAD CONTROL

This application is a division of and incorporates herein by reference application Ser. No. 16/444,280 titled Power Source Load Control filed Jun. 18, 2019, which in turn is a continuation in part of, and incorporates herein by reference in its entirety application Ser. No. 16/112,638 titled Power Source Load Control filed Aug. 24, 2018 and issued as U.S. Pat. No. 10,840,735 issued Nov. 17, 2020 which application in turn is a continuation in part of and incorporates by reference in its entirety application Ser. No. 13/481,804 filed May 26, 2012 titled Power Source Load Control and issued as U.S. Pat. No. 10,879,727 on Dec. 29, 2020 which application in turn claims benefit of, and incorporates by reference in their entirety, provisional patent applications: Genset Overload Control, application No. 61/624,360 filed Apr. 15, 2012; Load Control application No. 61/598,564 filed Feb. 14, 2012; Power Source Load Control, application No. 61/552,722 filed Oct. 28, 2011; Power Source Load Control, application No. 61/490,253 filed May 26, 2011. These applications are incorporated herein by reference in their entirety.

BACKGROUND OF THE INVENTION

The background of the invention, summary of the invention, brief description of the Figures, detailed description of the preferred embodiment, claims and abstract are presented and described herein to a person having ordinary skill in the art to which the subject matter pertains, hereinafter sometimes referred to as person of ordinary skill or one of ordinary skill. Many people of ordinary or advanced skill in the art commonly use words, for example such as generator and load, to have language, location and context specific meaning. This usage works well for providing understanding and clarity to a person of ordinary skill, despite using words having several potential meanings. For example, valve is used in Europe in relation to vacuum tubes and in North America in relation to gaseous and fluid controls. Gas is used in the U.S. to mean gasoline and the gaseous state of a substance. One of ordinary skill will know from the language, location and context used which meaning of more than one possible meaning is intended.

As one example to demonstrate how the intended meaning is the known meaning to one of ordinary skill, consider a power generating device which is often referred to simply as a generator by one of ordinary skill, relying on the field of art and context of usage to supply specific meaning and limitations to the particular name generator. A person of ordinary skill writing a technical article about a backup generator used in the art of heating (or otherwise powering) a suburban home during loss of public utility power would know and intend generator to mean an electrical generator. A person of ordinary skill writing a technical article about a backup generator used in the art of heating a building in a large city during loss of public utility power would know that generator could be a steam generator. According to this example, depending on context, one of ordinary skill would know generator to mean a steam generator or an electrical generator. As another example, in the electrical power generating art generator is commonly meant to mean the generating device such as a motor or turbine and electrical alternator combination. As yet another example in the electrical art an electrical generator (often used in pre 1960's vehicles) outputs D.C. power and is distinguished from an alternator (often used in post 1960's vehicles) which creates AC power which is internally rectified to provide the needed D.C. power. Load may refer to the total load on a generator, or an individual load presented by a particular device, or may refer to the device itself which presents a load. The person of skill will recognize the meaning of generator and load from the context in which it is used.

As set forth in more detail in MPEP 2111.01 (January 2018 [R-08.2017] revision is referred to herein), Applicant, as his own lexicographer, intends the words and phrases used in the specification and claims to have their plain U.S. English meaning, that is, the ordinary and customary meaning given to the term by those of ordinary skill, unless it is clear from the specification that they have been given a different (including narrower) meaning. When a word or phrase for example such as a technical word or phrase has a meaning to one of ordinary skill from the location, context, usage, time frame and/or what is well known in the art to differ from the plain U.S. English meaning as of the pertinent date, Applicant intends that meaning which is known to one of ordinary skill to be used. As set out in MPEP 2182 a patent specification need not teach, and preferably omits, what is well known in the art. Thus, Applicant further notes that a meaning of a word or phrase which is well known in the art may not be specifically set forth in the instant specification other than by this note.

In a facility where a power source provides power to one or more devices which each present a load or loads to the power source there is a need to determine and control which and how many loads are connected in order that the total of the loads does not create an overload. Overloads are generally undesirable in that they may cause deviation from power output specifications, loss of power, damage or combinations thereof. In the above power source (generator) examples an overload could cause steam to not be hot enough, or electric voltage to be too low or have the wrong frequency. Additionally, management of the creation of power by the power source, as well as the loads connected thereto is desirable for efficient operation.

A given power source has a maximum load handling capability dictated by the power generation and delivery path (e.g. pressure, voltage, pipe size, wire size) or a maximum output (e.g. dictated by the design of the power source and the system it is used in). For simplicity, devices that may be connected to the power source are often referred to in the art and herein as loads. For a given group of loads that are available for connection, it may be desirable to inhibit a particular individual load from being connected to the power source at a given time (e.g. preventing connection or disconnecting an already connected load) or during a given time period or to restrict the power supplied to the load (e.g. by controlling coupling), or the power consumed by the load (e.g. by controlling the load). It may also be desirable to allow a given load to be connected at a given time or during a given time period. For example, it may be desirable to inhibit the connection of a large load during times of high load demands, or to allow that load to be connected and operated only during night hours when there is ample power available and/or when fuel or energy rates are cheaper.

One of ordinary skill will recognize from the teachings herein that the inventive concepts given by way of example may be utilized for many types of power systems, including but not limited to hydraulic, fluid or gaseous heating, mechanical, thermal, solar, wind, liquid fuel, gas fuel, solid fuel and combinations thereof. The use of the invention with various types of systems will be known to the person of skill and in particular by use of well-known correlations between electrical, fluid, chemical and mechanical systems. For example, a voltage in an electrical system correlates to pressure in a fluid system, amperage to flow rate, wire size to pipe size, switch to valve, etc. While the present invention will be known from the teachings herein to have applicability to many forms of power sources and loads the background and teachings will be given by way of example with respect to electrical generators and loads. The electrical generators used by example often include a rotating power source and AC alternator combinations and are often referred to in the art as generator sets, gensets or simply generators as well as by a host of other names which are frequently specific to the particular type of energy source, power output and/or alternator used.

The connection and disconnection of power from the power source to the load is in general controlled by one or more switch and it will be understood that there are many types of switching mechanisms that may perform such connection and disconnection. When speaking of switch, switching, connection or disconnection it will be understood that such action is not meant to be restricted to a particular type of switch or connection unless the type is specifically enumerated or is apparent from the context. For example, when teaching connecting, coupling or switching power from an electrical generator to an electrical load it will be understood that the action is performed by an electrical circuit, for example a switch but the teaching is not otherwise limited to a particular type of electrical switch unless specifically enumerated. If the teaching is with respect to controlling the amount of current or load (as compared to simply switching the current or load on or off) it will be known that a simple on/off type of switch is not meant and the switch must be some sort which can control the amount of current.

Often there are multiple types of electrical devices available to be connected to and powered by the power source. Some devices may simply be turned on and off and some devices have loads which will vary with time or environment. A maximum load can occur when all devices are powered at the same time and each device presents its individual maximum load to the power source. As a simple example, it is possible to turn on all of the lights and appliances in a house, but that rarely happens. In many systems maximum loads are rarely presented to the power source and the typical load is frequently much less than the maximum load. That causes a system design problem because it is necessary for the power source, in the present example an electric generator, to provide power to the maximum load to prevent overload but that capability generally makes powering the typical load inefficient.

By way of background one of ordinary skill will recognize that several factors are involved in both the amount of power that can be supplied by a power generator and the amount of power consumed by a particular device which is being powered. The output of a wind turbine is dependent on the amount of wind and the design of the turbine. A solar cell array is dependent on the amount of sunlight and the design of the array. An electrical generator is dependent on the mechanical power available to turn the alternator. For a typical liquid or gaseous fuel powered backup generator, the maximum output is dependent on the size of the internal combustion engine, the alternator and its operating conditions.

With respect to internal combustion engine powered electrical generators the maximum power available and transferred to a load for a given size generator is generally dependent on many factors such as the generator's internal temperature, ambient temperature, humidity, altitude and barometric pressure, type of electrical connection (e.g. voltage and single or multiple phase), power factor of the load, fuel quality, fuel delivery rate and duration of the load. Generally, the internal temperature of the engine is a factor in determining the safe maximum output of the engine and the internal temperature of the alternator is a factor in determining the safe maximum current output from the alternator. Internal temperatures of the engine and alternator are dependent on load, ambient temperature, altitude, barometric pressure and humidity, among other factors. Engine efficiency is also dependent on various fuel and air quality factors. A generator can usually withstand higher currents when it is cool but those currents will soon (often in the matter of a few minutes) cause additional internal heating which in turn limits the maximum output current. Electrical generators often have two maximum power ratings, one for generator use as a backup power source and one for use as a prime power source. The prime power maximum is usually lower in part due to the continuous operation.

Efficient operation of such generators is usually a consideration in the selection of the generator which in turn leads to a need for the present invention to manage the load presented to the generator. As an example, consider the specifications of a Cummins model GGHE 60 kW electric power generator which includes an AC alternator which is driven by a 6.8 liter V10 internal combustion engine using natural gas as fuel. Electric power generators of this type are commonly used for backup power in large homes and small businesses to provide power in the event utility company power fails. Assume for this example that this generator is chosen to power a home which can present a maximum load of 60 kW to the generator, but a typical load is only 15 kW.

At the full load output of 60 kW the natural gas fuel consumption for this generator is 24.4 cubic meters per hour ($m^3$/hour). One might think that at ¼ load this generator would burn fuel at approximately ¼ of the full load rate or 6.1 $m^3$/hour. That assumption is incorrect however because the generator is much less efficient at ¼ load. The fuel burn rate for a 15 kW load is actually 10.6 $m^3$/hour or about 43% of the full load rate. Among the several reasons for the inefficiency at lower loads is that the alternator and the big V10 engine's entire cooling system must be sized to handle heat output at full load. The coolant pump is pumping coolant through the engine and radiator, the fans are pulling cooling air through the alternator, across the engine and blowing air through the radiator thus performing maximum alternator and engine cooling whenever the engine is running. This cooling causes a considerable drain of engine power, even though all of that cooling is not needed for the 15 kW load. Other efficiency robbing factors such as engine friction and alternator windage are higher than needed for the typical load because of the design to handle maximum load.

If instead a less expensive Cummins model GGMA four cylinder generator rated at 20 kW were used as the power source, the natural gas burn rate when powering the typical 15 kW load is only 7.6 $m^3$/hour. Using the smaller 20 kW generator is less expensive to purchase and operate and thus more efficient for the typical load. Unfortunately, the 20 kW generator is unable to handle the 60 kW maximum load, which if connected to the generator would cause the generator circuit breaker to trip and all power to the load would be lost. As will be described herein the present invention will find use in such applications where a generator is unable to power the maximum load which can otherwise be presented to it.

With respect to the power required by a particular load several factors may be involved depending on the load type. Several examples of varying load will be briefly described to aid in understanding the invention. It will be understood that for most devices the voltage applied from the generator is substantially constant and consequently the current drawn by the device is proportional to the load on the generator. When the voltage from the generator is substantially constant the current supplied directly corresponds to the power supplied and vice versa and either may be measured to obtain the other as is well known to one of ordinary skill. Many electric motors have a large starting current for a few seconds followed by a running current which depends on the mechanical work the motor is doing. For a motor such as one powering a vacuum cleaner that work depends on the amount of suction being created at any particular time which in turn depends on the technique of the person operating the vacuum. Heating appliances such as ovens often require more current to initially heat up than to maintain temperature once it is heated. This change is due in part to temperature dependent resistance changes of the heating elements.

An air conditioner will require a large starting current for a few or many seconds depending on the head pressure of the compressor pump and mass of the armature of the compressor motor and the moving components of the compressor pump. Once the compressor is up to operating speed the amount of current necessary to maintain that speed depends on the head pressure which in turn is partially dependent on the temperature of the condenser coil which in turn is dependent on ambient temperature and air density. If a compressor loses power the built-up head pressure will take several dozen seconds or even minutes to bleed off through the capillary tube or expansion valve in the evaporator and if an attempt is made to restart the compressor before that head pressure has dissipated the starting current will be very large. If the head pressure is too high it can cause the compressor motor to stall which in turn will cause one or more circuit breakers to trip and remove the voltage supply from the compressor, thus care must be taken to not start the compressor too quickly after it has stopped. This can be an issue when utility power is lost and a backup generator is started to replace that lost power.

A battery charger used for example to charge the batteries in an electric or hybrid vehicle or the like, can change its load to the power source based on a variety of factors including the internal temperature of the batteries and their amount of charge. Generally, the charging current is decreased with increased temperature and as the batteries approach full charge. The control of battery charging current, especially in large battery arrays used with electric and hybrid vehicles and the like is well known in the art. For example, U.S. Patent Application Publication 2010/0134073 assigned to Tesla Motors, Inc. describes an elaborate manner in which battery charging current, temperature and various other factors are controlled, which Publication is incorporated herein by reference in respect to its prior art teachings. It may be noted that by controlling charging current, the maximum load drawn from the power grid or generator can be controlled.

Tesla Motors, Inc. offers a high power connector which allows its vehicle to be connected to common 240 volt AC power circuits to charge the batteries. The Tesla Motors High Power Connector, or HPC includes a maximum current selector switch that is manually set at the time of installation such that the maximum amount of current which the charger is allowed to draw from the 240 volt circuit is limited according to the capability of the circuit connection to the supply. For example, if a 40 amp circuit is used, the switch on the HPC is set to limit the HPC current draw to 32 amps. This is an important feature of the HPC because even though the charger is capable of operating with a 240 volt, 90 amp circuit for fast battery charging, many homes only have a 100 amp service connection and thus are incapable of providing current to the HPC via a 90 amp circuit without risk of overloading the service and tripping the main circuit breaker.

Returning now to the operation of a system having a variety of loads, in order to prevent sustained overloads and decrease the possibility of a circuit breaker trip or damage to a generator, especially those used for backup power, there are prior art systems which detect when a generator is in an overload condition and switch off loads. This operation is known as load shedding. Load shedding is well known in the prior art, for example a system is described in the Rodgers et al. U.S. Patent Application Publication 2005/0116814 which Publication is incorporated herein by reference in respect to its prior art teachings. Paragraphs 70-115 are particularly pertinent. Importantly load shedding takes place when the load is connected and overload detected as described in more detail in this Publication.

Load managers for load shedding are commercially available, for example the Generac Nexus automatic transfer switch used in conjunction with backup power generators has a load manager option. These devices, which will be explained further below in respect to FIGS. 1-3, operate to start a gaseous or liquid fueled backup generator to power homes and businesses whenever power from the local power company fails and transfer the load from the local power company to the generator. This Generac transfer switch contains multiple switches, a main high current switch (e.g. 400 amps) for switching between the power grid and generator as the source of power for the home or business. It includes additional low current secondary switches to provide control voltages which are used to disconnect low priority loads via load managers such as the Generac DLC load control Module (contactors) when the generator is overloaded.

Most generator engines utilized for North American home backup systems rotate at 1800 or 3600 RPM, that rotation being coupled to an alternator that provides AC power at a standard 60 Hz frequency. When overloaded the rotation of the engine slows because the engine can not produce enough torque to keep the alternator rotating at the correct speed. The slow engine in turn causes the frequency of the AC power to decrease. The rotation and corresponding AC power frequency may drop substantially in the presence of a large overload and the engine and alternator can even attempt to rotate against their mounts, much like an automobile engine attempts to rotate against its motor mounts during heavy acceleration. The Nexus transfer switch includes technology which monitors the frequency of the AC power from the generator and sheds all of the low priority loads after the generator has been overloaded. Nonessential circuits (low priority loads) are shed by opening the secondary switches when the frequency of the AC power provided by the generator drops below 58 Hz (for 60 Hz systems). The secondary switch is used to control a circuit to apply or remove voltage to a contactor to control applying and removing a corresponding load on the generator thereby removing the overload when the contactor is opened. Importantly this load shedding takes place after the overload happens.

Frequency detectors have tolerances which must be accounted for to avoid false tripping so there is a tradeoff in the speed of detection of off frequency condition vs. false detection due to frequency detector error or allowable momentary frequency deviation. For example, if the frequency threshold for disconnecting the load is set at 58 Hz, inaccuracies in frequency detection may cause an overload to be falsely detected and a load disconnected when no overload exists. It is possible that a combination of overload, say one which slows the frequency to 58 Hz and inaccurate frequency detection, can cause an actual overload to go undetected. Unfortunately, the overload, and possibly damage to the generator or its load, may have already happened by the time the overload is detected. Despite the various shortcomings in using power frequency as an indicator of generator overload, it will be understood from the present teachings that this is nevertheless an inexpensive manner of detecting and removing overloads, as will be taught further in connection with load limit and load switch operations.

As another example if an oven is turned on at the same time a storm drain pump automatically starts, it is still possible that the generator circuit breaker will trip before the overload can be detected and the excess load removed, thus all power will still be lost. Turning on an oven at night during a storm and having all power go off because the generator circuit breaker improperly tripped can be extremely troublesome, not to mention the inconvenience of having to find and reset that circuit breaker. At the least, it is inconvenient for someone in the home to turn on a device, only to have it or some other device(s) automatically disconnected from power shortly thereafter. In a home backup system that device causing the overload might be something that is needed in a timely fashion such as a medical device, lighting, a cooking appliance, a television, garage door opener or other important device. In most situations it would be better to have a non-essential load such as a vehicle battery charger turned off or limited to prevent any overload.

SUMMARY OF THE INVENTION

It will be understood from the present teachings that it is desirable to control the total load presented to a particular power source to keep that load at or somewhat below the maximum capability of the power source. Alternatively, it may be desirable to control the total load to keep the power source at or near its optimum power output to achieve high or maximum efficiency. As part of controlling the load to the power source it is desirable to connect some or all loads according to a priority. It is also preferred to alert the user that power is not available to power a particular device and allow the user to decide what to turn off or leave off than to have the device (and possibly several others) turned off shortly after it is turned on due to actual or potential overload. If loads are available that may but do not need to be connected and operated, it may be desirable to wait and operate them when the power source is operating well below its optimum efficiency. By waiting an increase in the efficiency of the operation is achieved with the added benefit of avoiding having to disconnect loads when the power source is operating at or somewhat below its maximum capability and an unexpected additional load is applied. Thus at least these two modes of operation are desired to be provided in order to facilitate reliability and efficiency, operation at or somewhat below maximum output capability and operation at, near or closer to optimum power source output.

It will be understood by one of ordinary skill that short term large loads may be allowed in that many engine driven alternator systems are designed to permit short term increases in power output above the maximum power that can be continuously delivered. As used herein and in the claims, overload means a load that if not disconnected or otherwise prevented will either cause a departure from specifications for the power output from the power source, for example such as a deviation of AC power voltage or frequency for longer than a specified time period, a loss of power such as from a tripped circuit breaker, or damage such as overheating or exceeding mechanical stress limits.

When making decisions which are aimed at efficiency, one substantial consideration is the cost of providing power. If power can be obtained from the electric utility or elsewhere at lower cost during certain times, for example during the night, the invention can be utilized to control loads in a manner to best take advantage of the lower cost power. This can be done while still ensuring that the devices presenting the loads are available for use at other times if needed. Such use can include the device's intended function or use by a user, or as a load to improve power source efficiency. For example, a battery charger for charging an electric or hybrid vehicle or the like can charge the battery to a given level such as half full, immediately upon being connected. This will ensure the vehicle is quickly available for use. The remainder of the charging from half to full charge can be delayed until lower price electricity is available. The delay of the remaining charge can also be used to boost an under utilized power source such as a backup generator closer to its optimum output for improved efficiency. Thus, it is desired to control a charger to charge at a given rate as soon as connected until a first level of charge is reached and then charge at the same or another rate starting at a later time and continuing until a second level of charge is reached.

The delay of operating a load can be coordinated with maintenance of the power source to provide a load for the maintenance without wasting power. Most backup generators are controlled in order that they are operated periodically, with or without a load, for example 30 minutes every week. This is known as exercising and it helps to keep fluids circulating, bearings oiled, moisture dried, etc. to improve reliability. A load such as a battery charger can be delayed until an upcoming scheduled exercising when the battery is charged. Alternatively, the battery can be charged at a convenient time by rescheduling the exercising. More generally loads may be supplied with current at a first known amount (which may be an amount to achieve a particular effect such as charge rate) starting at a known time (which may be upon connection or a clock time) for a known period of time (which may be the time to achieve a particular event or a particular clock duration) followed by one or more known combinations of the above known amount, known time and known period. As one example, charging a battery at full rate until half full upon connection upon return to home in the evening then charging at the maximum available current during the time period of generator exercise followed by charging at a most efficient charging rate during off peak hours when grid power is cheap with each of the times being terminated early if the battery reaches full or some other desired charge level.

The invention can also be configured to allow selection of the power source to power one or more loads from among a plurality of power sources, for example a load can be powered from a low cost source such as photovoltaic solar cell panels, a wind turbine, fuel cell, flywheel or powered from the utility company power if there is insufficient sun and wind or if more power is needed than the solar panel, wind turbine and/or fuel cell can provide. This operation may be coupled with efficient utilization of sources such as to charge a vehicle battery as described above. Changing to other power sources can be accomplished by any means or method known to the person of ordinary skill, e.g. via transfer switch, parallel input connections to the load, parallel power sources.

The invention described herein allows efficient matching of a total load made up of individual loads to one or more power sources without overloading the power sources. The present invention will allow sizing of power sources to accommodate less than the maximum possible load and can prevent overloading of the power source by preventing a load which would otherwise immediately cause or which could lead to a future overload from being connected or alternatively by restricting the power supplied to that load and/or others. This operation is achieved by the intelligent connection and disconnection of individual loads as well as the control of the power drawn from power sources by connected individual loads and/or control of power supplied to connected individual loads as will be described in more detail below.

Most commercial generators are well characterized for operations under various conditions, including but not limited to loading and environmental conditions, and the maximum available output power is known for any particular set of such conditions. The present invention is preferred to sense one or more of the various conditions which affect that maximum available output power and use those conditions along with the characterization of the generator to determine precisely what that maximum available output power is at a given time, what the expected available power will be at one or more times in the future as well as the present and future effect the connection of a particular load may have on available power. In that fashion the present invention can select loads to be connected to the generator or other power source to power the maximum number of loads and/or to operate nearer to or achieve optimum efficiency while at the same time monitoring the present and expected future load thus ensuring that the generator will not be overloaded instantly or during the duration of any particular connection.

The description of the preferred embodiment of the invention herein is made by way of example as an improvement to an electrical backup generator system to provide power to a typical home or small business in the event power from the power grid (i.e. the municipal utility power or street power) is lost. The preferred embodiment may also be utilized with more than these two (grid and backup generator) power sources, for example wind and solar power sources may be incorporated with grid and engine driven power sources. It will be understood to one of ordinary skill from the teachings of the preferred embodiment that the invention as herein described is not limited to the particular embodiment and the invention may be practiced in a manner to be utilized with other types and combinations of power sources and loads to achieve a desired level of performance for a particular system.

The elements and steps of the preferred embodiment are preferred to be implemented with electronic circuitry as will be well known to one of ordinary skill from the present teachings. As used in the description of the preferred embodiment, circuit is meant to be an electric or electronic circuit unless it is clear from the context that it is another type of circuit. Descriptions of, and nomenclature pertaining to, elements of the invention are given in respect to names of electrical and electronic devices or operations (e.g. switch, generator, processor or processor circuit, power grid, solar panel, wind turbine, fuel cell, communications, communications channel, interface or interface circuit) or a descriptive name of a function performed with respect to some device or condition (e.g. load monitor, generator monitor, load control, load switch, communications link) all as are well known to one of ordinary skill from the teachings of the preferred embodiment of the invention and context of usage. In some instances, the name of the device is also descriptive as will be well known to one of ordinary skill.

The invention described herein is preferred to utilize intelligent timing for connecting and disconnecting of loads to one or more power sources including control of power supplied to or demanded by the loads in order that the total load on any one power source is kept at or below the maximum output capability of that power source, or alternatively at or near an optimum efficiency level, which may be at or below the maximum capability. The decision making used by the preferred embodiment of the invention for connecting, supplying and/or controlling a particular load to the power source is preferred to be responsive to the capabilities of the power source and the type of load to be connected (including one or more parameter of each), the priority or importance of the load to be connected, the timeliness of the load connection, environmental parameters which affect the power source and loads and the input of one or more persons desiring to use a device presenting a particular load. As used herein and in the claims, parameter means a quantity of one or more property or attribute (e.g. of a device, physical property, substance or environment) which is treated as a constant. A parameter may at times change or be adjusted. Examples of parameters of interest herein include various horsepower, mechanical load, temperature, pressure (including altitude), humidity, power, wattage, voltage, current, including maximums, minimums, safe, starting, limited, instant, real time, near real time and timely. Quantities pertaining to parameters may be in analog or digital form and expressed as numbers which are suitable for use by the device(s) using or responsive to such parameters.

BRIEF DESCRIPTION OF THE FIGURES

FIG. 3 shows a simplified circuit diagram of a prior art power backup system having power grid 12, generator 13, generator and transfer switch controller 14, transfer switch 15, loads 16-20 and load manager elements 14a.

FIG. 5 shows a circuit diagram of load control 25a with communications links 26a-26N, 28a, 30, 31, 32, optional communications link 28b, interfaces 29a, 29c-29h, optional interface 29b and processor circuit 33a.

FIG. 6 also includes Load Limit 43 having current control circuit 44.

FIG. 10 also includes elements for recovering heat from generator 13 including heat exchangers 52 and 53, electrically controlled valves 54 and 55, valve control circuits 56 and 57, generator heat supply 58, generator heat return 59, domestic hot water supply 60, cold water supply 61, radiant heat supply 62, radiant heat return 63, domestic heat temperature sense link 64 and radiant heat temperature sense link 65.

FIG. 12 includes power grid 12, loads 16-19 and 48, load control 25b, load switches 22b and 22c, load limit 43, communications links 26a-26c, 45 and 46 and transfer switch 47, as in FIG. 8 and including battery 68, communications links 69, 70 as in FIG. 11. Battery charger 66 the same as in FIG. 11 is connected to the output of the transfer switch 47 via 71c, and DC-AC inverter 67 the same as in FIG. 11 is connected to an input of transfer switch 47 via 71b.

FIG. 15 also shows a power supply 81 coupled to the power from the transfer switch, the power supply providing power, which is preferred to be a lower voltage safe for human contact, in response thereto.

FIG. 15 section 80L includes a battery and charger circuit 74 to receive AC (or DC) voltage from an external source 81 to provide regular and backup power 84 preferably made available to external devices via one or more connection 82, the battery and charger circuit 74 also providing regular and backup (DC or AC) power 75 (hereafter referred to as backup power) for internal use in 80L, a microprocessor circuit 37 is powered by backup power 75 and responsive to current sense 23d (located in 80H), voltage monitor 78 (from transfer switch power via supply 81) and relay position circuit 79 with microprocessor circuit 37 operative to provide control signals 85 via external connections 82 and with microprocessor circuit 37 also operating to control relay 83 which relay has connections 82 for external circuits. Connections to some external circuits are preferred to be protected via protection devices (circuits) 86. Microprocessor circuit 37 further interfaces with wireless communications link 29k (which is powered by backup power 75) having antenna 76 and operating to communicate with load control(s) via wireless communications channel(s) 26c. Microprocessor circuit 37 is also coupled to user interface 77 (which may receive backup power 75 if desired) and to connections 82 via protection device 86

FIG. 19 further showing alternate and optional load monitor locations 23*f-i*, a normal billing output 101, a TOS billing output 102, a load control processor circuit 99 receiving input from and optional output to Environmental User & Misc. Devices 21 via 28*c*, receiving from and optionally outputting to Backup Power 97 via 107, receiving input 108 from load monitor 23*e*, receiving input 109 from 96 via 104, and input 125 from 98 via 106, providing output 110 to the contactors 111 and 112. The load control p processor circuit 99 also has N output(s) 103 to N controlled loads.

FIG. 22 includes alternate back side view of 113 showing baseplate 128 with alternate input blade arrangement 129*b* and 129*c*.

FIGS. 23A-23E show a simplified mechanical drawing demonstrating a novel transfer switch contactor section which may be utilized as a double throw or double throw with center off contactor 114. The switch may be utilized sections with each section switching a circuit of single or multiple phase power connection as in 100 or 100*a*. The swinger mechanism of Contactor 114 is shown in FIG. 23A including a conducting metallic swinger 115, the swinger having a pivot point about which the switch in the Figure rotates causing the contacts to rotate up and down and the spring loaded shaft 118 to rotate up and down in the opposite direction. The swinger 115 is operated by an insulated cam 116 secured to a shaft 117. The swinger further includes a telescoping, spring loaded shaft 118 which presses against an insulated detent plate 119 to hold the contacts in an upper, center or downward position. The swinger contacts are electrically connected via the metallic structure of the swinger to an electrical conductor C.

FIG. 23B shows a contactor 114 in the center off position, along with the mating upper and lower contacts which are connected to terminals A1 and B1 respectively and the swinger further connected to terminal C1. In FIG. 23C, the A-C contact position is shown and in FIG. 23D the B-C contact position is shown. The swinger may be rotated by the insulated cam 116 enabling the swinger to connect C to either the terminal A via the A-C contacts or the terminal B Via the B-C contacts or neither depending on the position of the cam.

FIG. 23E shows a front (terminal end) view of a bank of four contactor sections 114 as may be used in a single phase transfer switch 100 of FIG. 19 and having cams 116, shaft 117, solenoids 120, 121 and 122 operating to rotate shaft 117. Contacts with suffixes 1 and 2 correspond to the single line circuit e.g. contactor 111 of FIG. 19 and contacts with suffixes 3 and 4 correspond to the single line circuit e.g. contactor 112 of FIG. 19. The A3 and A4 terminals are replaced with buss bars 124 and 126 connecting to A1 and A2 respectively.

FIG. 27 also shows a load control circuit 25a comprising a processor circuit 33a which comprises a generator monitor 24. Load control 25a receives electronic signals from the DC power source (not shown) via 32, user input via 30, inverter 133 via 27a, load monitor 23 via 27b, alternate load monitor 23 via 27b, and provides output electronic signals to user feedback via 31, DC power source via 32, inverter 133 via 27a, and control signals to load modules 143a-143e via 26a-26e respectively.

FIG. 29 also shows a power frequency control circuit 25e comprising a processor circuit 33a, which includes the generator monitor as taught herein and implemented as a dedicated circuit or as performed by the microprocessor in response to data inputs from one or more of 27a, 27b and 32. Power frequency control 25e receives electronic signals from and the DC power source (not shown) via 32, user input via 30, inverter 133 via 27a, load monitor 23 via 27b, alternate load monitor 23 via 27b, and provides output electronic signals to user feedback via 31, DC power source via 32, inverter 133 via 27a and to reference sine wave circuit 134 via frequency control signal 145. The reference sine wave circuit 134 thus provides a frequency control signal, which in this example is a reference sine wave signal, to the inverter 133.

DETAILED DESCRIPTION OF THE PREFERRED EMBODIMENT

Figure 1:
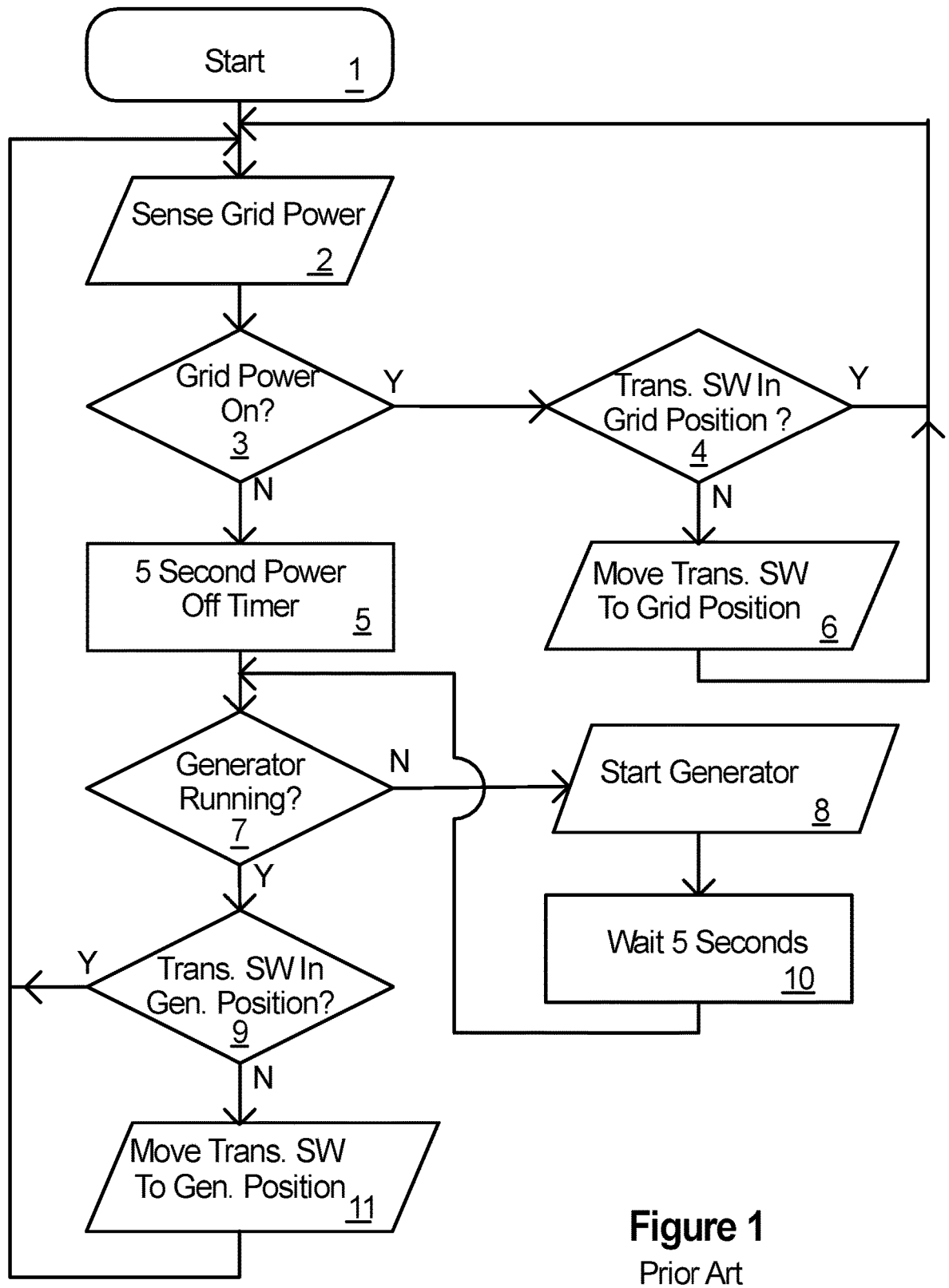
FIG. 1 shows a simplified flow chart of a prior art transfer switch and generator controller having elements 1-11.
Figure 2:
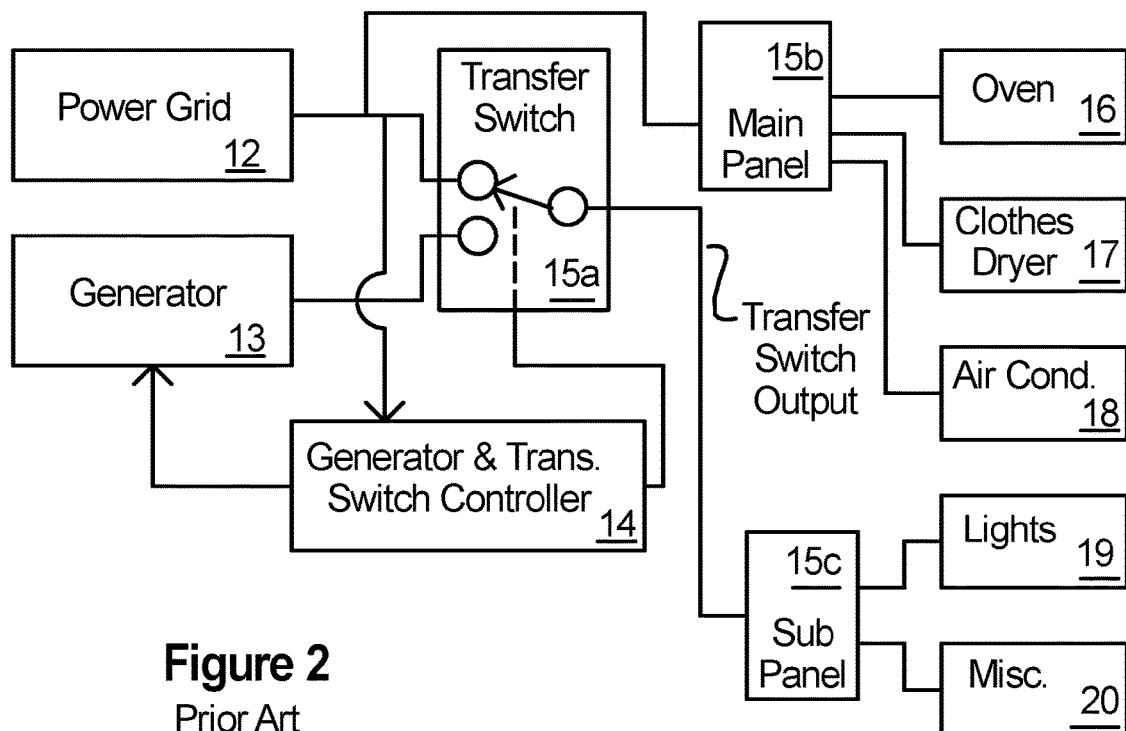
FIG. 2 shows a simplified circuit diagram of a prior art power backup system having power grid 12, generator 13, generator and transfer switch controller 14, transfer switch 15a, load main panel 15b, load sub panel 15c and loads 16-20.
Figure 3:
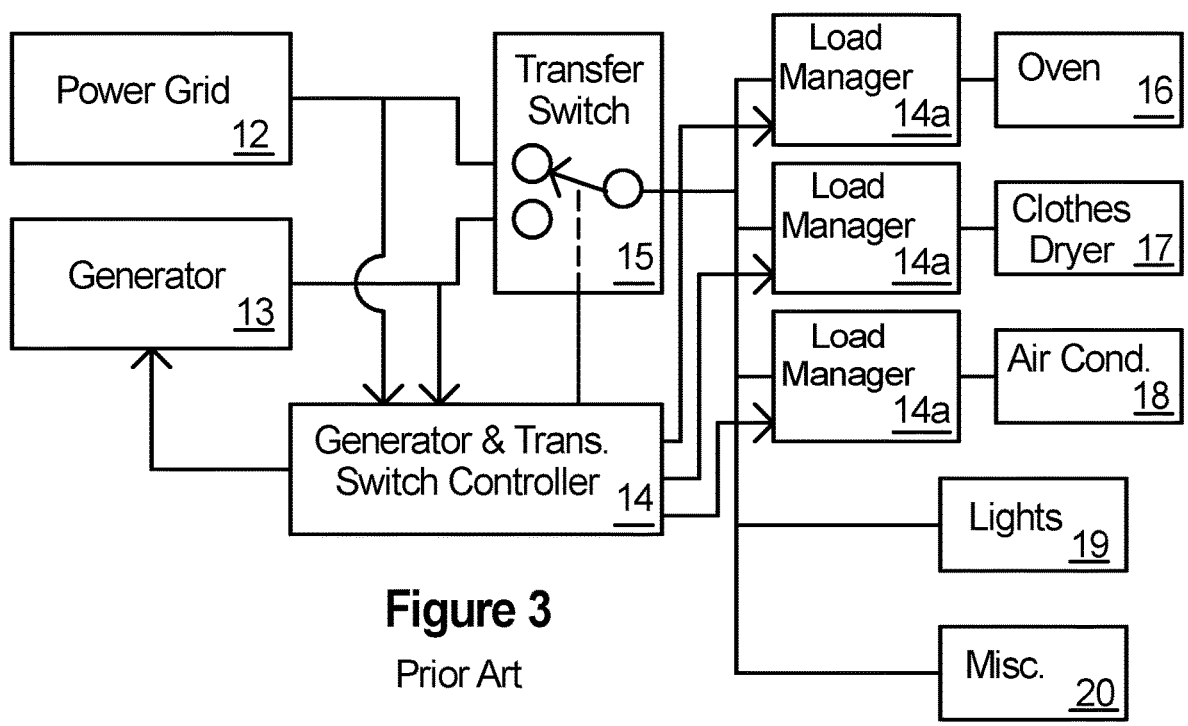

FIGS. 1-3 provide background for understanding of prior art electrical power backup power systems as they pertain to the present invention. One of ordinary skill will already know these systems and the FIGS. 1-3 are simplified to aid in understanding some of the shortcomings of the prior art which are overcome by the present invention. As just one example, it will be known that the connections shown in the various FIGS. 1-3 (and 4-21D) often represent a plurality of actual circuits, such as the connection from the utility power grid 12 which may entail several conductors ranging from three for a single phase system to six or even more for multiple phase systems.

FIG. 2 shows a prior art power backup system to power some of the loads 16-20 utilizing a service connection to a power grid 12 as the primary power source and a generator 13 as the backup power source. As is well known in the art, the figures herein, including FIG. 2, are drawn in single line form, that is, a single line represents the multiple conductors of the flowing single or multiple phase power. For the examples herein, the power grid is subject to loss of power or power fluctuations (e.g. brownouts) and supplies power where the cost of the power varies from time to time. Generator 13 is used in the prior art and preferred embodiment examples with respect to an electric power generator having an internal combustion engine powering an alternator. It will be understood that power sources, loads and other elements of the described systems of the present disclosure have various parameters associated with them. Some parameters for example are the maximum output power of a source, which maximum output may change from time to time, the power output (e.g. timely, current or at the present time power output) of a source, the maximum power consumption of a load which maximum consumption may change from time to time, and the power consumption (e.g. timely, current or at the present time consumption) of a load. Such parameters may be a singular parameter for example such as a maximum voltage, wattage or current, or a plurality for example such as voltage and power, may include other factors such as a time or environment related factor, such as a maximum current at a given temperature or for a limited time. Load parameters, e.g. expected or maximum watts or current consumed by a load, and maximum output power parameters, e.g. maximum watts or current that can be provided by a power source, are of particular importance herein.

In typical installations the power grid 12 is connected via a service connection to the transfer switch 15a and distribution panels 15b and 15c all of which have a maximum rating. The service connection has a circuit breaker to prevent the total of the loads being powered (i.e. the total load) from exceeding that maximum rating of the service connection. In particular there is a circuit breaker (known as the main breaker) located on the power grid service, usually at the power meter, which will be known to disconnect all power to the transfer switch 15 and main panel 15b if it trips. There will also be a circuit breaker located in the generator 13 to disconnect all power from the generator when it trips. Obviously, having either of these circuit breakers trip is a serious inconvenience, especially if it happens when there is nobody available to reset the breaker, or during a storm, at night or other inconvenient time. Additionally, each panel has circuit breakers which will trip and protect individual loads if too much current is consumed.

It will be understood that generator 13 is intended to also represent other power source devices to provide power in a desired form from power in another form or from stored energy. Generator 13 may for example be a wind turbine, solar panel, fuel cell, flywheel, battery, water, wind or steam turbine and may incorporate a DC to AC inverter circuit, generator or alternator to provide electricity if that is the desired output. Stored or collected power may come from gaseous, liquid and solid sources (e.g. fuels) such as hydrocarbons like natural gas, gasoline and other petroleum or solid hydrocarbons like coal, biomass sources, water power such as tides, waves and reservoirs, wind, sunlight, chemical and nuclear energy such as batteries, fuel cells, reactors, mechanically stored energy such as stored heat, flywheels, weights and compressed gas, and other forms as will be known to one of ordinary skill. Some devices may be both power sources and power loads, and store energy which may be converted back to AC (or DC) power to provide backup power, heating, to store in another form or to sell back to the electric utility. For example, in respect to battery storage of energy, it is noted that the batteries in an electric or hybrid vehicle or the like may be used as both loads and power sources.

When used with a primarily electrical circuit, generator will mean an electric generator which is compatible with that type of electrical circuit. Names such as electric generator (which primarily outputs at least electric power), AC generator which primarily outputs at least AC electric power), steam generator (which primarily outputs steam power), solar panel (which uses solar energy as the source of output power), fuel cell (which uses liquid or gaseous fuel and a chemical reaction in a cell to output power), electric solar panel or electric fuel cell (which additionally mean to output electricity). As an example of the type of generator being known from context, a generator which provides power to a transfer switch and thereby provides backup power in place of an electric power grid which has failed, will be understood from the context (i.e. to replace electric power) to be an electric power generator. Generally, the type of device being referred to in the specification and claims will sometimes be specifically named, but when not specifically named will be generically named (e.g. generator) and if intended to refer to a specific device that device will be apparent from the context. As just one example, transfer switch may be any type of switch, e.g. electrical, gaseous (e.g. steam) or hydraulic but if used in an electrical system to transfer electric power will be known to be an electrical type of switch and if used with a steam system to transfer steam power will be known to be a gaseous type of switch, e.g. valve. The teachings herein with respect to the preferred embodiment of electrical systems will nevertheless be understood to be applicable to other types of power systems.

FIG. 2 shows a simplified diagram of a prior art backup generator system of the type the preferred embodiment of the invention may be used with. Electrical power from power grid 12 is normally supplied via transfer switch 15a and main load panel 15b and load sub panel 15c to a home which consists of a group of electrical loads consisting of an oven 16, clothes dryer 17, air conditioner 18, selected lights 19 and selected miscellaneous load items 20. It is noted that the load 19 labeled lights is intended to represent high priority loads which are desired to always be connected to the power source including for example security lights, high priority lights, food storage appliances such as freezers and refrigerators, various alarms including intrusion and fire alarms, etc. A generator and transfer switch controller 14 is responsive to the grid power to control the setting of the transfer switch 15a to select either grid power 12 or generator power 13 to power the home, and to start and stop the generator 13 as needed. As is conventional in the art, transfer switch 15a is a break before make switch to prevent it from simultaneously connecting both inputs (on the left) to the output (on the right) while switching and is shown with a dashed line connecting the moving portion, which will be referred to herein as the swinger, to communicate with 14 to indicate that the switch is controlled by 14. Practical devices called transfer switches incorporate both 15a and 14, and sometimes 15b and/or 15c in a single metal enclosure. It is noted that FIG. 2 is a simplification for purposes of explanation of operation and one of ordinary skill will know that in practice prior art transfer switch 15a, panels 15b and 15c and the controlling mechanism will be much more elaborate and may incorporate solenoids, relays and multiple sets of contacts as well as mechanical safety and lockout features.

While FIG. 2 shows a direct connection from the power grid 12 to the transfer switch 15a, it is common that that connection is taken from the main panel 15b which will include a power meter, circuit breakers and possibly other circuitry. Typical maximum service ratings for homes are set by the size of the wiring from the grid to the home and typically rated at 100, 200 or 400 amps depending on the size of the home. Similarly, the generator connection via the transfer switch 15a and sub panel 15c will have a maximum rating, and the generator has a circuit breaker to prevent the total of the loads being powered from exceeding that maximum rating. Typical maximum ratings for backup generators are often substantially less than the service rating for the grid connection. To prevent the generator from being overloaded backup systems often include the distribution sub panel 15c and only high priority and low current loads such as 19 and 20 which are needed whenever the power is lost and whether the home is occupied or not are connected to that sub panel and powered by the backup generator. The rest of the high current loads which the generator is not capable of powering are connected to the main panel 15b and remain unpowered while the grid power is off and the backup generator is running. While transfer switch 15a, main panel 15b and sub panel 15c are individually shown in FIG. 2, for purposes of simplifying the descriptions below main panel 15b and sub panel 15c will not be shown and the transfer switch will be labeled as 15. One of ordinary skill will know that one or more distribution panel will be required for the systems described, even though they are not shown in the drawings.

Power grid is used herein in its common and ordinary meaning and refers to any commonly known and used sources of electrical power to homes and businesses, e.g. public and private electric utility companies. While such companies normally are part of a continent wide interconnection of power companies, that does not need to be the case. Further, while the preferred embodiment of the invention described herein with respect to a system having a power grid connection, it may also be practiced with only one power source such as generator 13, or with a plurality of power sources with none of them being a power grid. Such embodiments will find particular use where no power grid is available or is not desired to be used such as in transportation vehicles, mobile or remotely located applications.

Electrical device (or load) names oven, clothes dryer, air conditioner and lights are used in their common and ordinary meaning e.g. electrically powered devices found in the home. The miscellaneous electrically powered devices (or loads) found in the home, include but are not limited to entertainment devices, appliances and other modern, electrically powered conveniences. It will be understood that load devices are used herein by way of example and it will be understood by one of ordinary skill that the inventive teachings herein will apply to other devices as well.

Generator 13 usually includes a rotating power source, typically an internal combustion engine powered by a liquid or gaseous fuel, or a turbine powered by steam or water power, an electric motor powered by storage batteries, a flywheel powered by stored energy, a hydraulic motor powered by a compressed gas or a fluid stored with potential energy, or numerous other types of rotating power sources which convert mechanically or chemically stored energy to mechanical rotation as is known to one of ordinary skill. In addition, the rotating power source is typically coupled to an AC alternator (as compared to a DC generator) to provide AC power of the same voltage and phase configuration as that received from the power grid. In the U.S. the common power for homes is 240 volts single phase and will often be used in the examples of the Figures but it will be understood by one of ordinary skill that the invention may be utilized with many other power configurations.

The transfer switch 15 and the generator and transfer switch controller 14 are also somewhat simply referred to in these teachings. The transfer switch transfers power from the generator to the loads in the house in place of the failed grid power. The generator and transfer switch controller 14 controls starting and stopping of the generator and the position of the transfer switch. These elements are divided in this manner for ease of understanding the prior art and the present invention. This usage is somewhat different from the common use of these names in the art, wherein transfer switch generally refers to a device incorporating the generator and transfer switch control circuitry 14 (and often other circuitry) as well as the switch 15a to transfer the load from one power source to the other. In some instances, such as the previously mentioned Generac device, one or more additional switches are included to disconnect low priority loads during generator use. For ease of understanding the present invention these are all simply referred to herein as transfer switch numbered 15, and the controls for the switch and generator (and possibly other devices) are numbered 14.

Some backup systems operate to supplement power supplied by the power grid during heavy peak usage times such as very hot summer afternoons when the power grid approaches its maximum capability due to widespread use of air conditioning. In these instances, the grid power may still be available but the generator is used to power some or all of the house loads, or the generator power may be synchronized to and paralleled with the power grid to provide part or all of the power to the house loads. When the house load is very small such paralleled generators may feed power back into the grid to in effect sell power to the utility company by causing the power meter to run backwards. These operations require a more complex control, transfer switch and generator operation than shown in FIG. 2. The inventive concepts disclosed herein will also be useful in such systems. It will be recognized however that in such paralleled systems when the power grid fails it is important to disconnect the power grid from the generator in order to prevent damage to the generator or possible harm to workers who are repairing the grid failure.

FIG. 1 shows an abbreviated flow chart of the decision making process of the generator and transfer switch controller 14. Processing steps are represented by rectangles, input/output steps by parallelograms, conditional or decision steps are represented by diamonds and flow directions are shown by arrows. Basically, the flow chart operates to start the generator and move the transfer switch to the generator when the grid power fails. The decision making starts at start 1, followed by sensing the grid power 2 to obtain information about the quality of the power, followed by a decision step 3 to decide if the quality of the grid power is sufficient (e.g. the power is on and within the range of expected voltage). If the power is on a next decision step 4 is entered to determine if transfer switch 15 is in the position to supply grid power to the home, if so, the decision making returns to 2 and if not the transfer switch 15 is moved to the grid power position in 6. The loop normally remains in operation until the grid power goes off causing the timer off step 5 to be entered from decision 3.

If the grid power remains off for 5 seconds the process continues to the generator running decision 7. If the generator is not running it is started in 8 and another 5 second delay 10 is entered. At the end of the 5 second delay the process returns to the input of 7 to verify that the generator is running, if not another start is performed and if the generator is then running the process continues to check the transfer switch position in 9. If the transfer switch is in the position to provide generator power to the house the process returns to 2 to continue sensing grid power to see if it has returned to normal, and if the transfer switch is not in the position to power the house from the generator it is switched in step 11 and then the process returns to wait for sensing the return of grid power 2.

Compared to an actual prior art device the flow shown in FIG. 1 and accompanying description above is greatly simplified for convenience of understanding the basic operation of the system of FIG. 2. For example, for simplicity no step to stop the generator is shown, nor is the exit from 5 shown if power does not stay off for 5 seconds. Many additional steps, checks and considerations are usually found in commercially available systems to recognize and accommodate the many possible modes of short and long term power failure and to protect the generator. Such steps include for example a periodic (e.g. once a week) start and exercise of the generator and transfer switch to improve reliability and a delay in shutting down a generator which has been running in order to allow it to cool down without a load being applied. The timers 5 and 10 are greatly simplified and usually involve many other decision making subroutines and branches to avoid false starts of the generator during momentary power glitches and to allow the generator to attain proper speed, corresponding to proper AC power frequency and voltage, before confirming that it is running.

It will be understood from the description of FIGS. 1 and 2 that when power from the power grid is lost, the generator 13 is started and when it is operational the transfer switch 15 is moved so the power from 13 is coupled to the loads 16-20. Importantly, the generator 13 must be designed so that it is capable of powering all of those loads when they are simultaneously turned on, otherwise the generator will be overloaded and its internal circuit breaker will trip. In extreme cases of overloading the generator may be damaged before the internal circuit breaker can trip. Often generators are intentionally designed to only provide power to handle a part of the total load, and the occupants of the house must remember not to turn on certain large loads, for example the air conditioner and oven, which would cause an overload. In addition, if those large loads are on at the time when power is lost, the occupants must quickly turn them off before the generator is started and transfer switch moved to prevent an overload. This all presents a substantial possibility of generator damage resulting from human error.

FIG. 3 is a simplified example of an improved prior art version of the backup system in FIG. 2 which provides power to a group of loads, including a set of uncontrolled loads and a set of controlled loads which may be simultaneously switched off if the generator becomes overloaded. After the controlled loads are simultaneously switched off, they may then be automatically (and blindly) switched on in a sequential fashion according to priority, each additional load being switched a time period (e.g. 3 minutes) after the previous one. The previously mentioned Generac Nexus LTS Load Shed system is representative of a system of this type. FIG. 3 additionally includes load managers 14a which are contactors to switch the high current load on and off in response to a control signal. A contactor is essentially a high current relay which switches the load completely on or off. Contactors may be mechanical with movable parts or solid state with electrically controlled switches. The Generac DLM Load Control is a contactor of this type with a control input which is wired to and controlled by the Generac Nexus system. If during the reconnection sequence a certain priority load again overloads the generator (e.g. it is blindly switched on without knowing if it will again cause an overload), that load and all lower priority loads are disconnected for a period of time (e.g. 30 minutes) before the connection is tried again. When grid power is available the generator & transfer switch controller 14 operates (via control signal connections shown by arrowed lines) all of the load managers 14a connect their respective loads.

When the generator is running, the generator & transfer switch controller 14 operates to detect that the generator 13 is overloaded (by sensing the frequency of the AC power produced by the generator) and causes all of the load managers 14a to simultaneously disconnect their respective loads from the generator. Shedding the nonessential circuits when the generator is overloaded helps protect the generator of FIG. 3 as compared to the system of FIG. 2, however there are shortcomings in this approach. For example, by detecting the power frequency the generator must already be overloaded to the point of not being able to supply enough rotating torque to the alternator to maintain proper speed. Short term speed variations resulting from momentary loads such as electric motor starting currents must also be accommodated. Most generators can handle significant excessive output currents for short periods of time and that is useful in providing large starting currents for motors, for example such as those required for starting air conditioner compressors. These large starting currents normally go away after a few seconds when the motor armature and its mechanical load have been accelerated to operating speed. Additionally, as will be recognized from the teachings herein, in some circumstances which will be described more fully below, it is unnecessary to simultaneously disconnect all of the low priority loads or to blindly reconnect them.

Accommodating such momentary high currents is common in the circuit breaker art, where circuit breakers are designed to trip according to a programmed load vs. time curve. For example, a particular 10 amp breaker will trip with a 12 amp load after 30 seconds, may support a 15 amp load without tripping for 5 seconds, but will trip very quickly with a 20 amp load. Various thermal and magnetic technologies are utilized for such circuit breakers. For example, a bimetallic strip may be used to trip with slightly high currents after those currents have persisted for enough time to cause the strip to heat and bend whereas an electromagnet is used to quickly pull a latch to disconnect for large currents. A generator will often have such a circuit breaker installed for protection. It is important that loads presented to the generator do not exceed the circuit breaker's load vs. time curve causing it to trip. Most such circuit breakers used in backup generators for homes and small businesses have to be manually reset.

The use of AC power frequency detection for control of load shedding is problematic. If the frequency detection is too sensitive unneeded shedding may occur, or if it is not sensitive enough, slow or no load shedding may occur with the possible result of the generator's circuit breaker tripping thus removing all power. A one size fits all frequency threshold used to cause complete disconnect of the load from the generator may allow overheating or other damage to the generator 13 under some combination of time and load conditions. It is preferred that the present invention control of the load shedding be designed to accommodate varying loads of connected loads, determine if a load can be safely powered before the load is connected and otherwise operate such that it prevents an overload from happening, rather than attempting to detect and cure the overload after it has happened.

Another problem occurs when the transfer switch first switches from the power grid to the generator with too many loads connected. A similar condition exists when a connected load instantly or quickly increases its individual load causing the total generator load to exceed the generator's capability. In such situations if the generator has been sized such that it can not simultaneously power all of the loads which are connected, it will immediately go into overload. Depending on how fast the detection of the condition and disconnect of the loads takes the overload condition can continue for several seconds, or possibly even minutes. Most generators are designed to accept an instant 0 to 100% of its rated load change without damage (although not without serious speed and voltage fluctuations), however they may not be designed to accept an instant 0 to overload condition change which can happen when switching from grid to generator power, or a partial to overload condition which can happen when a connected load suddenly changes. Such overload conditions may damage the generator or, as with any closed loop system, cause the generator to become unstable, possibly even going into speed and/or power output oscillations if proper linearity and/or damping does not exist to make the loop stable for that overload condition.

The following FIGS. 4-23 are simplified diagrams given by way of example to enable one of ordinary skill to understand and practice the invention in small backup power systems, defined herein as those used for an individual home or business with a single or multiple phase service connection of 440 volts or less and single meter service connection of 400 amps or less, or with separately metered normal and a time of service connections which total 800 amps or less. It is often desirable to utilize a backup generator which is only capable of providing power for part of the maximum possible load which can be presented. In respect to FIGS. 4-23 the following brief descriptions will be useful. More detailed descriptions of these and other elements will be understood from the teachings below.

Environmental, User & Misc. Devices 21. User interface, e.g. an iPad or computer type display with interactive software, Environmental Sensors e.g. for home & outdoor such as temperature, sunlight, humidity, wind, generator operating conditions, Misc. Devices e.g. vehicle and battery sensors (e.g. usage time and distances, charge, temperature) appliance sensors (e.g. wine cooler, freezer and oven temperature), vehicle battery charger and battery, communications (e.g. telephone, internet, wireless, alarm), motion sensors to detect when areas of the property, particular rooms, or the home are vacant or occupied.

Power Source Monitor 49 and load control processor 25*b*. The Power Source Monitor is preferred to be a separate module because of its need to monitor the power source(s) outside the home but may be part of the load control processor. The Power Source Monitor may be installed at the backup power source and monitors its operating parameters and conditions which may affect its operation, for example such as ambient temperature. The load control processor is the computing unit of the system and may be part of the user interface (e.g. iPad) which is preferred to be located in the home but may also be part of other equipment. The load control processor receives information about the various components of the system, receives user input, inputs from various monitors and sensors (including a time clock) and controls the Transfer Switch, Generator and Loads according to various pre-programmed parameters and those inputs.

Load Modules 43, 22*b*, 22*c*. Modules which communicate with the load control processor and which may provide information about the load, the load's environment and/or operate to permit control of the load. Load Modules include Load Limit Modules and Load Switch Modules.

Load Limit Module 43. Load limit modules limit the load presented by various devices by e.g. current limiting, power factor adjustment and/or time modulation of current. Load Limit Modules may include load condition sensors such as voltage, current and power factor sensors and the type of load operation for communication to the load control processor.

Load Switch Module 22*b*, 22*c*. Load Switch Modules switch power to loads on and off. Load Switch Modules may include load condition sensors such as current sensors and the type of load operation for communication to the load control processor.

Controllable Load(s) 48. These are loads which may be controlled directly without the need for a Load Module. Examples include electronically controlled devices such as heating and air conditioning systems, vehicle battery chargers, light dimmers & remotely controlled lights and internet and wirelessly controlled appliances.

Communications between the various system components 27, 28, 45, 46 may be wired or wireless. For ease of installation are preferred to be via bidirectional wireless data links, for example such as via IEEE Std. 802.1x. For those elements which communicate in one direction the associated receiver or transmitter circuitry may be omitted.

It will be understood that many elements that are necessary for an actual system have been omitted as they will be readily known to the person of ordinary skill from the present teachings. Additionally, many inventive features and elements which are described with respect to one Figure will not be shown in another Figure but it will be recognized from the teachings herein that such omitted features and elements may still be incorporated.

Figure 4:
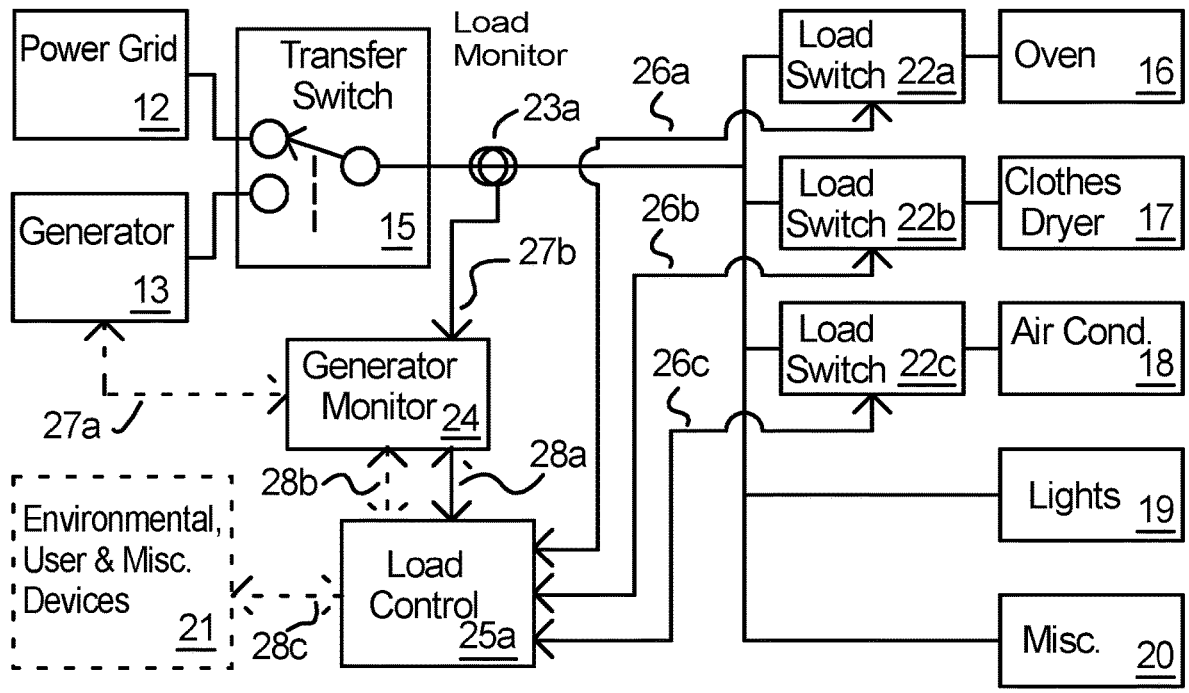
FIG. 4 shows a simplified circuit diagram of a power backup system which incorporates a first embodiment of the present invention, the system having power grid 12, generator 13, transfer switch 15, loads 16-20, optional environmental, user & misc. sensors 21, load switches 22a-22c, load monitor 23a, generator monitor 24, load control 25a and communications links 26a-26c, 27b and 28a and optional communications links 27a, 28b and 28c.

FIG. 4 shows a simplified diagram of the preferred embodiment of the invention in which the power grid 12 or a generator 13 may power a group of loads including set of uncontrolled loads and a set of individually switched loads. The invention may be utilized with the power grid alone, the generator alone, both, or with the generator serving as a backup during power grid failure. Heretofore overloads of the power grid service has typically been addressed by making the service, transfer switch and distribution panel(s) large enough to handle the maximum load that can occur. While that approach works well it is nevertheless expensive due to increased equipment costs and may become unworkable in the future. For consumers wishing to purchase electric and hybrid vehicles, having to upgrade their existing electric service to accommodate one or two vehicles and their associated high current chargers operating at the same time is an additional and costly consideration for such a purchase. In some instances, the public utility may not be able to provide enough power via the existing grid to upgrade existing service and provide new service to everyone desiring such capability. Accordingly, while using large service connections has worked well in the past, with the demand created by electric and hybrid vehicles the utility may not allow larger capability service which effectively prevents overload from being used.

As an example, consider a family that wishes to purchase two new electric vehicles of the kind that could each use a 90 amp 240 volt charger circuit. If both drivers work during the day and wish to charge their vehicles when they come home from work that presents a substantial load to the electric service. Two of these circuits added to an existing 100 amp service would trip the service breaker if both chargers were simultaneously used. If only one charger was used any other high power load such as an electric stove or oven or air conditioner would trip the service breaker. Similar problems would exist for a 200 amp service. Upgrading to a 400 amp service would be costly, and might not even be possible if the utility company does not have an adequate transformer and grid wiring to the house. The present invention will operate to intelligently manage the loads and prevent tripping the service breaker while at the same time allowing the family to set priorities for the use of power that can be safely delivered.

It is desired that the invention operates to ensure that the loads are controlled so that they do not overload the power grid service connection when power is provided by the power grid, or overload the generator when power is provided by the generator. One of the inventive features of the invention is that it may be determined whether or not an overload will occur, or is likely to occur at the time of connection or subsequently during that connection, before a load is connected. The inventive features of the preferred embodiment are described herein primarily in respect to preventing overloads of the generator 13 but it will be understood from these teachings that the invention may operate as well to prevent overloads to the power grid service connection. This feature of the invention will not only reduce possible damage or circuit breaker tripping during generator operation but will also reduce possible damage or circuit breaker tripping during power grid operation.

FIG. 4 has the same power grid 12, generator 13, transfer switch 15 and loads 16-20 as with FIGS. 2 and 3. Generator and transfer switch controller 14 is not shown in FIG. 4 for simplicity, however it is preferred that load control 25a communicates with either the 14 or 15 in order to verify the position of the transfer switch. In addition, FIG. 4 shows load monitor 23a to monitor the load on the generator (which is also the power supplied by the generator) and the timely power output from the generator is conveyed to load monitor 25a via generator monitor 24. Load monitor 23a also provides timely power output from (e.g. provided via) the service connection and thus the load on the power grid, when the transfer switch is in the power grid position. In that the invention finds applicability for preventing overloads it will be understood that it may be utilized for any power source or combination of sources, including off grid systems such as remote terrestrial, aircraft, on and off road vehicles and marine applications with or without connection to the power grid.

It is preferred that the timely power output is an instantaneous measure of the current provided by the generator. Because most generators incorporate voltage sensing and correction circuitry, often by way of controlling the power applied to the exciter winding in the alternator, the output voltage is maintained nearly constant. Of course, the voltage (and power factor if desired) may be measured and utilized as well. By knowing the output voltage of the generator is being held to a constant value, for example 240 volts in a single phase output, by measuring or sensing the instantaneous current flowing from the generator, an instantaneous measure of the output power may be had. It may also be desirable to utilize a measure which is not instantaneous. Examples of some non instantaneous measures include an average over time, a time related measure of output power, a measurement with reduced noise, an approximation of the average load provided to the generator, to provide a measure of the resulting heating of the alternator or engine, to provide a measure of fuel consumption by the generator, to provide a measure of the power consumption by the load(s).

A generator monitor 24 receives data from load monitor 23a and communicates that load information to a load control 25a via communications link 28a. It is noted that load monitor 23a may be located in the circuit input to (to the left of) the transfer switch 15 in order to monitor the load only when power is provided by the generator. Monitoring the output of the transfer switch is preferred e.g. it is useful for characterizing load parameters e.g. current or wattage consumption, as individual loads are turned on and off (or turn on and off on their own) at any time, and for controlling the load presented to the grid so as not to exceed the service connection capability as will be explained below.

FIG. 4 also shows load switch 22a is responsive to load control 25a via communications link 26a and operable to connect and disconnect oven 16 from power coming from the transfer switch, load switch 22b via communications link 26b is operative to connect and disconnect the clothes dryer 17 and load switch 22c via communications link 26c is operative to connect and disconnect the air conditioner 18. It will be understood from the teachings of the present invention that one or more load switch 22 may be removed (for controllable devices or high priority devices as described herein) or replaced with a load control 43 or other types of control devices as will be described in more detail with respect to FIGS. 6-9. While load switches 22 have been described as being responsive to load control 25a, it will be preferred that they also include bidirectional communications capability in order that load control 25a may determine and/or verify the state of the switch (e.g. open, closed, dropped or other information) and further it is preferred that the switch include other functions as will be discussed below. In addition, it will be understood that load switches may be operated without a separate load control 25a, as that function may be incorporated within the load switch 22 (or load limit 23).

As used herein, communications and communications link are meant to encompass the conveyance of information from one point to another by one or a plurality of electronic circuits and may be the same or different for each type of information and each type of connection as desired. The communications links may be of any type suitable for communicating the particular information desired over the desired distance at an adequate speed and resolution with necessary reliability and may be continuous or not in order to fit a particular application of the invention. The information may be in, and may be communicated in, any suitable form, or forms e.g. analog, digital, optical, magnetic, electromagnetic waves, wired or wireless and may be communicated in single direction, bidirectional, singular or redundant form, and the communication may use handshaking, networking or broadcasting, may be multiplexed in any fashion, networked, daisy chained, point to point or otherwise as desired to fit a particular embodiment of the invention. For example, if wired communications links are desired, RS-232, IEEE 1901 or USB may be used or for wireless ZigBee, IEEE 802.1×, Bluetooth, or Wi-Fi may be used, all being well known to one of ordinary skill. The communications may be simply contained within a dedicated implementation of the invention or may utilize a network covering a larger area for communications, for example via the internet. The invention described herein and/or its communications circuits may be shared or included in other systems and devices such as for example a home control system. Communications theory is a broad but well known field of art readily available to one of ordinary skill wishing to practice the invention, accordingly the communications links will not be discussed extensively herein.

Communications between the load control 25a and load switches 22a-22c (or load control 43 described below) are provided by communications links 26a, 26b and 26c respectively. In addition, communications between load monitor 23a and generator monitor 24 is provided by communications link 27b. Communications between generator monitor 24 and load control 25a is provided by communications link 28a. Additionally optional communications link 27a may be provided between generator 13 and generator monitor 24, and additional communications may be provided by optional communications link 28b between generator monitor 24 and load control 25a. These communications links are preferred to be utilized to provide generator monitor 24 and load control 25a with, inter alia, additional information about the operation of generator 13 and to communicate back to generator 13 and generator monitor 24. Various parameters of the connected devices may be communicated to load control 25a as well.

Many prior art generator systems incorporate digital engine and alternator control systems which incorporate monitoring of the performance of the generator. Such monitoring includes determining the engine and alternator temperature, engine overload, voltage output, RPM, AC power frequency, current and power output for each leg of the alternator, total current output from the alternator, power factor, and percent of true total available power being supplied to the load. These control systems often further include over current warning, under frequency warning and overload warning (by measure of current and/or frequency). In many systems it is desirable to communicate with these control systems to provide some or all of the monitoring information and device parameters to the load control 15 for use in its load connection and other decision making. A load shed signal, responsive to a low frequency or over current condition or both, indicates the generator is overloaded, is also available on some systems. Assuming adequate information about the operation of the generator is available directly from the engine and alternator control systems, that information may be coupled directly to power frequency control 25*a* via a communications link (not shown) making load monitor 23*a*, generator monitor 24 and their communications links redundant in respect to monitoring the generator so that they may be eliminated in that respect. Load monitor 23*a* is still desirable for use to characterize loads and for timely monitoring of the load presented to the power grid, which is also the timely power output from the service connection, as previously discussed. In the instance where the power grid output is desired, 23*a* may be located at any point on the power grid circuit, such as the input or output of the transfer switch 15.

It is preferred that load control 25*a* operate to provide power, either directly or indirectly e.g. via generator monitor 24, to all of the devices to which it is connected for purposes of communications and/or sensing operation. It is also preferred that load control 25*a* (as well as the devices with which it communicates wirelessly) include its own backup power source, such as a rechargeable battery, in order that it and the devices with which it communicates may continue to operate without interruption whenever its primary power source fails such as during the time interval between the failure of power from the power grid and the supply of power backup power from the generator. Of course, for wireless communication links it is preferable that the various wireless devices have their own power source(s), including backup if the device is critical to operation during outages of that source.

One or more optional additional communication link(s) shown in FIG. 4 by 28*c*, may be provided between load control 25*a* and other optional devices such as sensors, information sources, displays, feedback, etc. shown as environmental, user and misc, devices 21. The display and feedback elements used in respect to the user may be combined if desired, for example such as with a touchscreen. These devices can include various sensors, for example such as temperature sensors to monitor outside temperature useful in controlling air conditioner operation, engine or alternator cooling air inlet or exhaust temperature useful in determining genset load, refrigerator or freezer temperature to determine if additional cooling is needed. The sensors for example may be utilized by 25*a* in the setting of priorities for loads to be connected to the generator. Such devices are desired to communicate with the load control as will be described further by way of example below.

Sensors and other components suitable for interface with the processor of 25 and/or use in practicing the invention are available from Analog Devices of Norwood Mass., Texas Instruments of Dallas Tex., National Semiconductor of Santa Clara, Calif., Sensirion of Westlake Village, Calif. and many other suppliers as will be known to the person of ordinary skill from the present teachings. Additionally, the load control of the invention herein may communicate with other devices or services within or outside of the home area such as via telephone, internet, long distance wireless and the like e.g. in order to provide and receive information as well as handle and generate requests regarding power consumption, the devices which are connected, available for connection and the like, as will be described in more detail below.

Figure 5:
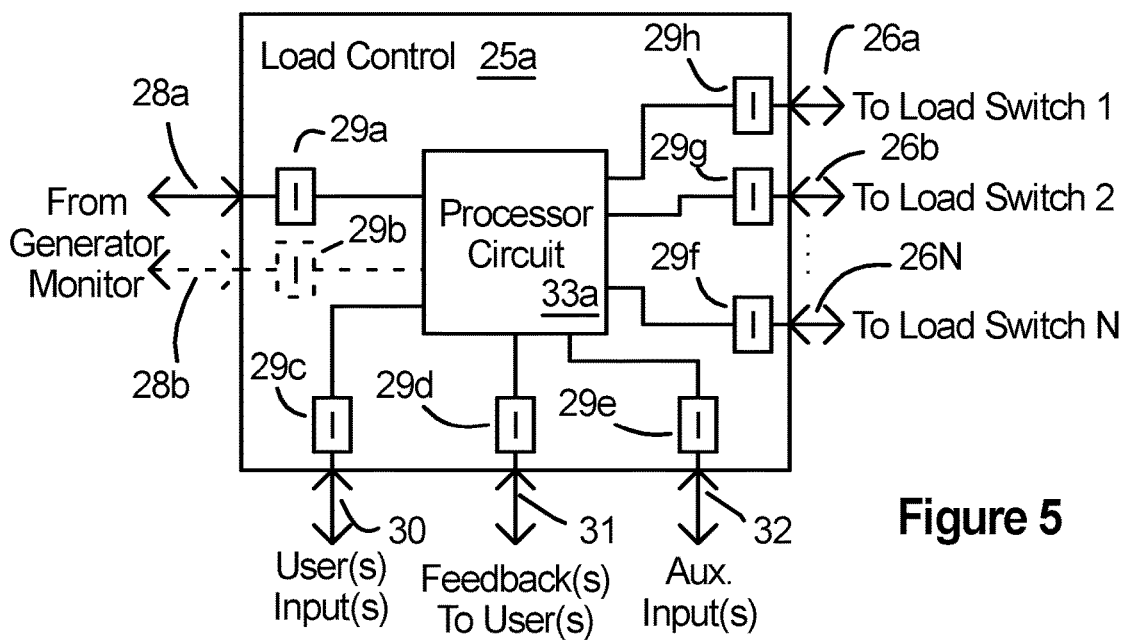

Generally, the communications links which are considered desirable to practice the preferred embodiment (i.e. the best mode) of the invention are shown in FIGS. 4 and 5 with solid lines with solid arrows showing the primary direction of communications. For example, the load information from load monitor 23*a* is communicated to load control 25*a* by communications link 27*b* which is shown in a solid line with a solid arrow. Additional communications which may be desirable to practice advanced features of the invention are shown with dashed lines and arrows, for example the environmental, user and miscellaneous devices 21 communicating with load control 25*a*.

Load switches 22*a*-22*c* are preferred to be of a latching, dropout type which will automatically open circuit when power to the load switch (from transfer switch 15) is lost and thereafter and must be subsequently directed to close their circuit (after generator power is available via transfer switch 15) to provide power to the load. Accordingly, when power from the power grid is lost the load switches 22*a*-22*c* will switch to open circuit and remain in that state until they are closed by load control 25*a* thus preventing a generator overload when the transfer switch selects the generator output. Other switch types, or load control circuits, e.g. such as 43, or load controls, discussed below, may be utilized as well as will be known to person of ordinary skill from the teachings herein. Additionally, while the load switches 22*a*-22*c* and load control 43 below are shown as separate units they may be combined with, or incorporated in the transfer switch or its control or in particular loads. The parts or all of the invention are also suitable for being combined with or incorporated in the generator, and may also include transfer switch control and/or transfer switch as will be known to one of ordinary skill from the teachings herein.

After a grid power loss, the generator 13 will be started and transfer switch 15 will be switched to couple generator power to the house under control of the generator and transfer switch controller 14 (not shown in FIG. 4). At this time load monitor 23*a* will operate to measure the electrical load presented to the generator by the house, which at this point of this explanation is the load presented by the lights 19 and miscellaneous loads 20 since load switches 22*a*-22*c* are preferred to have switched, and remain open when grid power was lost and thereafter until turned on. Accordingly, 23*a* provides the timely power output of the generator.

Because the voltage out of the generator is known, for example 240 volts, the load monitor 23*a* may simply be a current sense coil, inductor, transformer, sensor or integrated circuit which provides an analog voltage output that is proportional to the electrical current supplied to the loads by the generator. Rogowski coils such as that described in U.S. Pat. No. 6,313,623 to Kojovic et al. are particularly useful in that they can respond to fast changing currents and are not prone to saturation as are iron core transformers and coils and are reasonably immune to electromagnetic interference. The output of 23*a* is coupled to generator monitor 24 where it is preferred to be converted to digital with the digital value of the current being coupled to load control 25*a* via communications channel 28*a*. Various other types of known load monitors are readily available and may be utilized and coupled to load control 25*a* as will be apparent to one of ordinary skill from the teachings herein.

As previously described, load (and other generator) information may be taken directly from the generator. For example, the aforementioned Cummins model GGHE generator includes their PowerCommand control module which provides a wealth of information about the operation of the engine and alternator over RS-232 and other communications links. Many other generator manufacturers provide similar modules and functionality. It should be kept in mind however that the information provided by these modules may not always be accurate due to cost savings and tolerances. For example, an overload indication may respond only to electric power output but not measure engine or alternator temperature. If the generator is operated at significant altitude, or on a hot and humid day, the cooling system may not be able to prevent an over temperature type of overload from occurring even though the power output is otherwise below that which would generate an overload signal. Accordingly, it is desirable that load control 25*a* be capable of sensing several parameters of the generator, and that it may be programmed or otherwise set to operate in response to those parameters and the particular generator and environment.

Load Monitor 23*a* may be used to determine the actual kilowatt output by measuring both voltage and current and may also be used to determine the power factor (the ratio of active power to the arithmetic apparent power) of power being supplied to the load. Calculations may be performed in load monitor 23*a*, or generator monitor 24 or load control 25*a* as desired, however in this example it is preferred that 23*a* sense active and apparent power by sensing or measuring the present voltage and current in real time (or near real time), transmit those values to generator monitor 24 in real time (or near real time) where they are converted to digital in near real time with the digital values being communicated to load control 25*a* in near real time where the calculations of power factor and load are performed. By using real time or near real time values of voltage and current the relative phase of the two is preserved and that phase information can be used in the calculations to timely determine the power output of the generator which is used to determine the available power for other loads. As used herein, timely will be used to mean instant, real time, close to real time or a suitable time. In particular timely voltage, current, wattage, power or other quantity or parameter will mean the quantity of, or value representing the quantity of, the parameter existing at a time which is suitable to be useful in the operation of the invention. For example, timely voltage output or power output values may be measured and transmitted to the load control with some time delay which delay is not long enough to impair the proper operation of the load control.

For this explanation, load control 25*a* will be assumed to know at least one maximum output power parameter e.g. maximum wattage or current of generator 13 (or a plurality of parameters e.g. its maximum output current vs. time capability). The maximum output power parameter is compared against the actual output at the time as measured by 23*a* and the remaining available power at the time is then calculated. Other parameters may be utilized to determine the projected power available at a future time or over a future time period may also be calculated. It is also desired that the power parameters e.g. initial current requirements and current vs. time curve(s) of each load 16-18 are known to the load control 25*a*. It is desired that each of the loads 16-18 has associated with it one or more known priority parameter(s). As used herein, know and known mean to have been previously stored in a memory and available e.g. having been previously manufactured with, programmed with or measured. All such parameters are preferred to be manually or automatically changeable as will be described below. In reality it may be that one or more parameters is not know at the time and must be determined or estimated as will be described further below.

After generator power is made available via the transfer switch, load control 25*a* operates to determine if the highest priority load 16-18 can be supported by the available power of generator 13 and if so load control 25*a* causes the load switch associated with that load to be closed via commands conveyed to the switch by its corresponding communications channel Next load control 25*a* operates in response to the new power measurement from 23*a* to determine if the next highest priority load 16-18 can be supported by the available power from the generator. If so that load is connected by command sent via its switch's corresponding communications channel. Likewise, the third priority load requirement (in this case the last load of the three) is checked against available generator power and the load connected if sufficient power available. While only three controlled loads are shown in FIG. 4, it will be known from the present teachings that the number of loads which may be controlled is not so limited and additional controlled loads and corresponding communication links (e.g. 26*d*-26N) may be utilized. In the event one or more of the loads cannot be connected because of insufficient available power from the generator, the load control 25*a* will periodically compare the available power supplied by the generator to the power required by the load and if possible, connect the load. It may be that available power for a load results from one or more previously connected loads no longer requiring power, for example the clothes dryer is finished and that load may be disconnected to prevent it from being turned on and creating an overload. Or, the air conditioner may require less power to run because outside air has cooled and that additional information may be utilized by load control 25*a* to determine it is safe to connect another load.

Load control 25*a* is preferred to operate in substantially continuous mode to constantly compute load requirements and generator capabilities to connect and disconnect loads according to priorities as a result of changing loads and priorities. Lower priority loads may be disconnected to accommodate higher priority loads. Environmental, user and other parameters may be utilized by load control 25 in order to determine that it is safe (or that there is a high probability that it is safe) to connect a particular load. It is preferred that load control 25*a* ensure that loads such as air conditioners which should not be cycled too quickly remain disconnected and/or remain connected for appropriate amounts of time. Load control 25*a* also monitors the generator 13 for overloads, and other parameters such as minor equipment failures such as slight overheating and chooses which loads to disconnect, or in the event of a significant failure may change the transfer switch 15 back to the grid power position (even though there is no grid power). Of course, load control 25*a* will monitor grid power and change the transfer switch 15 back to the grid power position when power returns, meets expected parameters and is expected to continue meeting those parameters. It is preferred that after the transfer switch returns to grid power that loads are reconnected one at a time in order to prevent a large instantaneous power demand surge.

Although continuous operation is preferred, the invention may be practiced with other types of operation as well, especially when power consumption of the load control is intended to be kept to a minimum. It may be operated at periodic intervals or may be caused to operate only when one or more parameter of the system changes appreciably. In one alternative, load control 25a may operate in a low power standby mode, only checking for the presence of power from power grid 12 and remain in standby as long as grid power is present, but change to a more active or fully active mode if grid power experiences problems such a fluctuations in voltage or frequency (outside of expected parameters), or failure.

It will be appreciated from these teachings that load changes on the generator 13 may occur during operation because the switched loads 16-18 (if connected) or the unswitched loads 19 and 20 may change, and those changes may be communicated by the generator monitor 24 via 27b or otherwise to provide data via generator monitor 24 to load control 25a which may use this data to characterize and store load characteristics. For example, if a request is made of load control 25a to turn on clothes dryer 17 via load switch 22b, the change in current sensed by load monitor 27b over the next few minutes can be stored and used as some of the parameters, e.g. starting and current after initial warm up, for that load. In this fashion unknown parameters may be determined or estimated and known parameters may be updated. While this type of measurement might be interfered with by other loads changing, if several consistent measurements and some inconsistent measurements are made for a number of dryer requests, it is probable that the consistent measurements are reasonably accurate. The consistent and inconsistent measurements may be determined by correlation or other statistical matching techniques. The consistent measurements may then be averaged to remove small variations due to dryer load, ambient temperature and other such changes. Of course, more accurate measurements may be made by directly monitoring the dryer load as will be discussed below.

FIG. 5 shows a more detailed diagram of load control 25a. Communication links provide for communications between a processor circuit 33a and various devices as discussed herein. Load control 25a contains interface circuits 29a-29h to interface communications channels 28a, 28b (optional), 30, 31, 32 and 26a-26N to a processor circuit 33a.

The processor circuit will include a processor, e.g. a digital machine performing logic, computing and/or program execution operations which machine accepts data and runs (i.e. executes) logic operations, computing operations and/or program steps to produce results. The processor circuit will also include supporting circuitry to facilitate the processor accepting data, executing one or more logic operations, computing operations and/or program(s), produce and utilize the necessary results and communicate with other components and devices. The processor circuit and its various elements may be of any of the types suitable for performing the various desired ones of control, monitoring, storage, communications, calculation and decision making operations described herein which are necessary to implement a particular version of the invention. The processor circuit may be implemented with any type(s) of circuit devices currently known or which will become to be known in the electronic control systems art including but not limited to analog and digital circuits, LSI, VLSI, ASIC, PLD, CPLD, FPGA, DSP, IP Core, Array, microcontroller, microprocessor, Multicomputer, RISC or CPU integrated circuits.

Processor circuit 33a may also include one or more interface circuits similar to 29 (thus eliminating one or more interface circuits 29 which are external to 33a). A particular processor circuit may be chosen for use in implementing the present invention by one of ordinary skill from the teachings herein in view of other considerations as well, e.g. power consumption, cost, complexity, ease of use, speed of operation and flexibility of operation. Examples of such computer circuits include PCs using Windows, Linux or other operating systems, Apple products such as iPhone, iPad, iPod, Android product such as the Asus Eee Pad tablet, various RISC, parallel microcomputer and embedded devices. While the processor circuit 33a has been described in the singular, it may be implemented by multiple circuits or devices as desired.

Communications links 26a-26N, 28a and 28b operate as described previously and in further detail below. Communication links 30, 31 and 32 (in FIG. 4 as part of 28c) communicate with one or more environmental, user and miscellaneous devices (shown in FIG. 4 as part of 21). Communication link 30 is used to supply data from a user input module(s) to processor circuit 33a of load control 25a and if desired communication link 31 operates to supply data from the processor circuit 33a of load control 25a to the same or different user module(s). It is of course possible that such data may be supplied by a single bidirectional communications link as indicated by the dashed arrow on 30 and 31. Data to and from other auxiliary devices may be communicated to and from processor circuit 33a of load control 25a by one or more communications link(s) 32 as will be discussed further below. Processor circuit 33a communicates via communications links 26a-26N to communicate with load switches or replacement devices 1-N respectively to cause loads to be connected to the power source (via transfer switch 15) and if desired to receive data from one or more load switches or replacement devices. It will be understood that the preferred embodiment of FIGS. 4 and 5 may utilize a particular processor circuit 33a, for example the Asus Eee Pad tablet wherein various other elements of FIGS. 4 and 5 are provided by 33a. In the present example all of the user inputs and feedback devices are preferred to be provided by the Asus Eee Pad touch screen and communications links 26a-26N, 28a, 28b and 32 being provided via its IEEE 802.11 and/or Bluetooth wireless communications capability.

As a simplified example to aid in understanding the operation of the load monitor and load control of the preferred embodiment, consider a generator which because of its existing load and internal temperature can provide 30 amps for up to 5 seconds and 20 amps for 5 minutes and 18 amps after 10 minutes. Now consider an air conditioner which requires 30 amps for 4 seconds to start, 20 amps to run after that for 1 minute and then increasing to 21 amps as the condenser coil heats thereby causing the head pressure and compressor current to increase. Starting the air conditioner and running it for 1 minute would be possible without overloading the generator. After 1 minute the condenser coil heats and the air conditioner would overload the generator by 1 amp and disconnecting it would be advisable. After 10 minutes the generator would be overloaded by 3 amps and would need to be disconnected because of the substantial overload of the generator. It is desirable that the load control also keep track of the operating characteristics of the other loads which are connected. By knowing the characteristics of the generator and load(s), the load control can make a decision of whether to connect the load, which in this example would not be advisable.

As a further example, add to the above example an ambient temperature monitor to provide an environmental parameter. Assume the load control 25a records a decrease of the ambient temperature due to cold rainfall with the internal temperature of the generator decreasing for a given load which in turn will allow a somewhat larger load to be accommodated. As used in this context records means to store a plurality of values of the same changing parameter, in this instance temperature, over a time period. The rainfall may also be sensed and recorded, For the air conditioner compressor a decreasing ambient temperature will lead to a reduced condenser coil temperature, decreased compressor head pressure and decreased compressor current draw. In this instance, depending on the rate of temperature drop, the expected increase of generator capacity and expected decrease of compressor current, it may be possible to predict that the air conditioner may be safely connected to the generator.

Adding a further environmental parameter to the example, it is likely that humidity will increase due to the rain and the higher humidity air will decrease the maximum torque output of the generator's motor. This additional environmental parameter may be sensed and recorded for utilization by the load control 25a in determining the maximum output power which will be available in the near future. Because humidity also affects the cooling of the condenser coil by airflow across the coil, this may be taken into account by load control 25a as well. It will be understood that timely determinations of generator maximum output power as well as load power consumption for a given load may be made by using various environmental parameters. It will be further understood that determinations of upcoming generator maximum output power as well as upcoming load power consumption for a given load may be made by using various changing environmental parameters, upcoming meaning over at least the next hour unless otherwise specified.

To continue the above example, consider the same generator capability as above, i.e. 30 amps for up to 5 seconds and 20 amps for 5 minutes and 18 amps after 10 minutes. Consider a different load, an oven which will draw 25 amps for 5 seconds, 20 amps decreasing to 15 amps over 3 minutes and 15 amps intermittently thereafter as the oven thermostat switches the heating element on and off. This load can be safely connected to the generator since it will not exceed the generator's capacity at any time.

Of course, in the above examples it is assumed that when a connection to the air conditioner or the oven is made that device will be in operation and will immediately begin loading the generator. It would be useful to know if each device would in fact be in operation or could be in operation at some time after connection. As an added factor in the decision making it would be useful to input the status of the device (e.g. on or off as a parameter), or otherwise determine the likelihood that the device would present a load if connected. This consideration relates to establishing a priority for a load, for example if the oven or the air conditioner is turned off then it would not present a significant load if it is connected. If the indoor or outdoor air temperature were low it is unlikely the air conditioner would present a load if connected. If the oven were operating before loss of grid power the thermostat will likely power the heating element when the oven is connected or within a few minutes thereafter. It is desirable for load control 25a to record and use these parameters in its load connection decision making.

As a further example of the operation of the load control 25a consider the priority of the loads. If the time of day (sunset) is after the normal time that dinner is prepared in the oven then the oven has a relatively low priority. If the temperature in the house is hot, the air conditioner has a high priority. If generator capacity is available the air conditioner would be connected instead of the oven. On the other hand, if the oven is in use when the grid power fails it is reasonable to assume food is being prepared. The interruption of power while food is being prepared can cause a serious problem for the occupants of the house making the oven a very high priority load. If the inside temperature of the house is at a reasonably comfortable level, and if generator capacity is available the oven would be connected instead of the air conditioner. The oven use likely will end within an hour or two and at that time it may be possible to connect the air conditioner, meanwhile the inside temperature of the house will likely not rise to uncomfortable levels. It is thus preferred that load control 25a include a real time clock and calendar feature, coupled with calendar factors such as sunrise and sunset, identification of local temperature norms, highs and lows for each calendar day and other information such as load usage habits, as will be useful in managing generator operation and loads.

If the oven was operating in a self cleaning mode instead of food preparation mode when grid power failed as detected by steady and higher then normal current draw. It is preferred that the oven current draw be recorded via the load control 25a and used to determine that the oven was in cleaning mode. That determination is preferred to be incorporated into the assignment of priority to reconnecting the oven. Since oven cleaning is not as important as preparing food, that cleaning can be delayed while other higher priority loads such as the air conditioner are connected. Of course, it will be desirable to allow the occupants of the house to make the decision as to applying power to the oven or the air conditioner as will be explained further below. A temperature sensor, part of 21, may be provided for a refrigerator or freezer and that temperature is used in determining the priority of connecting the associated load. For example, if the freezer temperature is well below the safe limit the freezer would be determined to be a low priority load whereas if the temperature rises to be near the safe limit the freezer would be determined to be higher or high priority load.

Secondary factors, such as the time of day and decreasing ambient temperature of the above example are also preferred to be taken into account in deciding to connect a particular device to or disconnect it from the power source. Such factors include, but are not limited to, calendar data, load usage habits, one or more parameter of the load for the particular device e.g. maximum possible load, expected load for current conditions, projected changes in the load with time or conditions, starting and surge currents (e.g. the starting current of an electric motor), power factor of the load such as resistive, capacitive or inductive type loads, the probability that a load will need to be connected or disconnected during the near and distant future, damage done by failing to connect a load or by disconnecting a load once connected. The short and long term ability of the power source to supply power in known or projected amounts, environmental factors such as ambient temperature, humidity, altitude, quantity of fuel available, fuel delivery rate, quality of fuel, cost of fuel, cost of supplying power from a given power source vs. cost of purchasing or supplying power from another power source and environmental effects of supplying power from a given power source.

In order to evaluate various factors and parameters used by the load control 25a for decisions to connect or disconnect loads, information will need to be available to the load control. It is preferred that the load control be programmable in order to store such information, however that information may be incorporated at manufacture, or may be learned by the load control by monitoring and recording parameters e.g. the operation of various loads, as will be explained further in respect to FIG. 6. As a simple example the current and time parameters of the oven may be recorded to compute current vs. time curves from initial turn on until reaching temperature for both cooking at different temperatures and cleaning operation of the oven can be used in subsequent decision making. The higher the oven thermostat is set, the longer it takes for the thermostat to reach its first cycle and the more frequently it cycles, which information may be utilized to characterize the oven operation.

Of course, those time and cycling parameters are also influenced by the mass and initial temperature of the food being cooked but about half way into the cooking time when the surface temperature of the food approaches the oven setting, that influence is greatly decreased. Curves for different temperatures as determined by the time from turn on until first thermostat cycle and then the cycle time thereafter can be recorded. When the oven is first started in a new cooking cycle, the temperature the oven thermostat is set to may be estimated from the time of turn on to first several thermostat cycles and comparison to the curves computed for previous operations. While such determinations are not absolutely accurate, they will nevertheless provide an approximation, which load control 25*a* may use in determining whether or not to connect a load. In some applications the oven may be configured to communicate directly with load control 25*a*, to provide useful information such as thermostat setting, cooking time and/or oven temperature.

Figure 6:
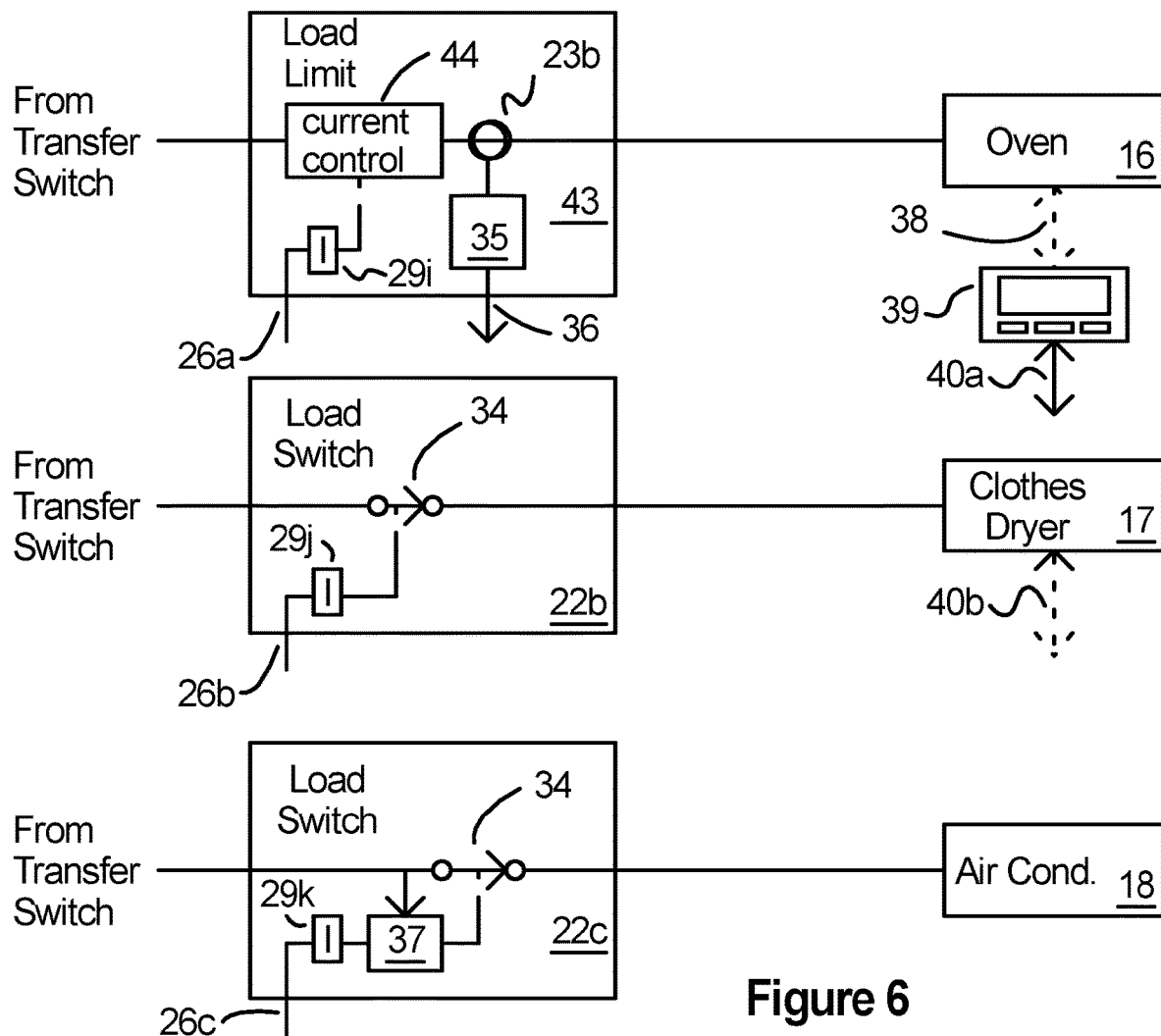
FIG. 6 shows loads 16-18, load switches 22b & 22c, load monitor 23b, communications links 26a-26c, 36, 40a, optional communications link 38, 40b, interfaces 29i-29k, 35, switches 34, and user input and user feedback module 39.

FIG. 6 shows the preferred embodiment of the invention with various embodiments of load switches 22*b* and 22*c* (note load switch 22*a* of FIG. 4 is replaced with load limit 43) and a combination user input and user feedback module 39. Load limit 43 includes a current control 44 to control current supplied to load 16 which control may, if desired, include complete disconnect of load 16 (an electric oven in this example) to/from the power source selected by the transfer switch 15. As just one example of a load limit device which may be utilized for 43, consider a remotely controlled light dimmer switch commonly found in the home and connected to a 250 watt incandescent light bulb. The light bulb will draw a full load of 250 watts of power if connected directly to the 120 volt power but a load limit circuit which in this example is the dimmer will limit the amount of power supplied to the light bulb.

Such load limiting circuits are well known in the art and include current limit circuits which operate to prevent a current from exceeding its prescribed limit, which in the present example is set in response to load control 25*a*. Constant current circuits may be also used for 44 and operate to maintain a preset current through a range of a variable load, which current in this example will be set in response to load control 25*a*. For clarity, as used in the present specification and claims a load limit (or current control) device limits the power supplied to a device which if connected directly to the power source under the same conditions is capable of consuming more power than that the power delivered via the load limit. This usage is in contrast to a controllable load for which the load itself is controlled so that the amount of power that is consumed when connected directly to the power source is controlled. As a simple example, remote controlled room heaters are such a controllable load.

It will be further understood to one of ordinary skill from the teachings herein that other types of control circuits may be utilized for 44 to control the power supplied to the load, e.g. phase vector drive circuits, variable frequency circuits, direct torque control, SCR and thyristor circuits, pulse width modulation and chopper circuits, and various soft start circuits, many of which are commonly used as drive circuits for electric motors. Some of the other circuits which may be utilized operate by reducing the amplitude of the supplied voltage, or by reducing the duty cycle of supplied current or altering the phase of the voltage and current applied to the load, and various combinations thereof. One of ordinary skill will be able to select a particular type of circuit for use with a particular load type.

Load limit 43 communicates with load control 25*a* via communication links 26*a* and 36 in order to send and receive data. Interface 29*i* couples the communication link 26*a* to current control 44 to allow the load control 25*a* to operate current control 44. While shown in respect to an electric oven in this example, it will be understood from the teachings herein that load limit 43 may be utilized with other types of loads, and will be particularly useful with high demand loads, for example heating and other resistive loads, battery chargers, electrolysis and other electro-chemical loads, in order to limit the maximum amount of power the load draws. One of ordinary skill will also understand that many types of high demand loads do not lend themselves to operation with particular load control circuits, for example many large constant speed rotating machinery loads which are desired to operate synchronously with relatively fixed voltage AC power and thus are difficult to use with variable voltage control circuits.

Load control 25*a* may cause the load to be controlled in discrete levels, for example full, 75%, 50% etc. or may cause the load to be controlled in essentially continuous fashion, for example 1% or smaller increments from 0 to 100%. It is desirable however that many loads such as the oven be continuously provided with some minimum amount of power to power clocks, timers, control circuits and the like in order that they do not have to be reprogrammed after power is completely interrupted for a longer period of time. Many ovens and other high demand loads include switching power supplies to power their clocks, timers, control circuits and the like with these supplies being capable of operating with reduced voltages. Alternatively, the clocks, timers and the like may be provided power via a continuously connected circuit, or may incorporate backup power such as battery operation.

Load monitor 23*b* is preferred to be included in load limit circuit 43 but may, as well as 35, be omitted if their capabilities are not desired for operation of load control 25*a*. Load monitor 23*b* is similar to 23*a* except for possible changes to match it to the current controlled and different maximum load. 23*b* monitors the electric power supplied to load 16 and communicates via interface 35 and communication channel 36 with load control 25*a*. This monitor may be utilized to send load power (e.g. current) information to load control 25*a* for several purposes. For example, full power oven load characteristics such as initial heating current and current to maintain temperature when heated to provide current vs. time parameters as previously discussed will allow load control to predict future load. Also, 23*b* may be used to enable load control 25*a* to determine that the current actually being used has dropped below the value the current is set to by current controlled 44. This will allow load control 25*a* to further adjust current to thus guarantee a lower maximum load without adversely affecting oven performance. It is also desirable that communications link 26*a* and/or 36 operate bidirectionally to provide information to load control 25*a* thus allowing verification and monitoring of the operation of load limit 43.

The oven load information may be used by load control 25*a* to detect when the oven heating element has just been turned off by the oven thermostat (and thus expected not to turn on again for several seconds or longer). This will allow load control 25*a* to use the resulting extra generator capacity for other purposes, for example to provide additional starting current such to as an air conditioner compressor. As a safety precaution load control 25*a* may also lower the current supply to the oven to a very low value for a short time. This lowering will not impair oven operation while guarding against an unintentional overload of generator 13 in the event the oven thermostat unexpectedly closes due to an unforeseen event such as an opened door. Oven load information may be used to cycle another load out of phase with the oven heating element, that is to only turn on or increase another load such as a battery charger for a time period after the oven heating element is turned off. Alternatively, the other load can be turned on or increased when the oven heating element is turned off and turned off or decreased immediately after the oven heating element is turned on, the momentary overlap of the two being handled by the short term higher current capability of the generator. These operations will generally be possible with any type of load which cycles on and off.

It will be recognized from the teachings herein that the operation of load limit 43 may be partially or completely incorporated within a particular load as desired. For example, the current control 44 and/or load monitor 23*b* may be incorporated within the oven 16. Alternatively, other loads which are capable of being limited, for example the battery charger for an electric or hybrid vehicle or the like discussed above, may be connected in a fashion to provide current limit and/or load monitoring interconnection to load control 25*a* as desired. If the load has internal control of its current available, for example such as the battery charger for an electric or hybrid vehicle or the like, it may be connected to load control 25*a* without an additional current limit circuit. As with the additional current control 44, load control 25*a* may cause the load to be controlled in discrete levels or may cause the load to be controlled in essentially continuous fashion. As with the separate current control circuit, for loads which have internal clocks, timers or the like which require some small amount of current to operate it is desirable not to completely disconnect them from the power source for long times which will cause these circuits to need to be reset, or alternate continuous circuit power or backup capability can be provided.

Control of individual loads to limit the power supplied to them or power consumed by them (one controls the other) under control of load control 25*a* is desired, particularly during times when the power grid is in heavy use and during times when generator 13 is supplying power. For example, heavy current loads like ovens and chargers may still be operated at reduced current in order to prevent overload of the power source, as compared to their being entirely disconnected. An oven for example will take longer from initial turn on to heat to its thermostatically controlled temperature, but once at that temperature the thermostat will be able to control the temperature, assuming a reasonable amount of current less than the maximum is still available to the heating element. In a situation where a power failure occurs after oven use is started, limiting the current to the oven may allow the oven to be powered from the generator, thus allowing the cooking to be completed, as compared to an oven which is not so limited and thus can not be connected to the generator because it will cause an overload.

FIG. 6 also shows load switch 22*b* including a switch 34 to connect and disconnect load 17, an electric clothes dryer, to/from the power source selected by the transfer switch 15. Load switch 22*b* communicates with load control 25*a* via communication links 26*b*. Interface 29*j* couples the communication link 26*a* to switch 34 to allow the load control to operate switch 34. Load 17 may optionally communicate with load control 25*a* via communications link 40*b*. The switch may be operated in a normally closed or a normally open configuration or a latching condition as known to one of ordinary skill, however it is preferred that load control 25*a* simulate any of those switch types for a given switch. It is also desirable that communications link 26*b* operate bidirectionally to provide information to load control 25*a* thus allowing verification and monitoring of the operation of load switch 22*b*.

FIG. 6 further shows load switch 22*c* which includes a switch 34 to connect and disconnect load 18, an electric air conditioner, to/from the power source selected by the transfer switch 15. Load switch 22*c* communicates with load control 25*a* via communication links 26*c*. Interface 29*k* and switch logic circuit 37 couple the communication link 26*c* to switch 34 to allow the load control 25*a* to operate switch 34 via logic circuit 37. Logic circuit 37 is preferred to be configurable by communications from load control 25*a* to cause it to operate in response to power from the transfer switch as a normally open, normally closed, latching or special function switch. It is preferred that 37 normally be configured by load control 25*a* to operate the switch to open when power to the switch from the transfer switch is lost and to stay open until a command to close is received and thereafter as a latching switch (until power from the transfer switch is lost again). In this fashion the load is automatically removed from the transfer switch when power is lost, thus eliminating the need to have it disconnected by the load control. It is further preferred that 37 include a time delay function to prevent power from being applied to the air conditioner for a time period after it has been removed in order that the compressor head pressure can bleed off thus avoiding the possibility of excessive compressor starting currents. It is also desirable that communications link 26*c* operate bidirectionally to provide information to load control 25*a* thus allowing verification and monitoring of the operation of load switch 22*c*.

FIG. 6 still further shows a combination user input and user feedback module 39 which communicates with load 16 via communications link 38 and communicates with load control 25*a* via communications link 40. As previously discussed, 39 may be incorporated into or supplied by processor circuit 33. While shown as a combination input and feedback module, the two operations may be separated into different devices using common or different communications. In the present example, a user desiring to operate the oven may be alerted that insufficient power capability exists for such operation, thereby allowing further user interaction with load control 25*a*.

While the load switches 22, load limit 43, controllable loads e.g. 16, 17 and 48 are most commonly described herein as being preferred to be separate from the load control 25, one of ordinary skill will recognize that the invention may very well be practiced with load control circuitry, especially that circuitry corresponding to controlling a particular switch, limit and/or load, being incorporated within or specific to a particular switch, limit and/or load, or small number thereof, which will be referred to herein as load specific control circuitry. In this respect the communications which sense overloads and other load related parameters and user inputs e.g. generator monitor 24 and environmental, user & miscellaneous devices 21, as well as particular user interfaces, may be contained within the load or load controlling device, and/or communicate directly with load specific control circuitry.

In particular, in low cost systems, the aforementioned use of power frequency may be utilized directly within a load or load control device to sense an overload and disconnect the load. One of skill in the art will recognize that it will be useful to establish priorities for each such device which priorities may be established by incorporating circuitry to determine the degree or level of overload, various time delay operations or combinations thereof in one or more of load switches 22, load limit 43, controllable loads e.g. 16, 17 and 48 such that some loads are shed or prevented from connecting more readily than others. For example, the power frequency detector may be set to detect degrees or levels of frequency change, with some loads being disconnected, transferred, limited or prevented from being connected to a particular source at a small frequency change and others being disconnected, limited or prevented from being connected with larger frequency changes or combinations thereof being utilized with a particular load. As described herein, particular loads may be switched from one power source to another to facilitate a desired optimization or operation of the system.

As one example a low priority load may be prevented from being connected if the power frequency makes more than normal excursions, if even momentary, below a given frequency threshold. Such excursions would have a high probability of indicating the generator is close to an overload and is momentarily overloaded by small and/or short term load increases for example such as the starting current of a small motor in a kitchen appliance such as a refrigerator. When a larger or longer term power frequency deviation is detected a delay may be incorporated in one or more of load switches 22, load limit 43, controllable loads e.g. 16, 17 and 48, with lower priority loads being disconnected faster than higher priority loads. In this example a low priority load such as an air conditioner may be quickly disconnected which could very well eliminate the overload and return the power frequency to normal and thus eliminate the need to disconnect more loads.

A load circuit may be part of or otherwise incorporated to control one or a small number of loads, load switches, transfers and/or load limits in order to sense power frequency to determine the probability of nearing an overload, being in a small overload, a moderate overload or large overload with this information being utilized to control limiting the current supplied to one or more load, disconnecting or transferring one or more load and/or preventing the connection of one or more load. In addition, other features of the invention described herein may be incorporated, such as preventing the reconnection of a load for a time period after it normally turns off or is disconnected. It will be understood that the individual features, e.g. those of 22b, 22c, 43 and 39 described with respect to the Figures may be rearranged to operate with a particular load, set of loads or sets of loads as desired to provide a particular combination of inventive features for a particular system as will be known to the person of ordinary skill from the teachings herein.

With systems where load specific control circuitry is utilized to control the connection of one or a small number of loads in response to the power frequency, it is desirable to know the loading vs. frequency of the power source or sources. In particular the characteristics of the frequency versus load are preferred to be programmed into the microprocessor either at manufacturer or by the user during installation in order that the microprocessor may know if the load being supplied by the generator is below, near, slightly overloaded, significantly overloaded or highly overloaded. In this respect it is also useful to control the frequency of the AC power provided by the power source in response to the load on the power source in order that the frequency may be more accurately utilized by the load specific control circuitry to prevent or remove overloads. This frequency control may be accomplished by sensing the load on the source and controlling the power frequency by feedback to the frequency control, e.g. the rotational speed of a genset or frequency reference of an AC inverter.

Figure 7:
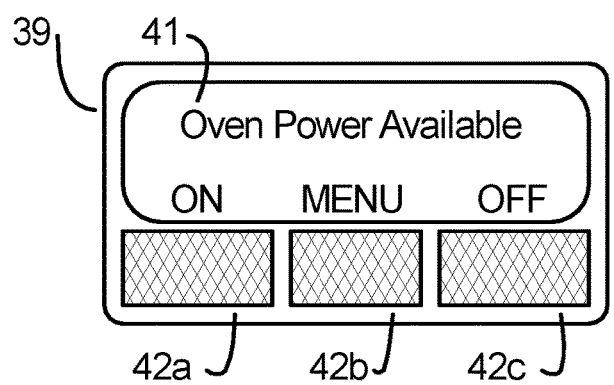
FIG. 7 shows user input and user feedback module 39, display 41 and user input keys 42a-42c.

FIG. 7 shows an example of a mechanical layout of the combination user input and user feedback module 39, including a display 41 for displaying messages from load control 25a to the user and switches 42a-42c to allow the user to (among other capabilities) provide commands to the load control 25a. User commands and messages are conveyed to and from the load control 25a via communications link 40a, and to and from load 16 via communications link 38. Load 16 and load control 25a may also communicate with each other via 39 (and communications links 38 and 40a). For example, if the user wants to turn on the oven it can instruct the load control to provide power for the oven to be operated in a particular mode such as full power or at some level of reduced power as described herein. The load control 25a can offer a set of options to the user including options to chose the level of operation of the desired load and corresponding decreases in the level of, or termination of, operation of other loads. In this fashion the user may communicate with the load control in order to change priorities to enable the user to obtain power for the desired device. It will be understood that one or more user input and/or user feedback modules may be provided with any of the loads in order to allow the user to communicate with the load control in order to enable the user to operate a desired device, or to allow communications with the load control in order for the user to operate multiple devices. The feedback and input capabilities may be combined if desired, for example by use of a touch screen as is well known in the art.

For example, a user desiring to use the oven to bake for 45 minutes at 400 degrees can enter that information to load control 25a via 39 and keys 42. The load control will then determine options available to allow oven operation and provide them to the user. The user then selects one or more (or none) of the options and the load control puts the user's desired operation into effect. For example the load control might offer the user the following options: a) operate the oven at full power by turning off an air conditioner; b) operate the oven at full power by turning off a vehicle battery charger; c) operate the oven at 75% power by reducing the battery charger current by 50% with an increase of 7 minutes to preheat the oven to 400 degrees; d) operate the oven at 65% power by turning off a hot water heater, with an increase of 10 minutes to preheat the oven; e) select option d) and in addition reduce the battery charger power by 75% and operate the water heater only while the oven heating element is turned off by the oven thermostat. It will be understood from the above example that there are numerous capabilities and options which may be determined by the load control 25a and presented to a user to assist the user to achieve a desired operation. This assistance may be provided in several manners with menu selection, interactive querying and graphical user interface being just a few.

Accordingly, it will be understood that the system of FIG. 4 as implemented with the various features of FIGS. 6 and 7 will be capable of operation to power ones, which will be understood to include some or all, of a group of loads. The group of loads may include loads which may be individually switched on and off, loads for which the power supplied to the load is limited to a known maximum amount, loads which may be controlled to limit the amount of power they take from the power source and loads which are not controlled. It is noted that practice of the invention will virtually always include loads which are not controlled, which for example will most probably include the generator and transfer switch controller 14 as well as the power supply for the load control 25, lighting and electrical outlets for consumer electronic devices. It will be understood that the invention may be practiced as needed in a particular system with only one load comprising any one or more particular type of loads and/or without any combination of the above described types of loads.

Figure 8:
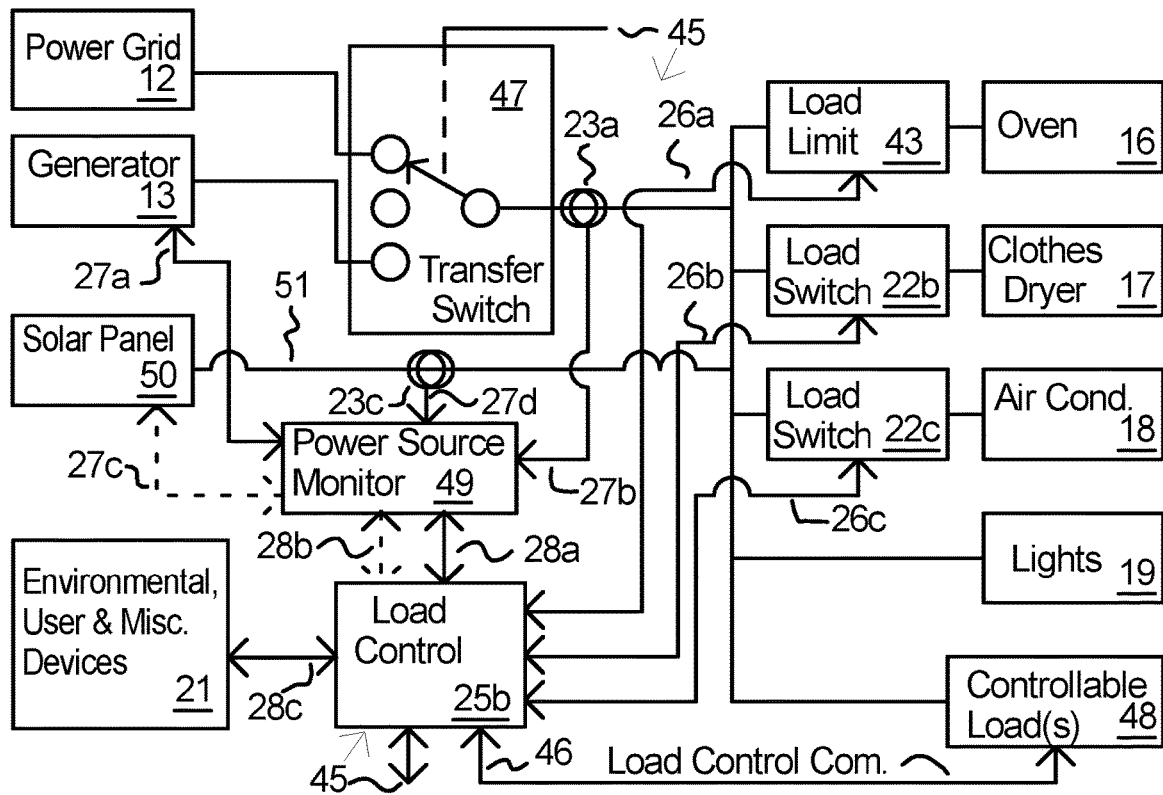
FIG. 8 shows a simplified circuit diagram of a power backup system similar to FIG. 4 which is a more elaborate embodiment of the present invention, the system having power grid 12, generator 13, transfer switch 47, loads 16-19 and 48, environmental, user & misc sensors 21, load switches 22b and 22c, load monitors 23a and 23c, power source monitor 49, load control 25b, communications links 26a-26c, 27a, 27b, 27d, 28a, 28c, 45, 46, optional communications links 27c, 28b, load limit 43 and third power source 50 having power output via 51.

FIG. 8, similar to FIG. 4 shows a simplified diagram of another embodiment of the invention which includes operation with a third power source 50 which by way of example is shown as a solar panel and controllable load(s) 48. Elements 12, 13, 16, 17, 18, 19, 21, 22b, 22c, 23a, 26a, 26b, 26c, 27a, 27b, 28a, 28b and 28c are shown, the same as in FIG. 4 except that 21, 27a and 28c are changed from optional in this embodiment. Load limit 43 is the same as described in respect to FIG. 6. FIG. 8 further includes load control 25b similar to 25a of FIG. 4 but having increased capabilities including controlling the generator and transfer switch instead of 14, as will be described below by way of example. FIG. 8 also includes transfer switch 47, similar to switch 15 except that it is an on-off-on type switch (as compared to break before make on-on type for prior art switch 15) which can connect its output to either power grid 12, or generator 13 or neither, thus leaving only the third power source (solar panel) 50 to power the loads. Transfer switch 47 is controlled by load control 25b via communications link 45 (shown at the top of the transfer switch and bottom of the load control) and controllable load(s) 48 communicating with load control 25b via load control communications link 46. One of ordinary skill will understand that in order to simplify the description of the invention FIG. 8 does not show many elements, e.g. circuit breakers, safety features and the like that are required of an actual system and as with transfer switch 15, one of ordinary skill will know that transfer switch 47 will be much more complex in practice and is shown herein in simplified form for purposes of explanation.

One of ordinary skill will know from the present teachings, to practice the invention utilizing the on-off-on type of transfer switch 47. As with FIG. 4, the embodiment of FIG. 8 may be utilized to prevent overload of any combination of the power grid service 12, generator 13 and third power source 50. It will also be understood that third power source 50 may be operated while the power grid is connected in order to reduce the power supplied by the power grid, or even to sell power back to the power utility, however it will be recognized that in such paralleled systems when the power grid fails it is important to disconnect the power grid from the generator in order to prevent damage to the generator or possible harm to workers who are repairing the grid failure. Additionally, when the generator is connected by transfer switch 47 to power the loads it is likewise important not to transfer substantial (i.e. damaging) amounts of power from the third power source to the generator to prevent damage to the generator. Because of this it is important to monitor the generator current output or otherwise to connect an additional load or disconnect the generator when the third power source 50 can provide enough current to power the loads.

Communications link 27a is utilized for communications between generator 13 and load control 25b via power source monitor 49 in order that load control 25b may start and stop the generator in response to power grid failure (sensing link to power grid is not shown) or as otherwise needed. Note that communications link 27a may connect directly from generator 13 to load control 25b as previously described. One of ordinary skill will understand from the present teachings that the third power source, solar panel 50 is representative of one or more additional individual power sources which may be utilized with the invention. A solar panel which is made up of individual photovoltaic cells that convert sunlight to electricity is chosen in FIG. 8 by way of example with the teachings of the inventive concepts being applicable to individual and combinations of other types and numbers of power sources, e.g. stored energy, wind, water and geothermal types of power sources in addition to solar. As with communications link 27a, the solar panel communications link 27c may be connected directly to load control 25b if desired. When solar panel 50 and generator 13 are connected directly to load control 25b power source monitor 49, load monitors 23a and 23c and their associated communications links may become redundant and may be eliminated with respect to monitoring the generator and solar panel respectively.

Solar panel 50 has a power output via connection 51 which is connected with the output of transfer switch 47 to provide power to the loads as is well known in the art, e.g. it is synchronized to and paralleled with the power from transfer switch 47. The power output from the solar panel is measured via load monitor 23c and communicated to power source monitor 49 via communications link 27d. Load monitor 23c is similar to 23a except for possible changes to match it to the maximum output power of the solar panel. Power source monitor 49 functions in a manner similar to generator monitor 24, receiving generator and power grid load information from 23a via communications link 27b and optionally communicating via communications link 27a. As explained with respect to FIG. 4, load monitor 23a may also monitor power supplied by the grid.

Additionally, power source monitor 49 receives solar panel power output information via 23c and communications link 27d and optionally communicates with solar panel 50 via communications link 27c. The power source monitor 49 communicates with load control 25b via communication link 28a and optionally 28b as previously described in respect to FIGS. 4 and 5 but additionally includes information and communications with respect to solar panel 50. As will be known to one of ordinary skill from the teachings herein, the power source monitor and load control may be expanded or duplicated to handle more power sources than the generator 13 and solar panel 50. Connection of those extra power sources to the system may be via extra transfer switch circuits as with generator 13, or via paralleling as with solar panel 50, and will be accommodated by load control 25b for control of the loads being powered. As previously explained with respect to generator 13, if the power source(s) provide information about their operating parameters from their own control and/or monitoring systems that information may be communicated directly to load control 25b and power source monitor 49 along with its sensors and communications link may be eliminated with respect to those power sources.

The operation of the embodiment of FIG. 8 is similar to that of FIG. 4, however additional capabilities of powering loads 16-19 and 48 from the solar panel 50 are provided as well as interacting with and controlling load(s) 48 directly by load control 25b to set its maximum load presented to the power source(s). For example, a controllable load 48 may be a Lasko Model 5350 room heater which can be remotely switched from off to 900 watts to 1500 watts via wireless communications link via load control 25b. Solar panel 50 is connected to the output of the transfer switch 47 to provide additional power to the loads when environmental conditions permit, thereby reducing the amount of power required from the other power source(s). In particular, during periods of low load demand when power is available from 50 the load control 25b is preferred to communicate via 45 to cause transfer switch 47 to switch to its off position in order to power those of the loads 16-19 and 48 which are consuming power to receive that power from 50.

Controllable load(s) 48, such as the aforementioned room heater may be powered by solar panel 50 and controlled to either heat at 1500 watts if there is enough power available and heating is desired because of a cold room or outdoor temperature (sensed by sensors 21), or may be reduced to 900 watts if a higher priority load needs power or the solar panel 50 is incapable of providing power for the high setting, or may be switched off if the room temperature is high enough or solar panel 50 can not provide 900 watts. It will be recognized in this example that when the room temperature reaches the thermostat temperature of the heater 48 (which may be set by load control 25b or directly on the heater by a user), the heater will turn off its heating element thereby drawing minimal power. Load control 25b may nevertheless turn off the heater to avoid a sudden overload of the solar panel 50 should the room temperature cool to the point where the heater's thermostat turns the heating element on again.

Accordingly to the present example, low cost power is selected by load control 25b to power the loads while at the same time the load control will communicate to various components of the system to monitor (e.g. via load monitor 23c) and control power supplied to several loads each of differing types including high priority loads such as lights 19, switchable loads such as by load switch 22b to clothes dryer 17, limitable loads such as via load limit 43 to oven 16 and controllable loads such as the heater 48 to allow loads of various priorities to be powered by the low cost power source while at the same time preventing overload of that source. Load control 25b will monitor and control power demands by the various loads so as to not exceed the available power from a given power source or set of power sources. If demand increased beyond what a power source such as the solar panel 50 is capable of providing, the load control will decide to either not connect the additional load(s), or to connect but control power supplied to the additional load(s), or to connect additional power source(s) such as grid power 12, or start and connect the generator 13, or other power sources (not shown) thus providing additional power for the additional loads. The decision making by load control 25b is preferred to be based on one or more of user input, load priorities, load parameters, power source parameters, power cost and environmental parameters in order to prevent overload of the power source(s) powering the loads.

In particular, the decision to connect to additional power sources is preferred to be made according to the priority of the load(s) to be connected, availability and cost of the power from the various power sources which are available to provide additional power, or according to other decision making criteria which is provided to the load control during manufacture, installation or afterward by an operator, either by the operator's changing and storing priorities or by the operator's instant override of stored priorities. It will be understood that more than the three power sources may be accommodated. There may be one or more wind turbines, solar panels, fuel cell, generators and the like provided in the system in addition to the grid power as one of ordinary skill will find desirable to fit a particular application. In systems requiring high reliability there may also be multiple connections to the power grid, the multiple connections being provided by different grid service paths, or even to multiple power grids provided by different utilities. Such multiple connections are known in the art to be used in broadcasting and medical facilities. Of course, as previously described there may also be many loads of different types to be controlled by load control 25b using the devices, capabilities and features described herein.

A controllable load 48 may be of any type where control of the power consumed by the load is provided within the load, e.g. those described in respect to FIG. 6 or those which include any of the various circuits described with respect to current control 44 of FIG. 6, and those which are otherwise controllable without requiring a separate load limit 43 or load switch 22b or 22c as previously discussed. A three way light bulb is such a controllable load. Other such controllable loads include the above mentioned low and high power oven and clothes dryer and the Tesla Motors vehicle High Power Connector and battery charger. Controllable load 48 communicates with load control 25b via communications link 46 to provide load control communications, which may be single direction or bidirectional as desired.

Figure 9:
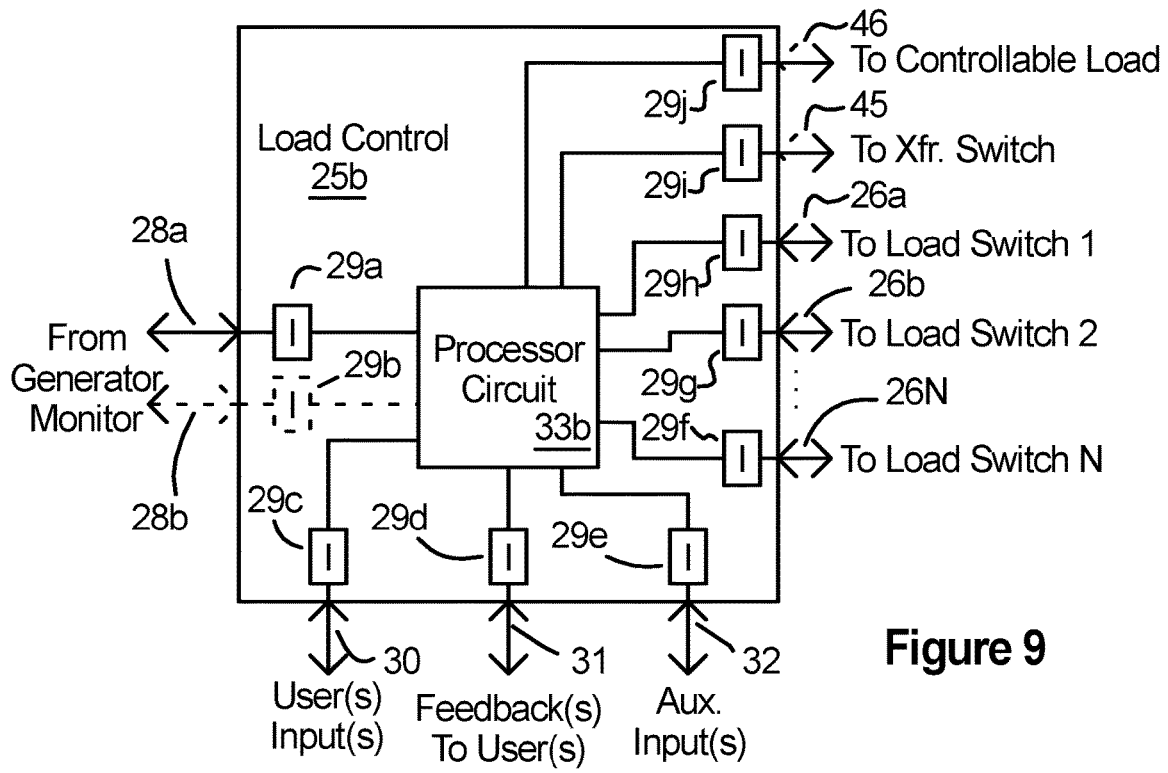
FIG. 9 shows a more detailed circuit diagram of load control 25b with communications links 26a-26N, 28a, 30, 31, 32, 45, 46, optional communications link 28b, interfaces 29a, 29c-29j, optional interface 29b and processor circuit 33b.

FIG. 9 shows a diagram of load control 25b, similar to FIG. 5 with the same elements 26a-26N, 28a, 28b, 29a-29h, 30, 31 and 32. In addition, load control 25b has additional interface circuits 29i and 29j and communications links 45 and 46 to provide communications with transfer switch 47 and controllable load(s) 48 respectively. One of ordinary skill will understand that processor circuit 33b of 25b is preferred to have additional capabilities as compared to processor circuit 33a of FIG. 5 in order to accommodate the additional capabilities such as may be needed in relation to solar panel 50, transfer switch 47 and controllable load(s) 48. Implementation of such additional capabilities will be within the ability of one of ordinary skill from the teachings herein.

It is preferred that the operation of the embodiment of FIGS. 8 and 9 be such that power is provided to each individual load at times and in amounts, and from one or more of a plurality of available sources as are desirable to minimize cost and maximize reliability for a given set of circumstances, as controlled by load control 25b. It is further preferred that the operation of load control 25b be performed at least in part by taking into account established priorities for one or more individual loads, established parameters for one or more loads, established parameters for one or more power sources and monitoring parameters for one or more power sources and one or more loads. It is further preferred that the operation of load control 25b be performed to allow input from one or more user in order to allow changing of priorities of loads and changing of the operation of one or more load so as to change at least that load's current in operation.

Figure 10:
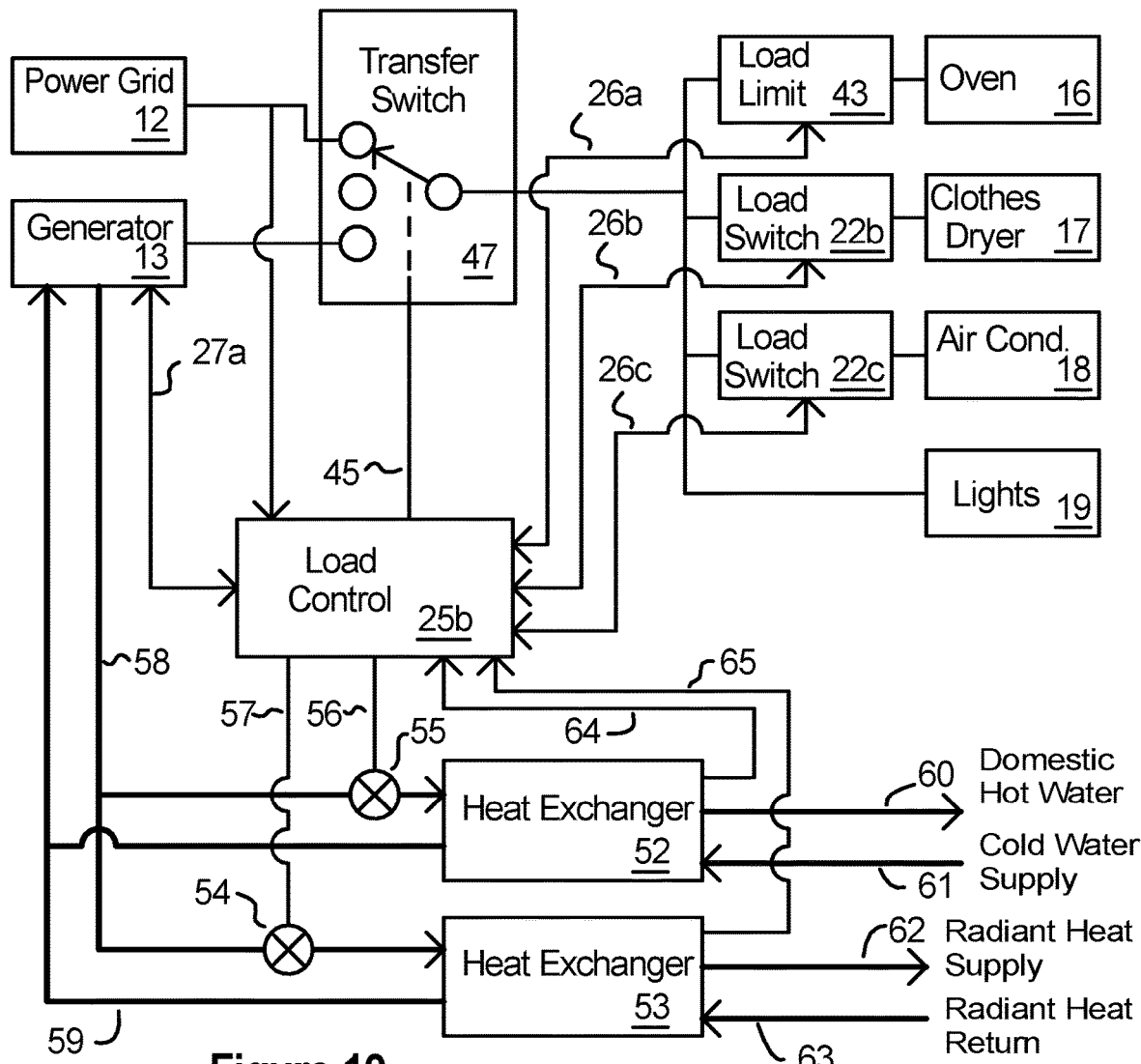
FIG. 10 shows a simplified diagram of the embodiment of FIG. 8 which includes elements 12, 13, 16, 17, 18, 19, 22b, 22c, 25b, 26a, 26b, 26c, 27a, 43, 45 and 47 as in FIG. 8.

FIG. 10 shows a simplified diagram of the embodiment of FIG. 8 which includes additional capabilities for management of loads presented to a power source wherein the power source provides power in one or more form, and the loads consume power in more than one form, e.g. electric and heat. FIG. 10 includes elements 12, 13, 16, 17, 18, 19, 22*b*, 22*c*, 25*b*, 26*a*, 26*b*, 26*c*, 27*a*, 43, 45, and 47 as in FIG. 8. Other elements of FIG. 8 are omitted from FIG. 10 for simplicity. Additional elements are included in FIG. 10 for the purpose of recovering power in the form of heat from generator 13 as controlled by load control 25*b*. The elements of FIG. 8 which are not shown in FIG. 10 will be known to be available for inclusion in FIG. 10 as desired. Generator 13 is assumed for the teachings herein given by way of example and in particular with respect to the instant explanation of heat transfer with respect to FIG. 10, as being of a type such as a fuel cell, internal combustion engine, battery or battery array, or the like having significant heat generation as a byproduct of its operation. Generator 13 will further be assumed to have a liquid or gaseous coolant system which may utilize glycol, water, steam or any other coolant suitable for use with generator 13, along with a radiator or other heat exchanger for removing such heat thereby cooling the generator. As used herein the coolant will be referred to as a fluid, even though it may be in a gaseous or mixed state form. In the system of FIG. 10, the coolant is supplied from the generator's cooling system via piping (piping shown by heavier lines) 58 to electrically controlled valves 54 and 55 to heat exchangers 52 and 53 where the coolant loses heat to the fluid on the other side of the heat exchangers. The cooler fluid (which may change phase from gaseous to liquid due to cooling in the heat exchanger), is then returned to the generator via piping 59 (and change phase from liquid to gaseous in the generator). Circulation of the coolant may be provided by the cooling pump in generator 13, or externally by an additional pump or pumps (not shown). In this manner the excess heat from 13 will be removed and utilized to heat other needed devices and/or systems. As noted, FIG. 10 is a simplified diagram and one of skill will know there are several operation details and considerations which will be pertinent to the proper operation of the generator, load control and heat exchangers in a particular system. For example, it is desirable that additional flow control, mixing and safety valves, temperature and pressure sensors and/or pumps are included in the systems. These are not shown but nevertheless necessary as will be known the one of ordinary skill.

Heat exchanger 52 operates to transfer heat in the coolant from 13 to heat cold water 61 from a supply such as a well or municipal water utility to be used as domestic hot water 60. Heat exchanger 52 is preferred to be a double wall construction type to prevent leakage of coolant into domestic hot water. The domestic hot water may be heated to proper temperature, usually around 125° F. directly by heat exchanger 52 or may be only partially heated to its desired temperature with heating to the desired temperature accomplished by another heating stage (not shown) as is well known in the hot water heating industry. Similarly, heat exchanger 53 operates to heat returning glycol or other fluid 63 used in a radiant heating system to the proper temperature, usually around 150° F. to provide a supply of radiant heat fluid 62 or only partially with heat to the desired temperature accomplished by another heating stage (not shown) as is well known in the hydronic heating industry. Temperature sensors (e.g. RTD and other resistive sensors, thermocouple, silicon junction, silicon bandgap, thermostats or aquastats) inside the heat exchangers 52 and 53 sense the temperature of the domestic hot water supply and radiant heat supply respectively and convey those temperatures to load control 25*b* via domestic heat sense link 64 and radiant heat sense link 65 respectively as known in the respective industries. Load control 25*b* operates to adjust the opening of one or both of valves 54 and 55 to maintain radiant heat supply and/or domestic hot water supply at or near a desired and preferably constant temperature. Valve opening may be controlled such that the valve is either fully open or closed with heating controlled by the time of opening, or partially opened with heating controlled by the amount of opening, or a combination of the two.

FIG. 10 elements 52-65 will be understood to be common and ordinary components of hydronic and hot water heating systems as are known to the person of ordinary skill. In some systems it may be desired that temperature sensors be omitted (but not relief valves) where the heat exchanger 52 or 53 can only partially heat to desired temperature and another heating stage is used. It is desired that both the domestic hot water system and radiant heat system include additional heating stages to ensure both systems operate when generator 13 is not running. When generator 13 is running and at operating temperature, if the domestic hot water temperature and/or radiant heat temperature as sensed via 64 and 65 respectively is below the desired temperature load control 25*b* causes opening of the corresponding valve. Generator temperature will be made available to the load control via communications link 27*a*. It is desired that the radiant heat system be controlled so that when generator 13 is not running the radiant heat fluid is not circulated through heat exchanger 53 which might lead to some inefficiencies due to heat loss in 53. Other arrangements of the system and its components will be possible from the teachings herein.

As another example, one or more battery pack(s) in an energy storage system such as that utilized in an electric or hybrid vehicle, or wind turbine, and in particular a battery pack stored in an unheated location, may be heated by connection to radiant supply 62 or by a separate heat exchanger in order to prevent excessive cooling and/or to maintain the temperature of the batteries at or near optimum temperature for the type and intended use of the battery. In addition, during charging the excess heat from the battery may be removed by the same system and used to heat other devices or systems, for example such as the radiant heat supply or domestic hot water. The integration and operation of such additional heating and cooling connections and control thereof by the load control 25*b* will be within the skill of one of ordinary skill from the teachings herein.

Also, it will be desirable to regulate the cooling of the generator 13, which is provided by its own radiator, in order that sufficient heat is available to the heat exchangers when needed, and when heat is not needed by the heat exchangers the generator radiator dissipates sufficient heat to keep the generator properly cooled. This heat management may be had by proper choice of the generator's cooling thermostat temperature, somewhat above the highest output temperature of the heat exchangers. In the above example if the generator's thermostat is chosen to be 160° F. it will open and cool the generator independent of the heat exchangers if sufficient heat is not drawn away from the generator by the heat exchangers. The proper handling of these operation details and considerations will be apparent to one of ordinary skill from the present teachings.

It may be desirable that the system of FIG. 10 be used with a fuel cell which has its electrical output connected to the output of the transfer switch in the same fashion as the solar panel 50 of FIG. 8. This will provide more continuous heat for use by the heat exchangers 52 and 53. Alternatively, because most fuel cells include one or more internal heat exchanger that heat exchanger may be used to heat the domestic hot water and/or the radiant heat. As with the generator example above provisions must be made to ensure proper cooling of the fuel cell in the event sufficient heat is not drawn away by the heat exchanger. The proper handling of operation details and considerations will be apparent to one of ordinary skill from the present teachings.

The coupling of a second form of energy (heat) from generators and other power sources such as fuel cells for use in the heating of domestic hot water and radiant heat supply is given by way of example and one of ordinary skill will recognize from the present teachings that other forms of energy may be produced, recovered, transmitted, stored and/or utilized to power devices or systems for which it is desirable to utilize that energy. Such systems may utilize the teachings and features of the preferred embodiment of the present invention to benefit from improved management of energy therein as will be known to one of ordinary skill. For example, some vehicles are known to utilize stored compressed air for power and energy may be managed in a gaseous form utilizing the inventive concepts disclosed herein.

Figure 11:
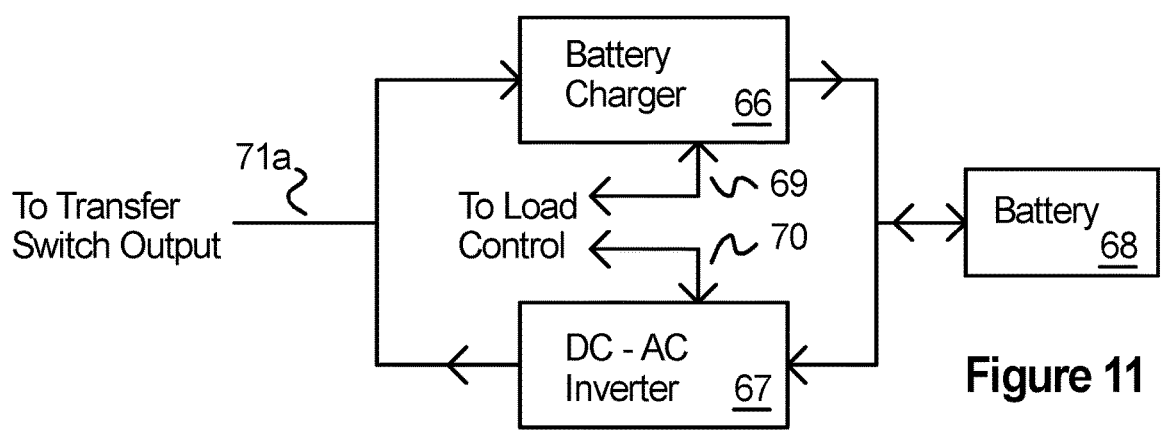
FIG. 11 shows a simplified diagram of a combination load and power source which the invention may be utilized with including battery 68, battery charger 66, DC to AC inverter 67, connection to transfer switch output 71a, communications connections to load control 69 and 70.

FIG. 11 shows a simplified diagram of a load which may also be utilized as a power source which the present invention may be used with. In this example the load is shown as a battery (or battery array) which may be charged to store power. Such batteries may be part of a green power system such as a solar panel, wind or water turbine and may be permanently located or otherwise such as installed in an electric or hybrid vehicle, described in more detail with respect to FIG. 12. Other forms of energy storage may be utilized in place of the battery, as long as suitable interface devices to store and recover stored energy are used as will be known to one of ordinary skill from the teachings herein. For example, energy storage forms using compressed air in a container, heat in a vessel, fluid pumped to an elevated reservoir, mechanical such as a flywheel or spring, and many other suitable forms may be resorted to by the person of ordinary skill.

In FIG. 11 a connection 71a from the transfer switch (preferred to be made via a circuit breaker which is not shown), for example a high current 240 volt connection such as discussed herein with respect to a vehicle battery charger, is made to the input of battery charger 66 and output of DC to AC inverter 67. The output of the battery charger 66 is connected to the battery 68 and the battery 68 is also connected to the input of DC to AC inverter 67 which when it operates is preferred to synchronize with and parallels power (if any) available at the transfer switch output. U.S. Pat. No. 7,338,364 describes this type of power inverter. It is possible that both charger 66 and inverter 67 will be in close proximity to the battery 68 in order to minimize wiring costs and it is possible that both charger 66 and inverter 67 will be combined into one instrument. Both charger 66 and inverter 67 are connected to load control 25 (not shown) via communications links 69 and 70. The communications may be combined in one communications link if desired. In this fashion power from the transfer switch may be utilized to charge the battery or the battery may be used to power the inverter 67 to provide AC power to the other loads or to the power grid, all under control of load control 25. In particular the battery array of an electric or hybrid vehicle may be utilized in order to provide backup power to one or more loads in the event of a failure of the power grid.

Recalling that many homes only have a 100 amp service from the grid it normally would be unwise to use a 90 amp connection from the transfer switch to the battery charger due to the risk of overloading the service connection. When, as in this example, the charger can be controlled by the load control to keep its maximum load to the service at a much lower level, for example 20 amps, or to otherwise prevent overload of the service connection, a larger capacity connection may be utilized as will be understood from these teachings. The load control may at any time monitor the charge of the battery 68 via the charger 66 and communications link 69. If the battery has a sufficient charge and the load control needs to have additional power available, such as during a grid outage or during a high load conditions, the load control may turn off the battery charger 66 and turn on the DC to AC inverter 67, thereby taking power from the battery to be used elsewhere.

In this example, having the 90 amp connection to the battery inverter 67 will allow a significant amount of power to be supplied, almost enough to replace the entire 100 amp service in the event of a grid power failure. Of course, the power taken from the battery may be utilized for other applications as previously discussed, including supplementing grid power during heavy loads or expensive power rates or even selling power back to the utility. One will recognize that it is also possible to charge the battery with cheap power from another source such as solar panel 50 or at a time of availability of cheap power from the grid 12 such as at night. That cheap power which is stored in the battery may then be used when power from the grid (or other sources) is more expensive, or may even be sold at a profit. Control of charging and discharging of the battery 68 by load control 25 may also take into account the timing and need of power for other uses as well, such as driving the vehicle which the battery is installed in.

Figure 12:
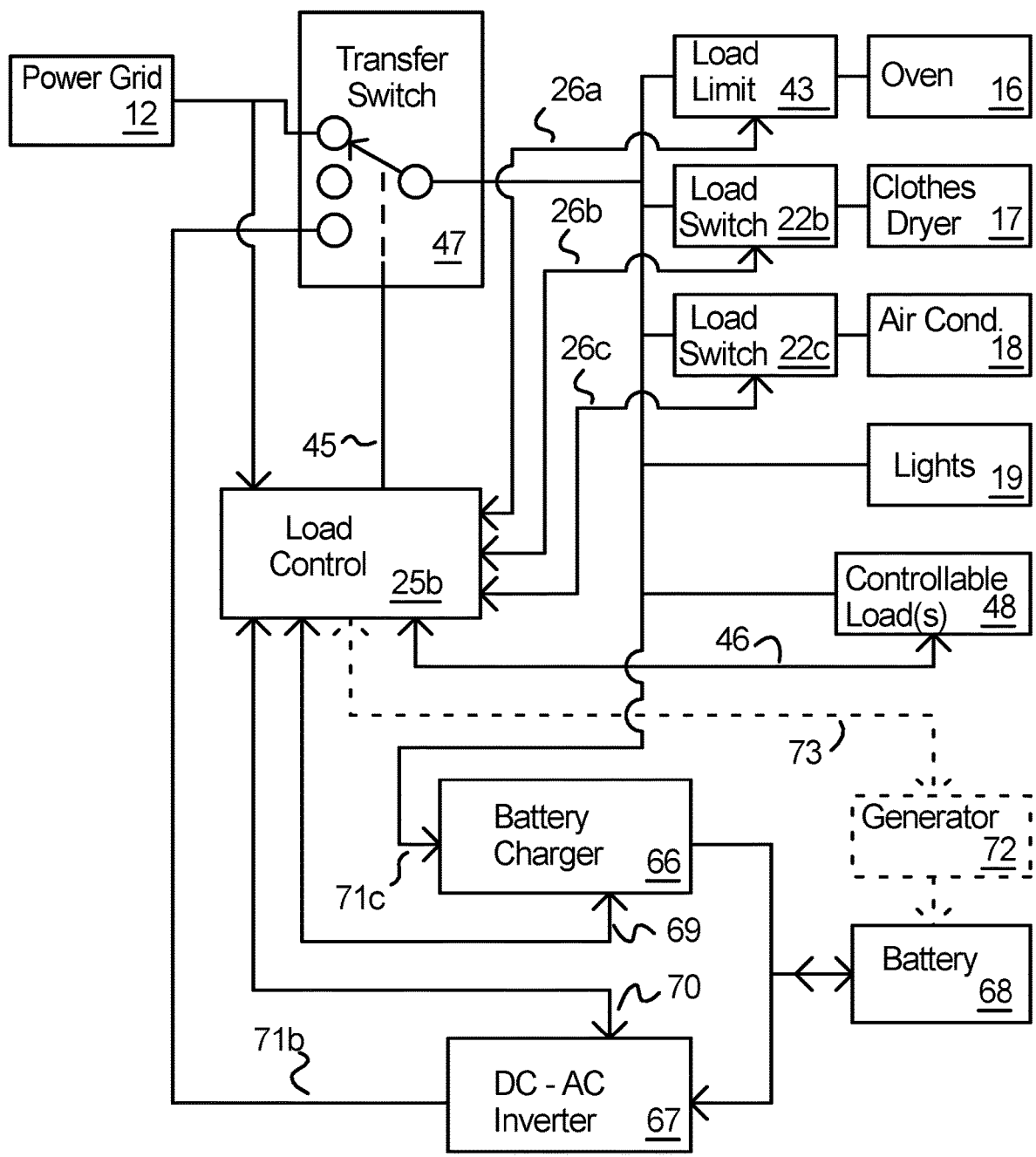
FIG. 12 shows a simplified diagram of an embodiment of the invention which is used with an energy storage battery 68 and optional generator 72 communicating with load control 25b via optional communications link 73 with battery 68 usable as a backup power supply in the event of a power grid failure.

FIG. 12 shows a diagram of an embodiment of the invention which is used with an energy storage battery 68, optional communications link 73 and charging generator 72. Battery 68 and DC to AC inverter 67 are configured as a backup power supply to be used in the event of a power grid failure. Power grid 12, loads 16-19 and 48, load control 25b, load switches 22b and 22c, load limit 43, communications links 26a-26c, 45 and 46 and transfer switch 47 are described above as in FIG. 8. Battery 66, DC-AC inverter 67, battery 68, communications links 69 and 70 operate as described above in respect to FIG. 11, except that the battery charger 66 is connected to the output of the transfer switch via 71c whereas the output of DC to AC inverter 67 is connected to an input of the transfer switch 47 instead of to the output of the transfer switch as in FIG. 11. If it is desired to provide power from 67 to the power grid, synchronization with and parallel operation may be obtained with the connection moved to the output of the transfer switch. It will be recognized that it will be necessary to disconnect the power grid in the event it fails.

The embodiment of FIG. 12 will find use as a home backup system and in particular where the battery (or battery array) 68 is contained within an electric vehicle which is charged by battery charger 66 or a hybrid vehicle which may be charged by battery charger 66 or by a generator 72. It will be known that generator 72 may be of any type suitable for use with the battery 68, or with a vehicle which contains the battery, for example an internal combustion engine or more preferably a fuel cell. It will be understood that when the battery 68 is part of a vehicle that battery charger 66 detect and convey to load control 25b when it is connected to the battery and similarly DC to AC inverter 67 communicate to load control 25*b* when it is connected to the battery. Of course, when the two are configured to be connected simultaneously, e.g. by a single connector, either charger 66 or inverter 67 may convey the communications via a single connection. When the vehicle includes an on board generator operable to charge the battery, load control 25*b* may communicate with generator 72 as desired via 73, it being preferred that 73 be wireless, or included in the communications link 69 or 70. DC to AC inverter 67 may also be located in the vehicle. When the vehicle includes an operating system to manage those of 66, 67, 68 and/or 72 which are located in the vehicle, communications between those element and load control 25*b* may be handled via a communications link with that operating system.

Battery charger 66 will be turned off by load control 25*b* whenever inverter 67 is selected by transfer switch 47. Generator 72 is preferred to be utilized to charge battery 68 whenever the battery is being used as an energy source for backup power and the battery becomes discharged from that operation or is already in a discharged state when needed for backup power. It is preferred that load control 25*b* operate to determine the level of charge of battery 68 at or below which it is desirable to start the generator 72 to charge the battery in order to maintain or extend the amount of energy which is available to power DC to AC inverter 67 to be utilized as backup power in the event of failure of the power grid 12. It is additionally preferred that in normal operation battery charger 66, under control of load control 25*b*, operate to charge battery 68 with low cost power, for example during night hours or from a low cost power source such as solar, wind or water power as previously discussed. Thus battery 68 may be kept at or near a fully charged state using low cost energy and used to power inverter 67 during power outages. Although the battery 68 and related elements of FIGS. 11 and 12 are not shown in FIGS. 4-10 the teachings related thereto generally may be incorporated with respect to any of FIGS. 4-10. FIG. 11 does not show a battery charger other than 66, however it will be understood that the teachings of FIG. 12 and in particular with respect to generator 72 will also be applicable to the system of FIG. 11.

If battery 68 is discharged to a predetermined level due to extended use for backup power or lack of initial charge, generator 72 may be started by load control 25*b* (or otherwise by the vehicle's own operating system) to recharge the battery. Load control 25*b* is preferred to manage loads in order to minimize the discharge of battery 68 while maintaining a user preferred level of power to various loads, either during normal backup operation or during charging by generator 72 or both. As an additional consideration, while generator 72 is preferred to be a fuel cell with no dangerous or annoying emissions, if generator 72 is an internal combustion engine or similar generating device which emits dangerous or annoying emissions it is preferred that the facility such as a garage in which it is housed (if any) include provisions for suitable ventilation and other protection against such emissions. Such protection is desired to be controlled by or otherwise monitored by load control 25*b* in order to ensure safe operation of generator 72. In an example of such protection, a garage will be fitted with an exhaust fan and monitor for potentially dangerous emissions (e.g. a carbon monoxide monitor) which fan is started when or near the time which the generator is started with the fan not being shut off by load control 25*b* until after generator 72 is stopped and carbon monoxide levels (and any other potentially dangerous emissions) are verified via the monitor(s) to be at or below safe levels. The exhaust fan is preferred to be otherwise controlled by load control 25*b* to run whenever the level of any emission is above safe levels.

Figure 13:
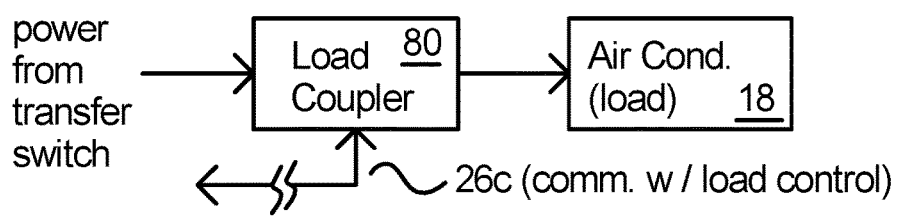
FIG. 13 shows a simplified diagram of a combination of load coupler 80 shown by example configured with typical air conditioner load 18 for coupling the load to the power source, in this example power from the transfer switch. Load coupler 80, described further with respect to FIGS. 14 and 15, may be utilized for an implementation of any of the load switches 22 if desired and communicating with load control via link 26c. Load coupler 80 may also be configured with a current control circuit 44 (not shown), with or without a relay, to be utilized as a load limit 43 for those types of loads which may utilize controlled current, as described herein.

FIG. 13 shows a simplified diagram of a combination of load coupler 80 configured with a load 18 shown as a typical air conditioner and communicating with load control via link 26*c* in order to control the coupling of power from the transfer switch to the load as taught above and as will be explained further in respect to FIGS. 14 and 15. Control link 26*c* may be of any type previously described but will be shown by way of example in FIGS. 14 and 15 below as a wireless link. As described herein the power and loads may take on various forms however for purposes of explaining the invention description will be given by way of single or multiple phase electrical power in commercial voltage and currents available to homes powering loads which are relatively heavy as compared to the utility service, for example electric air conditioners. Accordingly, 80 may also be configured as a load limit 43 if desired to provide control of suitable loads as discussed herein.

Figure 14:
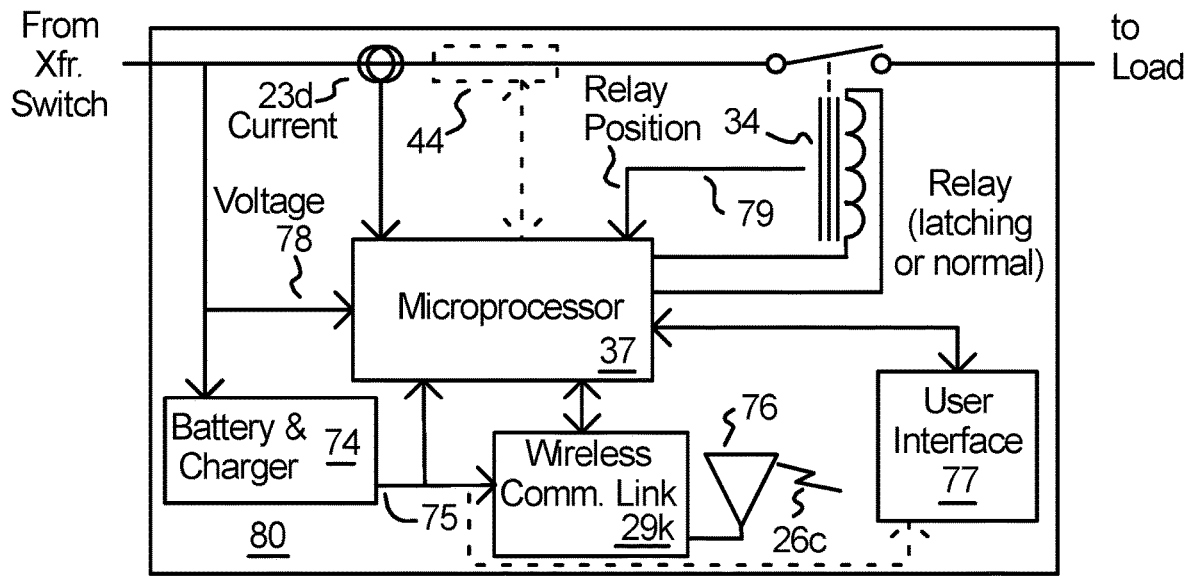
FIG. 14 shows a detailed diagram of the preferred embodiment of load coupler 80 of FIG. 13 having current sense 23d, relay 34 which may be latching or simple type, optional current control 44, relay position circuit 79, battery & charger 74 responsive to power from the transfer switch to provide backup power 75, wireless communications link circuit 29k receiving backup power and coupled to antenna 76 (which may be internal or external to 80) to communicate wirelessly with load control via channel 26c. Also shown is microprocessor circuit 37 powered by backup power 75 and responsive to current monitor shown as sense 23d, transfer switch power voltage monitor 78, and relay position circuit 79, with 37 controlling relay 34 and interfacing with wireless communications link 29k and user interface 77 which may also receive backup power 75 if desired.

FIG. 14 shows a detailed diagram of a commercially valuable embodiment of load coupler 80. Power from the transfer switch is controllably coupled to the load 18, shown in this example via controllable relay 34 which may be a latching or a simple type as desired. If desired, relay 34 may be replaced by or combined with a current control circuit 44 which communicates unidirectionally or bidirectionally with microprocessor 37 to control or limit current to the load as an implementation of load limit 43 previously discussed. It is preferred that by using microprocessor 37 and user interface 77, load coupler 80 may be manufactured as a standard device with each of multiple devices configured via the user interface 77 at the time of installation in a particular system to match the particular load being controlled.

Additionally, the load coupler 80 may be designed such that optional features, for example such as the aforementioned current control, or different size latching or simple relays, may be installed after manufacture as desired. For example, it will be desirable for the installer to have the ability to install a current control and/or relay of proper current rating to match the load. Once a unique name or other identifier is assigned to a particular coupler 80 via the user interface (or in manufacture), other configuration and test settings may be made via the user interface 77 or via a load control 25 or both. It is further desired that the installer have the capability to operate current control 44 and/or relay 34 and to operate, calibrate, test and/or check other functions such as battery charge, communications integrity and operation of sensing functions from either the user interface 77 or the load control 25 or both.

A latching relay which operates independent of external control from 37 to drop out and latch open when the voltage from the transfer switch rises above drops below known levels (setting a range of permissible voltage) is useful in protecting the load. This type of operation achieves high immunity from momentary disconnection due to over and under voltage conditions which frequently accompany power loss situations. Utilizing a relay which automatically drops out and latches provides a degree of protection which is independent of the other control circuitry, e.g. the relay will drop out independent of the control circuitry but the aforementioned capabilities may also be provided via microprocessor circuit 37 if desired.

If utilized, the latching operation may be configured to latch open only, or latch open and closed. Additional protection including noise and spike filters, snubbers, limiters or absorbers such as transient voltage suppressors (e.g. TVS diodes) may be utilized (not shown) to protect the load from such unwanted occurrences as will be known to the person of ordinary skill from the teachings herein. For example, when a simple relay is used momentary high voltage spikes may be passed to the load causing unwanted operation or damage and momentary disconnection of the load due to brown out or other low voltage conditions may cause unwanted operation or damage. For example, a short disconnection during a brownout may cause an attempt to restart an air conditioner compressor with a high head pressure as previously discussed. By use of a latching relay operating to drop out and latch independent of control circuitry an extra degree of load protection is provided.

Because microprocessors are low voltage and low current devices a current driver and/or voltage translator must often be used to provide a higher voltage and/or current to energize the coil of relay 34 than the microprocessor alone can provide. Such current driver (or voltage translator) may be incorporated in the microprocessor circuit 37, or the relay 34 or elsewhere. Accordingly, the energizing the coil of relay 34 may be dependent on power from the transfer switch (which would directly or indirectly power the relay coil) thus allowing short voltage transients to cause the current to the relay 34 coil to lower to the point of allowing the relay to briefly disconnect the load. That brief disconnection can happen even though microprocessor circuit 37 maintains a constant command to the relay coil driver circuit intending to keep the load energized. In this example the use of a latching relay which will latch off in the event of a momentary dropout will avoid a relatively quick restart of the load and the resulting damage. Other types of relays and disconnect and connect operations may be utilized to prevent or reduce such problems if desired as will be known to the person of ordinary skill from the teachings herein.

If a latching type relay or other circuit more complex than a standard relay is used, it is preferred that relay position circuit 79 be included in order that the microprocessor may know which position the relay or other circuit is in and in particular may know when the relay drops out. Such knowledge will be useful for example when voltage transients not timely sensed (or not sensed at all) by the microprocessor 37 occur. The relay position information will also be useful in the event the microprocessor is not programmed to store the relay setting when a change is made, or when the microprocessor is caused to reboot such as might happen in response to a monitoring routine, or as a failsafe to verify that the relay actually switches to the position commanded by the microprocessor.

The control of the relay is provided by the microprocessor 37 in response to various inputs and programming as described elsewhere herein. In particular a current monitor 23*d* provides a measure of current provided to the load to 37 and a voltage monitor 78 provides a measure of the transfer switch voltage to 37. While the control of the coupling of power from the transfer switch to the load is shown in FIG. 14 by way of example as a relay, it may also be performed by other circuits as well, for example by way of current control, current limiting or otherwise as will be known to the person of ordinary skill from the teachings herein.

A battery & battery charger 74 provides backup power to the various elements of 80 as desired in order that they may continue to operate in the absence of power provided by the transfer switch. The output of 74 may be AC and/or DC at any voltage desired to fit a particular use and application of 80 as will be known to the person of ordinary skill from the teachings herein. In the preferred embodiment of FIG. 14 it is desired that the battery be a rechargeable type and that it be charged whenever AC power is available from the transfer switch. It is further preferred that 74 include a switching type power supply to provide the desired DC and/or AC power at various voltages (and frequencies) which are needed by the various circuits within 80 in order that all desired circuits are operational whether AC power is available from the transfer switch or not. In this manner 80 may operate to provide control of the coupling of power to the load as taught herein. In particular, in the event grid power is lost and there is a delay before power is restored via the transfer switch, microprocessor 37 will have recorded the state of power consumption by the load immediately before power loss, will have a timer to determine the amount of time power has been lost and will have available load characteristics and/or other data which is used to determine the manner in which backup power may be coupled to the load when available. As one example, when an air conditioner compressor was running when the power is lost the microprocessor will know not to couple backup power from the transfer switch to the air conditioner until sufficient time has passed to allow head pressure to bleed off thus preventing excessive starting current or compressor stall. The user interface 77 may operate to provide various interaction between the user and microprocessor, and via the microprocessor to the load control as described elsewhere herein and in addition allows an installer to configure 80 to operate with a particular load.

In particular, it is desired that the microprocessor and/or load control may be accessed via user interface 77 in order to identify the particular load (and its characteristics) to the system and configure the system and/or microprocessor 37 to the particular load at the time load control 80 is installed in the system, or at subsequent times for example such as when the load or its characteristics are changed. This user capability will facilitate physical installation of 80 in near proximity to the load, for example at an outside air conditioner compressor and will reduce the number to trips between the load (and 80) and the load control which likely will be located near the transfer switch, the utility service entrance or a location convenient to the home owner.

Figure 15:
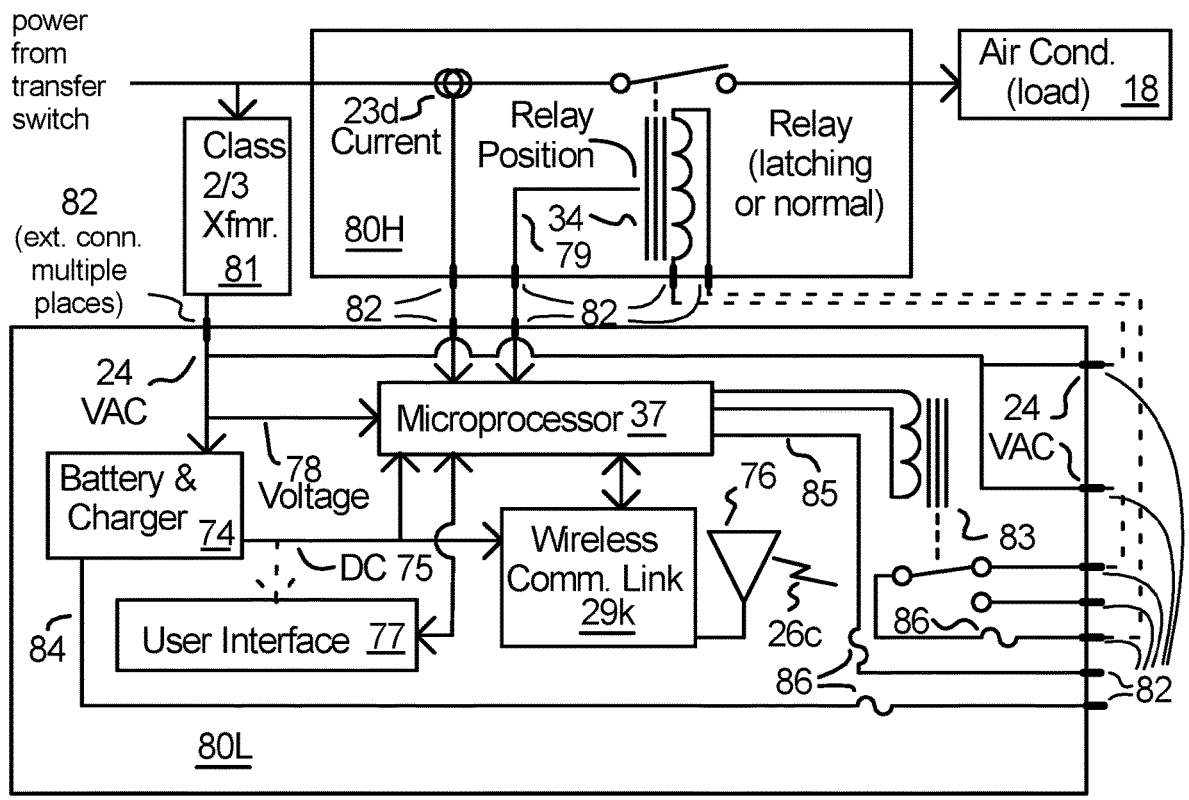
FIG. 15 shows a commercially valuable embodiment of load coupler 80 which is physically separated into two sections, a high voltage section 80H and a low voltage section 80L having multiple and various circuit connections 82 for connecting internal circuits of each section to the other and/or external devices. High voltage section 80H is configured to controllably couple power from the transfer switch to a load 18 shown by example as via an externally controllable latching or simple relay 34 having relay position circuit 79, section 80H further including current monitoring shown as sense 23d.

FIG. 15 shows a commercially valuable embodiment of load control 80 like that of FIG. 14 but which is physically separated into two sections, a high voltage section 80H and a low voltage section 80L. The two sections will facilitate design and manufacture to meet a particular application, including various testing and regulatory approvals. The low voltage section may be configured to provide a desired level of features and functionality for a particular system of level of systems and the high voltage section may be configured to provide a desired level of features and/or type of control of the load. Both sections may for example have options which may be installed after manufacture, such as the aforementioned capability of having relay and/or current control options installed at the time of installation to match operation of 80 with a particular load. It is desired that the interface between the low and high voltage sections be compatible for all combinations thereof. For example, the low voltage section may be configured in several models starting with a basic, low cost model with wired communications and a simple user interface to allow the user to only assign an identifier to each device in a small system with advanced, higher cost models (or installation of options) providing more features such as keypads, LCD displays, additional configuration and advanced programmability capabilities, wireless communications, etc.

The high voltage section may likewise be configured in several models from low cost basic to higher cost advanced models (or installation of options) to accommodate various power sources and loads such as particular operating voltages, maximum load currents and multiple power phases. In this fashion a manufacturer may sell a small number of low voltage section models and a small number of high voltage section models with a particular system installer choosing the type and number of each model and options to match the particular system being installed. Additionally, separate high voltage models may be utilized for relay or current control or a single model may incorporate both relay and current control or may incorporate multiple relays and/or current control devices. The high voltage devices may be controlled by a lesser number of low voltage sections or even a single low voltage section if desired, the latter being particularly well suited for utilizing the invention with, or incorporating the invention into, the transfer switch, power entrance service panel, a power sub-panel or any of the various local power generating devices taught herein, for example with respect to FIG. 8.

As an example of the usefulness of separate sections and options, a manufacturer might offer only one low voltage section with options for: user keypad, LCD display, relay 83 and wireless communications link 29k and two high voltage sections, one for single phase and one for multiple phase power, each with options for: current sensing, latching or simple relays of differing voltage and current ratings, current control circuits for differing voltage and current ratings.

The physically separated sections 80H and 80L will also facilitate installation and operation of the invention. For example, by keeping all of the high voltage components in the 80H section safety is enhanced by only having a minimum number of circuits which are potentially exposed to high voltages and to electrical interference and noise created by controlling high voltages and currents. Additionally, physical size is kept to a minimum thereby facilitating installation of that section near to or within the enclosure which houses the load. On the other hand, the low voltage section may be designed without overdue attention to high voltage, high current, interference, noise, regulatory and safety considerations. For example, by utilizing only low voltages in the 24 volt and below range various regulatory approvals will not be needed for the 80L section.

FIG. 15 shows an embodiment of the invention where high voltage and high current (e.g. a 240 VAC 50 amp supply) from the transfer switch is coupled to the load 18 via a relay with a 24 VAC control (coil). In addition, a class 2 (dry environment) or class 3 (wet environment) 240 volt to 24 volt transformer 81 is utilized to provide low voltage for the 80L section. It is desired that 81 be connected to the 240 volt power physically close to 80H in order that the 24 volt output may be used by microprocessor 37 (via 78) to monitor the 240 volt power from the transfer switch. For example, in a simple form the 24 volt AC output of 81 is monitored by the microprocessor circuit 37 to determine and compare the RMS voltage to a high and a low limit. If desired, the amount of time that voltage exceeds the high limit or falls below the low limit may be monitored as well. If the voltage falls outside of either acceptable limit for more than a predetermined time then the microprocessor circuit 37 may actuate relay 83, which in turn causes relay 34 to open thus disconnecting the load 18 from the transfer switch. The parameters for the high and low voltage limits as well as the aforementioned time duration are preferred to be programmable in order to protect load 18 from damage as well as to prevent it from contributing to overload and possible damage of the backup power source during a power outage as will be known to one of ordinary skill from the teachings herein. If desired a current monitor 23d, such as the aforementioned current transformer may be incorporated, as well as a relay position circuit 79 may be included to facilitate microprocessor circuit 37 control of power coupling to load 18.

Supply 81 is preferred to be a 24 volt AC transformer to provide low voltage power to section 80L and is chosen because it is a readily available standard device used in home heating and air conditioning controls, doorbells and elsewhere. Other AC or DC supplies may be utilized if desired, for example plug in 120 volt to low voltage AC or DC power supplies frequently referred to as "wall warts" may be utilized. In addition, the battery charger and/or battery of 74 may be incorporated as well. It will be noted that if a power supply which incorporates a voltage regulation circuit is utilized, the regulation will prevent monitoring of the voltage of the power from the transfer switch except for the loss of power causing the output of 81 to shut down. If a simple voltage presence is all that is desired then that may be monitored via microprocessor circuit 37 but if a more accurate indication of the actual voltage is needed other provisions will be required as discussed elsewhere herein.

Relay position circuit 79 is simply shown in the drawings as a connection from the relay 34 to the microprocessor circuit 37. The relay position circuit is preferred to incorporate a switch or switches which are coupled to the position of the movable portion of the relay, e.g. its armature, or to otherwise respond to its state, in order to open or close electrical circuitry in response to that position or state. Coupling may be by mechanical, magnetic, optical, electrical or other well-known coupling and the switch action itself may be mechanical, magnetic, optical, solid state or other well-known action. For a two state (open/closed) relay the switching action may indicate the relay closed or open or both as desired. For example, a switch may close a two wire circuit when the relay is closed, or may close a two wire circuit when the relay is open, or may include a three wire circuit with a common, first wire and second wire with the switch closing the common to first wire circuit with the relay in a first position (e.g. closed) and close the common to the second wire circuit when the relay is in another position (e.g. open).

Relays may incorporate more than two positions or states, e.g. the open, latched open, closed, latched closed of one type of latching relay, and the position circuit 79 may be configured to indicate all or a portion of the possible positions or states. Additionally, as discussed herein the relay 34 may be replaced by or augmented with other load control functions, circuits or devices, for example such as a circuit breaker capability or an electronic current limit with or without a switch, and the relay position circuit 79 may be configured to indicate such operation(s). For example, 79 may indicate breaker open, breaker closed, breaker tripped open in response to excessive current, or 79 may indicate relay open, relay closed, relay closed with a first current limit, relay closed with a second current limit. The relay position circuit 79 may also be combined with other operations as desired, for example the relay position 79 and current sense 23d may be combined to report to the microprocessor 37 over a shared or common communications channel. As another example the relay position 79 may be shared by a relay and a separate circuit breaker with 79 reporting relay open, relay closed and breaker tripped conditions (note it may be possible for the breaker to be tripped or closed while the relay is open or closed). The selection of particular circuit(s), action(s) and coupling(s) to fit a particular load and application will be well known to the person of ordinary skill from the teachings herein and may be resorted to without departing from the spirit and scope of the invention as claimed.

Various circuit connections 82 for connecting the 24 VAC supply from 81, 24 VAC relay control, relay position and current circuits to 80L are provided and it is desired that these connections be selected to facilitate installation of the sections via low voltage wiring, e.g. screw terminals, punch terminals or the like. Accordingly, the implementation of 80H may be performed with many off the shelf components, e.g. a U.L. approved class 2 transformer and relay mounted in a U.L. approved enclosure (which may be the air conditioner housing) and in a large number of air conditioners and other loads the relay and transformer are already present such that only 80L needs to be added to provide a controllable load 48. The low voltage portion 80L may then be installed nearby the load, but in a location convenient to the installer, for example mounted in a waterproof plastic case mounted to the outside of the load housing or an adjacent building wall. In such an installation the connections from the load housing (or 80H) to 80L may be achieved by use of an 8 conductor cable such as common 20 gauge thermostat wire. If the current transformer and relay position elements are not needed, such as in many air conditioners, a 4 or 3 wire (one side of the 24 VAC line will usually be common) thermostat cable may be used. Other AC or DC voltages may be utilized as well.

FIG. 15 section 80L includes a battery and charger circuit 74 to receive the AC (or DC) voltage from an external source. In this example power supply 81 serves as the external source, however power may be received from other sources as desired including via one or more wired communications link. The 24 volt AC power is preferably also made available to external devices via connections 82, and shown in this drawing as being used to control relay 34 via relay 83 and dashed connections. Connections 82 which are preferred to be readily available, low cost and easy to use terminals and can for example be spade lugs, screw, press fit or quick connect terminals and may be assembled on open or enclosed terminal blocks. The battery and charger circuit 74 provide backup (DC) power 75 with microprocessor 37, wireless link 29k having antenna 76 (which may be internal or external to 80L), user interface 77 and other circuits if desired, powered thereby. As with 74 of FIG. 14 a switching power supply may be incorporated to provide multiple output DC and/or AC voltages as desired including power 84 to external connectors 82.

While DC voltage 75 could be coupled to external connectors, it is preferred that 84 be a separate DC output which is isolated from 75 in order to protect 75, and the circuits it powers, from any adverse effects which would be experienced if some external device failed in a short circuit mode. In that event, power 84 might be shut down due to the short circuit however 75 will continue unaffected. In the embodiment of 80L it is desired for reasons of installation flexibility that the section includes a relay 83 which is controlled by the microprocessor and that the relay contacts are made available for external connection and further that one or more of these connections be current limited or otherwise protected, in this instance shown by the use of 86 in the relay swinger circuit. DC voltage output(s) 85 from the microprocessor circuit are also preferred to be made available for external connection as shown, including protection 86.

For example, a microprocessor output may control a 12 volt DC supply connected to a screw terminal as shown by 85. Connections to external connection terminals, if not otherwise protected (e.g. as with class 2 or 3 transformers) are preferably made via protection 86. Positive temperature coefficient (PTC) resettable fuses are particularly useful choices for such protection but other means of protection including for example current limiting circuits and devices, standard or other automatically resettable fuses or standard or automatically resettable circuit breakers may be utilized if desired. In this fashion 80L may be easily connected to 80H. 80L may as well be connected to various types of systems and devices by providing DC and/or AC voltage sources as well as normally open and normally closed relay contacts via screw terminal or other convenient types of connections 82. As shown via dashed lines between 80L and 80H in FIG. 15 these connections may be configured to control the coupling of power to the load in 80H.

In addition, it is desired that the type and number of circuits and their connections 82 be chosen in order to facilitate commonality of connections between various models of high voltage and low voltage sections and in particular any circuits unused in a particular installation be designed such that having any unconnected terminal(s) will not have an adverse effect on the system. For example if a highly featured low voltage section 80L provides for a number of connections 82 to the high voltage section 80H and external devices such as 81, and it is desired that if a basic high voltage section 80H is connected to that 80L, any unused circuits (or circuits which are intended to be used but are miswired or defective) are automatically detected by 80L such that they are reported to the user interface and/or load control, disregarded or the circuits are otherwise designed to accommodate the lack of connection.

One example in understanding this feature may be given in respect to current sense 23d. If the low voltage section 80L is designed to accept a connection to 23d but the high voltage section 80H is a basic model which does not include a current sense then 80L is desired to operate to detect the lack of a connection to a current sense and operate without it. This operation may be achieved via sensing the voltage, resistance or other characteristic (for example such as impedance or capacitance) between the connections and detecting a high resistance if there is no connection to 23d and a known resistance if 23d is connected. The microprocessor circuit 37 may operate to perform this sensing or to respond to other sensing circuitry. Multiple types of current sense devices may be detected and accommodated in this fashion, assuming each type has a different resistance or other characteristic. Previously present circuits which become disconnected, silent or otherwise inoperative or suspect (e.g. because of unusual readings) may be detected via the microprocessor circuit 37 and reported via the user interface 77, via communications link 29 to load control 25 or otherwise.

Another manner of accommodating unconnected circuits is via circuit design of the particular circuit. For example, a resistor or other component may be connected between two current sense connections on the low voltage section 80L or the high voltage section 80H to ensure little or no static charge or noise will build up on the circuits and thus zero current will be sensed and reported in the microprocessor circuit 37 if no current sense 23d is connected. The resistor or other component may also be used to signify the presence of the current sense 23d. If the current sense circuit 23d is connected the microprocessor circuit 37 will eventually be able to detect or respond to a voltage on the circuit (corresponding to a current flow in the load) when the relay 34 is closed and thus detects that the current source is connected. The microprocessor circuit 37 may also detect or respond to a voltage on the circuit (corresponding to a current flow in the load) and that voltage (load current flow) going to zero immediately after the relay 34 opens and know the current sense is connected. At initial installation or other times, the microprocessor circuit 37 may be caused to energize relay 34 to determine if a load sensor is connected, or to energize an alternative voltage or current circuit in the high voltage section 80H to simulate a current flowing to the load and thereby detect if the current sense circuit 23d is connected, which may also be used to calibrate the current sense circuit. These and other circuit operations and/or designs may be incorporated at either or both ends of the circuit communications between the two modules or the connections themselves to allow detection of connected or unconnected circuits, effectively communicating the configuration of one section or device to another. Microprocessor circuit 37 may also be programmed by an installer via user interface 77 and/or communications link 29 to identify the presence or absence of particular models, devices, features, options and the like.

It is envisioned in the commercially valuable embodiments of FIGS. 14 and 15 (as well as those of the of the preceding Figures) that for cost reduction reasons the microprocessor circuit 37 will be configured to perform many of the functions and features described, with the relays 83 and 34, current control 44, wireless communications link 29k and associated antenna, user interface 77 and battery and charger 74, current sense 23d, and power supply 81 being separate circuits for reasons of their diverse physical and/or electrical requirements. For example, relay 34 is required to handle high voltages and currents which with present technology make it difficult to incorporate that relay function into the microprocessor circuit 37. In keeping with the teachings herein, the load control 80 (or 80H and/or 80L) of FIG. 14 or 15 and their individual circuits and functions may be configured by the person of ordinary skill to fit particular needs and sets of requirements It is envisioned however that in the practice of the invention for particular applications and their requirements that combining various of the individual circuits and functions, and/or further separating of combined functions, removing features and functions as well as adding additional features and functions may be useful. Additionally, for higher volume applications it is envisioned that ARM and RISC types of processors, along with embedded designs and even ASIC devices will become attractive technologies for implementing portions of the present invention.

Figure 16:
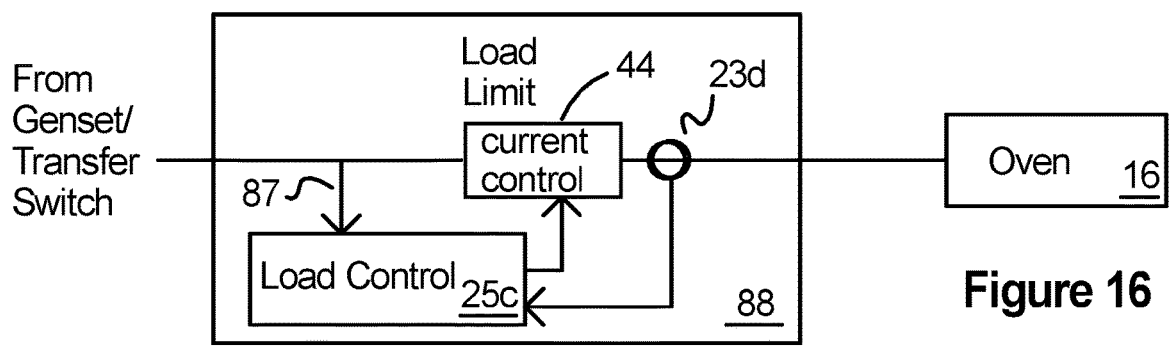
FIG. 16 shows a further embodiment of a load limit 88 controlling an oven 16 wherein a load control 25c responsive to the input power via 87 is incorporated with 88 along with a current control circuit 44 and current sense 23d.

FIG. 16 shows a simplified diagram of a further load control embodiment 88 which is coupled to power from the genset which is supplied via a transfer switch and controlling the power supplied to a load 16 with a current control 44. The load control circuit 25c, senses one or more parameter of the power, in this example the AC power frequency via connection 87 as well as the current drawn by the load via a current sense 23d and controls the current delivered to the load via control of current control 44. Load control 25c may also sense the voltage, distortion or other parameter of the power via 87 and incorporate those measurements into the control. In this embodiment the load control circuit 25c will operate to sense the power frequency (and/or voltage or other parameter) via 87 or otherwise and when the load in the genset nears or enters an overload condition the power to the oven will be reduced or limited or even turned off, thereby preventing or removing a genset overload.

Figure 17:
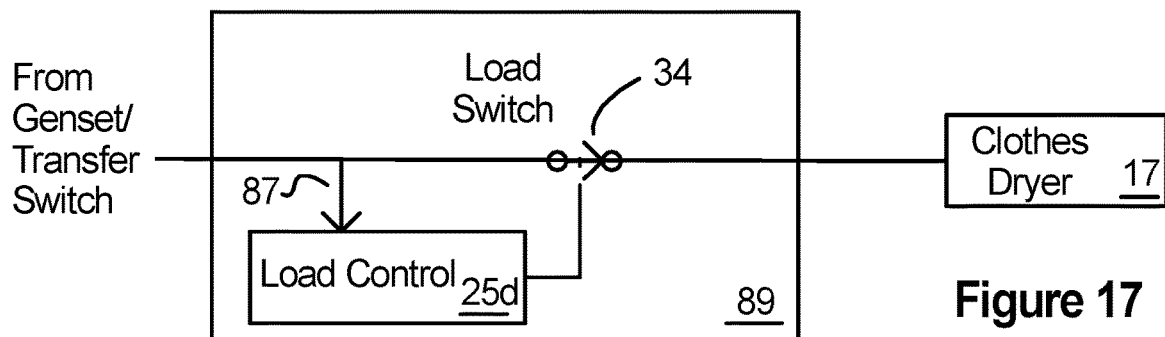
FIG. 17 shows a further embodiment of a load switch 89 controlling a clothes dryer 17 wherein a load control 25d responsive to the input power via 87 is incorporated with 89 along with contactor 34.

FIG. 17 shows a simplified diagram of a further load control embodiment 89 which is coupled to power from the genset and connecting or disconnecting the power supplied to the load via switch 34. The load control circuit 25d senses one or more parameter of the power, in this example the AC power frequency (and/or voltage or other parameter) via connection 87 and controls the connection of the load. In this embodiment a clothes dryer 17 is shown as the load by way of example and it will be recognized that if the voltage to the dryer were to be reduced by any substantial amount the electric motor which provides rotation of the dryer drum could overheat and be damaged. Otherwise, any slowing of the electric motor caused by reduced voltage (even for synchronous motors) could cause reduced airflow through the dryer and create a fire hazard. For these reasons it is more desirable to simply switch the dryer on and off via switch 34 than to attempt to limit the current supplied to the dryer. The embodiments of FIGS. 16 and 17 may operate with power inputs from any power source known in the art in which one or more parameter of the power changes as the load on the power source approaches maximum or enters overload, or a novel power source in which one or more parameter of the power is controlled in response to the load thereon as will be described in more detail below.

Figure 18:
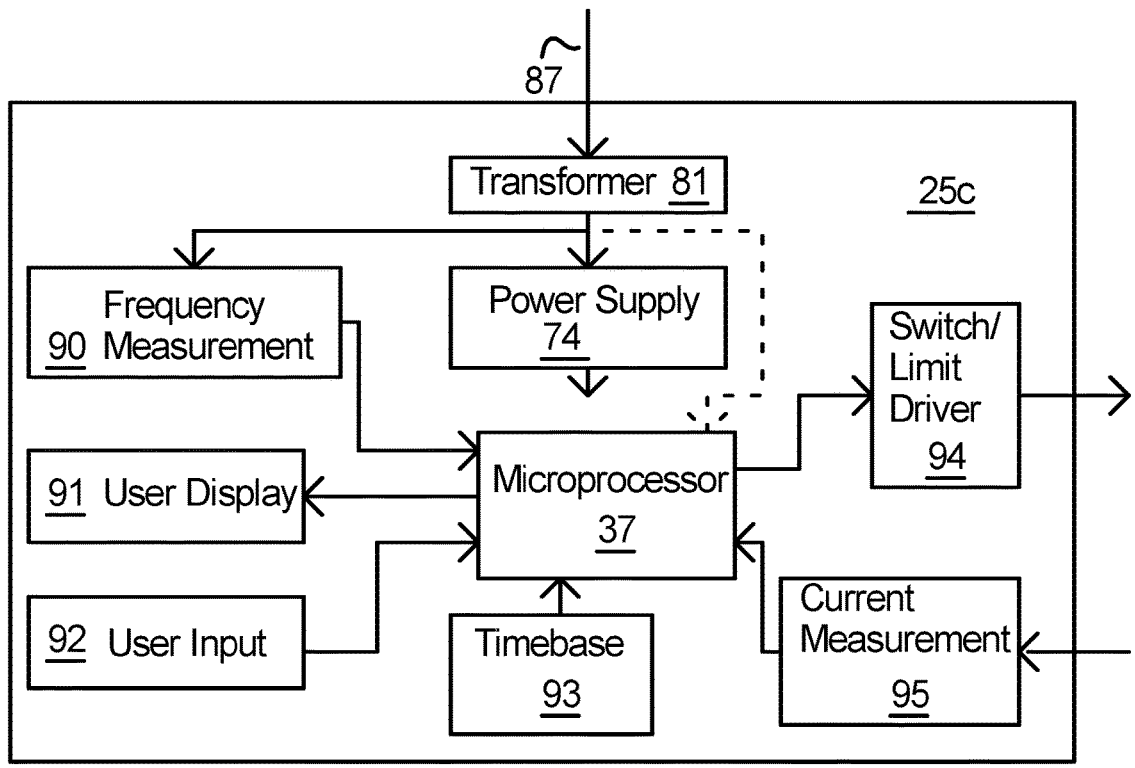
FIG. 18 shows the further embodiment of load control 25c including a transformer 81 responsive to the input power via 87, a power supply 74, frequency measurement circuit 90 responsive to the frequency of the incoming power, user display 90 for displaying messages to a user, user input 92 by which a user inputs information and/or commands, timebase 93 facilitating timing measurements, current measurement circuit 95 responsive to 23d, switch/limit driver 94 coupled to current control 44 (or alternatively 34).

FIG. 18 shows a more detailed diagram of the preferred load control circuit 25c having a transformer 81 which is connected to the AC power via 87, a frequency measurement circuit 90 responsive to the AC power via transformer 81 and supplying frequency information to microprocessor 37. A power supply 74 receives low voltage AC power from transformer 81 and supplies power to the circuitry of 25c as necessary. A user display 91 and user input 92 allow a user to communicate with the microprocessor 37 and a timebase 93 provides time information to 37. A current measurement circuit 95 is responsive to a current sensor 23d (not shown in FIG. 18) to provide load current information to 37 with 37 operating to communicate with a switch and/or limit driver circuit 94 to control the associated load. Microprocessor 37 may also be configured to sense one or more parameter of the power for example such as the voltage at 87 either directly or from the output of transformer 81 by using a voltage measurement circuit or otherwise as will be known from the present teachings. It will be recognized that the circuit may also be used as the load control 25d and if desired may eliminate or not utilize the current measurement circuit 95. Additionally, the circuit of FIG. 18 may also be utilized to control a parameter of the power for example such as by control of the frequency and/or voltage of the AC power supplied by the genset in response to the load on the genset as will be described further below.

Load control circuit 25c may include a transformer 81 coupled to the AC power from the genset (e.g. which is supplied for a particular load) and to provide a safer low voltage for use by the circuitry. In particular it is desired that 81 be the aforementioned Class 2 (dry) or Class 3 (wet) transformer having an input voltage matching the genset voltage (e.g. 120 volts) and an output voltage of 24 volts as is well known in the genset industry. Other types of transformers may be utilized as well to fit particular needs. Power supply 74 is preferred to receive the AC voltage from the transformer and provide battery backed up D.C. power out at a voltage, or voltages, utilized by the circuitry of 25c. In particular 5 or 3.3 volt outputs for powering the various circuits 90-92, 37 and 93-95 are desired.

A microprocessor circuit 37 is provided which operates to interface with the circuits 90-92 and 93-95 to receive AC power frequency information from frequency measurement circuit 90, optionally receives parameters such as voltage information from 87 or otherwise, receives timebase information from timebase 93 (which may be provided by the crystal oscillator for the microprocessor clock and internal circuitry), current information from current measurement circuit 95, and user information from a user input 92, and to provide messages to the user via user display 91 and control of the current control 44 of FIG. 16 or load switch 34 of FIG. 17. Optionally the circuitry may provide control of the speed of the genset engine or voltage of the generator output (not shown) via an electronic switch/limit driver circuit 94. User display 91 may be of any type well known in the art suitable to display messages to the user as taught herein and may also be utilized to facilitate user input, to display operating conditions, provide fault warnings and to display other messages as will be known to the person of ordinary skill from the teachings herein. User input 92 may be of any type well known in the art suitable for input by the user as will be known to the person of ordinary skill from the teachings herein. User display 91 and user input 92 may be combined if desired, e.g. via a touchscreen.

It is preferred that 25c be mechanically configured in order that it may be physically located next to current control 44, load switch 34, the controlled load, e.g. 16 or 17. In particular it is desired that it be incorporated with those components within their enclosures for ease of installation. In particular, by incorporating the elements as shown in FIGS. 16 and 17, or within the load, or within the genset the additional wiring necessary for connection of the load, or the genset is kept to a minimum. In this fashion control of individual loads may be provided without the need for a more complex load control communicating via links to a plurality of load limits and load switches thus providing flexible and cost effective overload protection, but at the potential cost of accuracy due to reliance on power parameters measured at that load as compared to the embodiments of the earlier figures which may operate with accurate measurement of the total power output of the power generator.

In operation 25c or 25d is preferred to monitor power parameters for example the AC frequency (and/or voltage) of the supplied power and control the load accordingly. In particular the characteristics of the frequency (and/or voltage) versus load are preferred to be programmed into the microprocessor either at manufacture or by the user during installation in order that the microprocessor may know if the load being supplied by the generator is below overload, near overload, slightly overloaded, significantly overloaded or highly overloaded. It is also preferred that the microprocessor be programmed in order to know the type of load being controlled and its priority and to control the load, via driver 94 according to the amount of overload, the time that amount of overload has existed and particular characteristics of the load.

As one example if the genset is nearing overload the load control circuit will operate to prevent a low priority load from being connected to prevent additional loading of the genset, or to disconnect or limit the current supplied to a low priority load in order to reduce the load already coupled to the genset. As another example if the genset suddenly becomes significantly or highly overloaded a low priority load would be prevented from being connected or immediately disconnected if it is connected. Lower priority loads are preferred to be connected only when the genset is below overload, or if a high priority load is relatively small it may be connected when the genset is only slightly overloaded. If already connected when the genset goes into any overload condition the higher priority load would be disconnected only after a time delay (set by the user) in order to give other lower priority loads time to be disconnected by their controllers. In this respect it may be recognized that a plurality of FIGS. 16 and/or 17 load controls may be utilized with each one programmed with a different time delay in order that the lowest priority load is disconnected first, thus avoiding the prior art problem of disconnecting all lower priority loads simultaneously. In addition, a low priority load may be disconnected or left unconnected with no attempt to reconnect the load being made until the genset is below (or well below) overload thus preventing the prior art problem of blindly connecting low priority loads. Of course, multiple driver 94 and/or current measurement circuits 95 may be incorporated within load control 25c in order to monitor and control multiple loads according to the teachings herein.

Additionally, in 25c or 25d current measurement 95 may be utilized to monitor the current drawn by a load and to control that or other loads accordingly. For example, if the load is one that should not be connected immediately after is disconnected, such as an air conditioner compressor, 95 may be utilized by the microprocessor 37 to determine when the load was last drawing current and a timer used to prevent reconnection before it is safe. It is preferred that the microprocessor 37 have stored parameters pertaining to at least the frequency at which the genset is exhibiting an overload, and may also have stored parameters pertaining to time durations versus overload and parameters pertaining to the load being controlled, priorities and desired system operation. The stored parameters may be stored at the time of manufacture, at the time of installation or later, e.g. via user input 92, or may be determined by the microprocessor during operation and stored for future use.

A novel feature of load control circuit 25c is that it may be utilized to control one or more parameter of the power output from the genset in order to convey load information to load controls 88 and 89. For example the speed of the genset engine and thus the power frequency, and/or the alternator control and thus the voltage, of the output AC power may be controlled as a measure of the loading of the genset. In this fashion this reasonably accurate measure is coupled to individual load controls for control of those individual loads without the need for separate communications therebetween. In this fashion the prior art need to hard wire communications from the transfer switch to the load contactor is eliminated while at the same time improving the accuracy of overload detection. This capability is particularly useful with typical gensets which have an engine sized such that the alternator will overload before the engine slows down, but is also useful for gensets where the engine will slow down first. The current supplied by the genset is preferred to be sensed with a current sense such as 23d which is coupled to current measurement 95. That current is then utilized by the microprocessor 37 to generate a control signal (or a plurality of control signals) via driver 94 which is coupled to the genset engine's engine control module, or otherwise to the throttle of the engine in order to control the engine speed and thus the power frequency by know amounts in response to the load.

The driver 94 or another driver may also be coupled to the alternator to control the voltage output if desired, either in addition to frequency control or in place of frequency control. For example, if the genset is at 95% of its rated load the power frequency can be lowered from a steady state 60 Hz to for example a steady state 59.5 Hz. If voltage adjustment is used the voltage may be lowered from a steady state 120 volts to 115 volts. These are relatively small amounts but may be measured by frequency measurement circuits 90 and/or voltage measure function of 37 in individual load controls to signify that the genset is nearing full output capability. It is preferred that a microprocessor 37 which is utilized for such frequency and/or voltage control have stored parameters related to current levels relative to overload and desired frequency and/or voltage relative to current or loading levels. The stored parameters may be stored at the time of manufacture, at the time of installation or later, e.g. via user input 92, or may be determined by the microprocessor during operation and stored for future use.

If the genset goes into overload, for example 105% of its rated load, the microprocessor can then operate to adjust the frequency and/or voltage to a different amount, for example 59 Hz and 110 volts. This will let the individual load control circuits know that the genset is slightly overloaded in order that they can control their loads accordingly. For example, at this value one or more low priority loads can be limited or disconnected, preferable in sequence according to their priority with the lowest priority loads being disconnected first, until the genset load returns to an acceptable amount which would result in the genset control returning the frequency to 60 Hz and 120 volts. For very low loads the frequency could also be increased, for example if the genset is only loaded at 50% the frequency could be set at 60.5 Hz and the voltage set to 125 volts.

Of course, setting engine RPM and/or frequency accurately in response to load is useful in the preferred embodiment and the microprocessor 37 may operate to sense that RPM indirectly by monitoring the power frequency via 13 and sense voltage via its voltage circuit. In this fashion highly accurate settings may be established with any inaccuracies being sensed and removed or reduced via adjustment of the control provided to the engine via 90. It is noted that the use of frequency measurement circuit 90 and voltage sensing circuitry in 37 are provided by way of example and one of ordinary skill will know to practice the invention with many variations of circuitry and microprocessor types 37. For example separate voltage and frequency circuits may be utilized with their outputs coupled to 37, a combined voltage and frequency circuit may be utilized with its output coupled to 37, or for some microprocessors having analog input capabilities, e.g. one with an analog to digital converter, a low voltage version of 87 (e.g. the output of transformer 81 coupled via a resistor divider or otherwise) may be coupled to 37 as known in the art and any desired power parameter or combination thereof may be determined directly thereby.

It is preferred to accurately control engine RPM and many gensets already incorporate a frequency control circuit so that the driver 94 should be coupled to that frequency control instead of the engine control module or throttle. It is also possible to modify some frequency control circuits to accomplish a known relationship between power frequency and genset load without the use of the full circuitry of 25*c*. It is still further possible that the voltage regulator or other circuitry of the alternator which controls output voltage may be coupled to be controlled via 37 utilizing a driver circuit 94 or otherwise or that that control circuitry may be modified to provide a known relationship between output voltage and power without utilizing the full circuitry of 25*c* as will be known from the teachings herein. Further, both voltage and frequency control of a genset may be utilized to convey load information to load controls.

Whether there is a dedicated control of genset frequency or voltage in response to the load, or merely a simple engine speed or alternator control without any controlled response to load (e.g. via a circuit 25*c*), it is possible for the microprocessor of a load control 25*c* to operate to infer load conditions by measurement of one or more parameters of the output power. One or more of frequency, voltage, distortion and noise changes which take place as loads are connected and disconnected as previously described may be utilized. Performance of a genset generally decreases as it approaches overload and that decreased performance often results in measurable changes in one or more parameter such as frequency, voltage, distortion and noise which may be utilized to sense loading. As an example, when the genset is lightly loaded a refrigerator motor starting might cause the frequency to only dip 0.1 Hz for 3 seconds and when the genset is near maximum load the same motor starting would cause a 0.3 Hz dip for 3 seconds. The voltage might dip one volt if lightly loaded and 5 volts if near maximum. Distortion, such as sine wave distortion of the power might not increase at all if lightly loaded but jump to 5% if near maximum output and noise might increase by 10 Db.

More generally, for a particular genset the parameters such as frequency and/or voltage variations of the output power may be known to increase in size or duration as the genset approaches full load or enters overload conditions. By monitoring these parameter changes which take place with the somewhat random normal load changes during operation the microprocessor may estimate the amount of load. In particular by utilizing the aforementioned circuitry to perform current and voltage measurements combined with either a known connection of a load such as an air conditioner compressor or the somewhat random changes of normal operation it will be possible to estimate the total load on the genset. Such monitoring is particularly useful for controlling large loads where it is undesirable to allow those loads to impart large step loads to an already heavily loaded genset.

The above described feature of determining genset loading from output power parameters such as the frequency, voltage, distortion or noise resulting from a particular load change is particularly useful when multiple loads are controlled by a given load control circuit. In this fashion differing loads of differing priority may be controlled to optimize powering those loads without overloading the genset, according to information about the loads, genset, priorities and desired performance of the system as programmed in the load control operation time of manufacture, or manually or automatically at time of installation, or later via automated monitoring of power parameters or manually via the user display and input.

One example of an embodiment of the invention described above which will find particular usefulness in modern homes and businesses is the incorporation of the load control 25*b* and various communications links within, or combined with, a more extensive home control system in order to provide flexible backup power in the event of a power grid failure and to manage the cost of power consumed by the loads. It is preferred that the a home control system (or part of the system) will automatically manage the operation of the home as is well known in the home control industry, e.g. to set temperatures, provide home operating modes such as away and occupied, operate lighting and entertainment appliances, operate door locks and control access to the home, monitor the home for failures and intrusions, all of which may be performed automatically or as commanded or programmed directly or remotely by the home owner. U.S. Pat. No. 7,379,778 describes one such home control system. Of particular advantage in such a combination is the relative ease of adjusting load priorities. For example, if the home control is programmed for unoccupied operation various loads such as hot water heaters, air conditioners, ovens and other devices which are primarily used for comfort of the occupants can be assigned low priorities.

Additionally, the present invention is desired to be incorporated in or otherwise combined with the home (or business) control system to include not only control of power consumption during times of limited available power or failure, such as when the grid power goes into brownout or fails, but also to facilitate reduced waste and lowered cost. Additionally, the incorporation in a home control system allows the invention to respond directly or remotely via telephone, internet or other communications link(s) as described herein to provide the home (or business) owner with information about the home, including grid, generator and load operations and to additionally respond to desired priorities for powering devices and otherwise operating the home (or business). In particular as explained above several types of power sources generate excess heat in their operation, which excess heat may be utilized under control of load control 25b to provide heating, e.g. water heating or radiant heating as requested by the automation system.

Exemplary Small Backup Power System Embodiment

An embodiment of the invention as used with small backup power systems, which is believed to achieve a commercially desirable tradeoff of performance and cost is given by way of example. This embodiment is described with respect to FIG. 8 as used in a home and is explained in more detail below and may operate to prevent overloading of one or more of the power sources 12, 13 and 50 and in particular may be utilized to allow the use of distribution panels having amperage ratings higher than the service or backup power source rating. The explanations below may depart from the more general explanations given above under the description of the preferred embodiment in specific areas.

This small backup power systems utilizes a backup generator which is only capable of providing power for part of the maximum possible load which can be connected when the power grid fails and the total load must be controlled to prevent an overload. With some prior art systems such as that of FIG. 2 this limit is hard wired, that is, only certain higher priority loads are connected to the backup generator and those lower priority loads which are not connected simply go without power. In other prior art systems such as that of FIG. 3 certain lower priority loads are connected but are all immediately disconnected if the frequency of the AC power from the generator drops as a result of an overload. Those disconnected loads are then reconnected after a time delay without regard to whether the generator will be able to power it and thus a high probability that another overload may be created.

Neither of these systems is capable of a high degree of utilization of the power available from the generator with high overload immunity, in the first low priority loads are never powered and the generator may run well below its load capability and in the second a low priority load may be powered part of the time but when it is disconnected after an overload it will not be reconnected until after a time delay which is unrelated to the generator's ability to power that load at that later time, i.e. it is blindly reconnected which may result in an instant overload and possible damage or circuit breaker tripping. In addition, when utilizing prior art gensets (i.e. those which do not have an active control of frequency in response to loading) and relying on power frequency as a measure of overload the detection of overloads has less that desired reliability in many cases.

Recognizing the above faults, this embodiment of FIG. 8 controls the total load presented to the generator 13 to connect some or all loads 16-19 & 48 according to a priority, which priority may be changed manually or automatically. In particular the load control 25b is programmed with parameters pertaining to the power sources and loads, which parameters are necessary to achieve the desired mode(s) of operation of the system. For example, 25b is preferred to be programmed with the maximum current output of the solar panel 50 (if utilized), the maximum current output of the generator 13, the current output for optimum efficiency of the generator 13 and the current drawn (e.g. load) by each load which 25b is capable of controlling (e.g. connecting). A group of high priority loads 19 such as selected lights, home controls, alarms, food storage appliances and the like which are desired to be powered whether the home is occupied or not are always connected and receive power from the transfer switch 47 upon loss of grid power, it being preferred that these high priority loads are selected to ensure that they are not capable of overloading the generator at their maximum current demand.

When operating with the solar panel 50 (if provided) and/or generator 13 it is preferred that load control 25b operate a) to prevent overloading the generator 13 or solar panel 50 by preventing or limiting the connection of loads which would cause an overload, b) to immediately cure an overload by promptly disconnecting or limiting one or more connected load, c) to maximize efficiency of solar panel 50 and/or generator 13 by allowing operation of loads which the generator and/or solar panel are capable of powering when they are operating below their optimum capability, d) to alert the home owner that power is not available to power one or more particular device(s) which the home owner may wish to operate and e) allow the home owner to decide what to turn off (or limit or leave off) in order to prevent having a device (and possibly several others) turned off shortly after the desired device turned on due to an overload. Selected loads that may but do not need to be connected are preferred to be connected when the generator and/or solar panel is operating below its optimum capacity or efficiency in order to provide operation closer to that optimum. These operations are performed by the load control 25b in response to the loads currently connected to the solar panel 50 and generator 13 as measured via current sense devices 23a and 23c and the herein described stored parameters for the generator and solar panel, as well as stored parameters for loads which can be connected or otherwise controlled by 25b.

When the generator is operating well below optimum, either during exercising or during outages, an increase in the efficiency of the operation is achieved by connecting lower priority loads such as battery chargers, water heaters, heat and air conditioning units. Accordingly, different modes of operation may be assigned to the backup system by the user via 21 or otherwise, with the user selecting priority of connection of the loads and the system automatically connecting and disconnecting loads to best achieve the priority based modes of operation under control of load control 25b operating in conjunction with the other elements of the load control system shown in FIG. 8.

Importantly, the priority of one or more load(s) is preferred to be changed automatically, or by the user if needed with the changed priority being permanently stored, at least until it is updated, for an amount of time selected by the user, or for other conditions selected by the user. For example, to cook a meal which has already been started when the grid power goes off. The load priority for the oven may be changed automatically by 25*b* recognizing that the oven was in use when power failure occurred, with the priority of the oven being returned to its previous value when the cooking ends as sensed by the current being drawn by the oven or otherwise. Alternatively, if the priority is not automatically changed by 25*b* the user may assign a higher priority to the oven for a time period such as an hour to allow completion of the cooking, or in response to the condition of the oven no longer utilizing a large current for 15 minutes indicating the cooking is completed. Thermal sensors may also be utilized to provide oven temperature to 25*b* as part of the miscellaneous devices 21, which temperature may be utilized to set priority.

Priorities may be automatically changed, temporarily, permanently or repeatedly in response to environmental or other conditions via 21 or otherwise. For example some lights are more important at night than in the daytime and heating is more important when it is cold outside than when it is hot, but this importance is tempered by whether or not anybody is home and thus priorities for such items are preferred to be set at a first value when the home is not occupied and/or during daylight hours and a second value when the home is occupied and/or during night hours. As another example a temperature sensor may be provided for a food storage appliance such as a freezer, refrigerator or wine cooler as part of 21 and if the temperature should approach a dangerous level (high or low) that food storage appliance can be made a high priority until a safer temperature is reached. If the problem of the food appliance approaching a dangerous temperature occurs often during power loss events its priority may be automatically changed to a higher priority by 25*b* whereas the priority may be automatically lowered if the problem infrequently or never occurs. Such automatic changes will serve to adjust operation to a more optimum condition.

Decisions can also be aimed at efficiency. One substantial consideration which can be utilized is the cost of providing power from the grid vs. cost from the generator, for example for a homeowner having one or more electric vehicle. If power can be obtained from the electric utility or elsewhere at lower cost during certain times, for example during the night, the load control can be utilized to control loads in a manner to best take advantage of the lower cost power. Load control 25*b* may receive the cost of grid power at various times and the cost of generator fuel (e.g. natural gas) automatically via the internet or otherwise and calculate the best time to charge the vehicle's batteries from the grid or alternatively from the generator even though grid power is available, depending on the cost. The load control 25*b* may also take into account the need to exercise the generator and delay battery charging until an upcoming scheduled exercise, advance the exercise time once to charge the battery or change the exercise time schedule to accommodate the home owner's changing vehicle usage.

The load control is preferred to utilize intelligent timing for connecting and disconnecting loads to one or more power sources in order that the total load on any one power source is kept at or below the maximum output capability of that source, or alternatively at or near an optimum efficiency level, which may be at or below the maximum output capability. It is preferred that at all times the home owner has the opportunity to interact with the load control processor in order to facilitate any out of the ordinary power needs the home owner may desire or require and which are not automatically provided for by the load control. For example, the home owner may choose to turn off an air conditioner or vehicle charger for 30 minutes in order to allow normally low priority clothes dryer to be used. As another example the home owner may want to limit the current supplied to an oven (causing the heating element to be on for longer periods of time) to allow an air conditioner to be used.

More generally, the present invention described herein may also be utilized to communicate with a power utility to allow that utility to manage power consumption, for example to cause partial or total removal of loads from the power grid as the utility deems desirable or necessary during times of high power consumption, lack of grid capacity or grid failure. The power company may notify the load control of possible or scheduled events pertaining to the supply of power from the grid, e.g. poor power quality (i.e. power not meeting specifications set by for example the utility, the home owner or a regulatory agency) or rolling blackouts. The load control will then cooperate with the utility to accomplish the desired degree of power consumed from the grid.

It may be desired that the utility company may interact with the load control to negotiate sending power to the grid from one or more power sources or loads e.g. during times of peak load. For example, the power company could request that the load manager send power from the power sources 13, or 50 or from the battery 68 via inverter 67 (FIG. 11) or the like into the grid. The load manager may be configured to negotiate pricing with the electric utility for the power which it wishes to be delivered. In such negotiations the load manager is preferred to take into account the cost of power available from various sources which are available to it to transfer power back to the grid.

Figure 19:
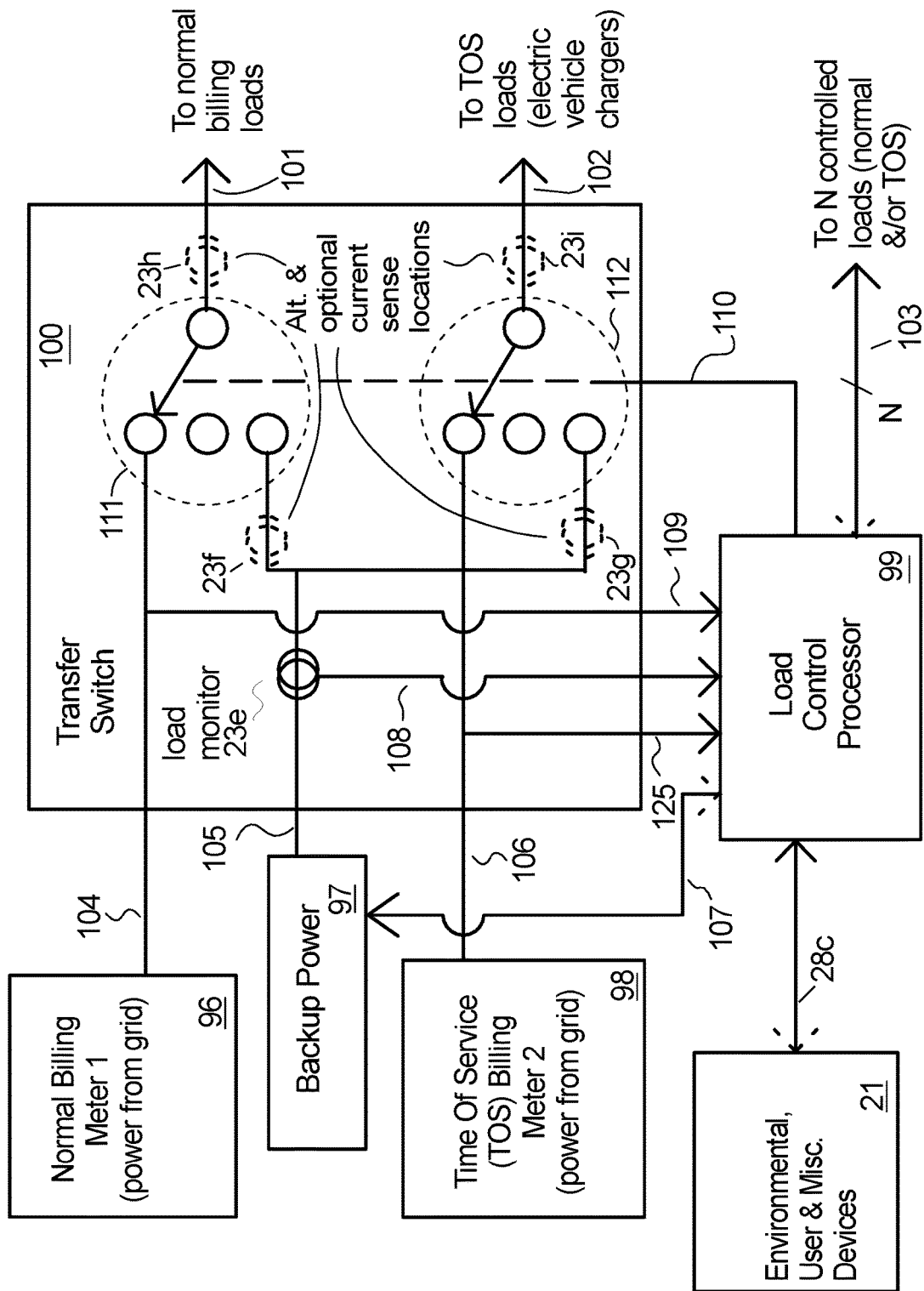
FIG. 19 shows a still further embodiment of a load control processor 99 and dual transfer switch 100 which is preferred to be utilized in systems which have regular or normal utility company metering as well as time of service (TOS) metering for example when a utility company customer can purchase electricity at preferred rates. The embodiment shown includes a normal billing power input 104 to the transfer switch from a first meter 96, a TOS power input 106 to the transfer switch from a second meter 98, a single backup power source input 105 to the transfer switch from a backup power source 97, a transfer switch 100 including load monitor 23*e*, contactors 111 receiving power via 104 and 112 receiving power via 106 and having on-off-on throws. Both 111 and 112 have backup power contacts which are electrically paralleled in 100 to receive backup power from 97 via a single input 105.

FIG. 19 shows a still further embodiment of a novel load control and novel transfer switch for use in small backup power systems and incorporates many elements the same as or similar to those described above as will be known to the person of ordinary skill from the teachings herein. Details shown elsewhere herein are omitted from FIG. 19 for clarity, however it will be understood that one or more such details may be practiced with this embodiment. The embodiment of FIG. 19 is preferred to be utilized in systems which have two separately metered power input circuits 104 and 106 which are provided to the same power customer, either or both of which may fail or not meet an acceptable level of quality, thereby creating a desire or need to use of backup power from source 97. The novel arrangement of FIG. 19 will find particular and novel use with inputs 104 and 106 having unequal power ratings as will be described further below. These power inputs 104 and 106 may for example be provided from the same power grid connection, from different substations of the same power grid, from different power grids or more generally from any two power sources suitable for providing power to small backup power systems. In particular, the preferred embodiment of FIG. 19 load control and transfer switch will be found useful in systems which, unlike the prior art, utilize separate and unequal power inputs with separate metering. It is preferred that the actual metering circuits of the dual meter comprise electronic metering e.g. a processor receiving voltage and current information from sensors such as for example metallic voltage contacts and current transformers and calculating power in units corresponding to those used in billings, and if desired other power parameters as well.

Split utility service entrances having a single meter and two equally rated service feeds are known in the art. As an aid to understanding these systems, one may refer to what is perhaps the most common one used in the U.S. which is described in U.S. Pat. No. 9,281,715 to Lim et al. The Lim et al. device receives and meters a single 400 amp feed from the grid, and uses a splitter (30 of FIG. 6) to split the 400 amp feed into two 200 amp circuits. (Col. 1, ll. 34-44.) The two 200 amp circuits will be referred to herein as A1 and A2 for convenience in describing the device. As shown in FIG. 2, the A1 and A2 circuits are coupled to circuit breakers 38 and 40, presumably rated at 200 amps each. The circuits A1 and A2 are further coupled to a corresponding 200 amp load center (breaker) panels 11 and 12. From here the two panels distribute power in two separate power circuits to the various loads in the house. One of ordinary skill will recognize that it is desirable to wire the loads to the two distribution panels 11 and 12 in order that those loads will be roughly equal at times of high loading in order to maximize use of the 400 amp service and prevent overload of one of the panels. With a single revenue meter, the loads may be wired to either panel as desired to balance the loads.

For example, if the total of loads that the house is capable of presenting is 380 amps, it is undesirable to wire loads that can present a maximum 290 amps to one panel and wire loads that can present a maximum 90 amps to the other as it could cause a breaker trip. Extending the example further, it would be contrary to the known use of two 200 amp panels, as well as the Lim et al. teachings, to prevent such a breaker trip by using a 100 amp panel for the 90 amp load and a 300 amp panel for the 290 amp load. However, it will be known to the person of ordinary skill from the teachings herein, that it is possible and even desirable to use differently rated service entrances, a much smaller generator and transfer switching circuitry of unequal ratings. That is, the present invention is desired to operate with a plurality of service entrances of unequal size with correspondingly rated switching circuitry, and additionally to utilize a backup power source rated at a third size.

Lim et al. teaches away from the instant invention. Lim adds two 200 amp transfer switches 42 and 46 to the equal current split system (Col. 4, ll. 54-67 & col. 5 ll. 17-21) as well as a backup generator feeding a splitter with outputs coupled to the two transfer switches. (FIG. 2.) The Lim et al. system is used is described at col. 1, ll. 61-64 (underlining added) "Since the building normally receives the primary power source the backup power management system is designed including a secondary power source that provides the same level of voltage and current to power loads within the building." In other words, that is the way Lim's system is designed, 400 amps total from the grid and 400 amps total from the backup. At col. 5, ll. 8-11 (underlining added) Lim confirms "Like the power splitter 30 described previously the secondary power splitter 54 splits the power supply from the secondary power source 26 into two separate power outputs." Lim et al. teaches that both the 400 amp grid and 400 amp backup sources are split into two 200 amp outputs. Presumably, in view of these Lim et al. statements, the circuit breaker 52 is rated at 400 amps. Lim et al. does not teach or even mention any other sizing.

Continuing now from the discussion of the prior art, in order to obtain particular levels of performance, reliability and cost, the load control processor circuit 99 of FIG. 19 may operate with desired ones of capabilities and features shown and described herein, including various ones of load controls 25 and the environmental, & Misc. Devices 21. While shown as a separate device in FIG. 19, it will be appreciated that parts or all of the load control processor circuit 99, like other portions of the invention, may be incorporated in or shared with various backup power devices, transfer switches, loads and home controllers. The invention will find further use with powering of fire pumps such as those that pump water to fire sprinklers throughout a building where the fire pump must run despite any dangers to equipment such as for example overloading conductors.

The National Electric Code (NFPA 70, 2017 Ed. or NEC incorporated herein by reference), article 695 covers wiring of fire pumps, etc., and standby generators used therefore, in some detail. In particular section 695.3(B)(2) deals with overcurrent protection devices which includes subsection (1) "Overcurrent protective device(s) shall be rated to carry indefinitely the sum of the locked-rotor current of the largest fire pump motor and the pressure maintenance pump motor(s) and the full-load current of all of the other pump motors and . . . " (underlining added). That is a substantial departure from normal wiring practice where the wiring equipment must accommodate those as well as normal loads. The instant invention will be of benefit, allowing the fire pump system to be powered from a second service entrance and/or via a second section of the transfer switch, with a backup power source. This and other critical and emergency equipment wiring such as emergency lighting, elevators, smoke exhaust fans and the like (referred to herein as critical loads) will also benefit.

One of ordinary skill will recognize from the teachings herein that because the total of the critical loads may very well not be as large as the rest of the loads, using two service entrances of unequal size as compared to one large entrance, is desirable. In particular, it will be understood that load control processor may operate such that non critical loads may be shed to provide power for critical loads in the event power is being provided from the backup power source 97. As just one example, using a dual transfer switch with center off capability where in an emergency the normal load part of the transfer switch may be switched off leaving only the critical loads to be powered. Codes permitting, this will allow the homeowner to use a 200 amp service entrance per load calculations but yet accommodate another 100 amp service for emergency loads which if used in the load calculations could require a 300 amp service, if it is even available.

The embodiment of FIG. 19, shows two physically separate service entrances with physically and electrically separate meters 96 and 98 which measure the net power flowing from the respective power source to their output 104 and 106. Such meters are often referred to as revenue meters and measure watthours of power which flow from the utility, through the meter to the customer's load. It will be understood that the invention described herein may be utilized with revenue meters and other similar types of meters which are not associated with billing. The utility periodically reads the meter in order to bill the customer for the power used. For purposes of this example power supplied to 96 and 98 is described as being from the same power grid (e. g. the same transformer and cable to the house). It will be understood that benefits of the invention may be had with the same or different power sources. One of the service entrance's watthour meter 96 is used for normal billing rates the other having a watthour meter 98 for time of service (TOS) rates. As practiced by some utilities, cheaper TOS rates will apply for usage at off peak hours, for example the middle of the night. It will be understood that the time of service meter 98 may be utilized to facilitate the utility charging rates which are different from, either higher or lower (or in some systems at times the same as), the normal billing rate charged for power provided via the first meter. For example, the utility may charge lower than normal rates for power provided via the TOS meter for off peak usage, higher for peak usage and normal rates at other times. It will be understood that while only two meters are shown, any number of meters (and contactors in 100) may be utilized as will be apparent from the teachings herein. Also, contactors in 100 may be controlled together or separately, or if more than two, in combinations. Particularly, it will be understood that contactors which receive power from the same power source, but delivered via different meters, are preferred (but not required) to be controlled together to provide backup power when that power source fails.

Because the power required for the normal loads may be more or less than that required to power the TOS loads, the two watthour meters 96 and 98 (as well as 96*a* and 98*a* discussed below) do not need to have the same current measuring capability, response time, accuracy and/or precision. One meter may very well be different than the other and accordingly the contactors may be of different size. For example, 96 (and 111) may be rated at 400 amps and 98 (and 112) rated at 200 amps. Such ratings might for example support a normal billing house load with multiple air conditioners, an electric water heater and electric range and only two 100 amp electric vehicle chargers on the TOS output. Because the TOS meter only measures power supplied to two vehicle chargers, the meter may not only have a lower maximum current rating, it may also not need the same quick response time and accuracy as is required for the normal loads which include a variety of devices. As another example, a meter which is used with critical loads such as an aforementioned fire pump may be designed to trade off response time for improved reliability. Alternatively, if the utility permits TOS billing for the multiple air conditioners, water heater, range they may be wired to the TOS circuit thus reversing the 400 amp and 200 amp meter and contactor ratings. It will be recognized that unlike the split service above, only utility approved devices can be wired to the TOS meter circuit.

FIG. 19 includes the backup power source 97 which may also be used to provide power backup power costs less than normal and/or TOS power. The backup power contacts of 111 and 112 are electrically paralleled in 100 with a single set of power terminals fed via 105. The load control processor circuit 99, which may operate in a manner similar to 25*a* and 25*b*, but with added capabilities relating to the multiple power inputs. 99 also may incorporate environmental, user & misc. devices 21, as well as those not shown to provide other capabilities, connections and the like as discussed for 25*a* & 25*b*. It will be understood that the teachings of 25*a*, 25*b* and 99 are given by way of example and various configurations and capabilities may be incorporated into or left out of a particular load control as desired in order to practice the invention to achieve a particular set of features and benefits for a desired degree of cost for a particular application as will be known to the person of ordinary skill from the teachings herein.

The load control processor circuit 99 is preferred to operate to sense the quality of power input in response to the power provided via 96 (and/or 98), to determine the if the quality of the power meets acceptable parameters and if not to control 100 to switch to backup power by control of the contactors 111 and/or 112 when backup power meets acceptable parameters. If neither meets acceptable parameters it is preferred that 111 and 112 be caused to switch to the off position with the load control processor 99 monitoring the grid and backup power. When one or the other power feeds meets acceptable parameters 99 is preferred to cause 111 and 112 to switch to that power source, with grid power taking priority if both are present. As taught above the off position may be utilized to allow another power source to power loads. It is noted that other manners of monitoring, particularly indirect monitoring, starting and connecting may be resorted to. For example, the transfer switch(es) may monitor the grid power, start the backup power source and make the transfer and 99 may then be responsive to this activity. Some backup power sources have built in power grid monitoring and will start themselves whenever needed and may also cause the transfer switch to select the backup. Thus, the load control 99 may simply be responsive to the transfer switch and/or backup power source. This has the disadvantage of 99 not directly sensing that grid power has returned which may result in another short outage when the backup source turns off and the transfer switch is returned to grid power. Nevertheless, the load control is responsive to the absence and return of grid power, just not as efficiently as if it monitors the grid power directly. Other combinations and sequences of operation to detect outages and provide backup power may be resorted to from the teachings herein as will be known to the person of ordinary skill from the teachings herein.

Load control processor 99, may also be responsive to load monitor 23*e* instead of or in addition to the backup power source, in order that 111 and 112 are not switched to the backup power 97 until it is meeting desired voltage and frequency parameters, for example meeting the manufacturer's specifications. Load control processor 99 may then determine when backup power source 97 is ready to provide power. It is preferred that all of the controllable loads are turned off, disabled or otherwise configured to draw little or no power at the time grid power is lost, or at least before the contactors 111 and 112 are switched to receive power from 97. In this manner the instant load which is presented to the backup power source at the switch time will be reduced as compared to not removing the controlled loads, and the load control processor can then operate to turn the controlled loads on one or a few at a time. In this manner the number of connected loads can be maximized in response to the load parameters without overloading the backup 97 as described herein.

The load control processor 99 operates in response to the load monitor(s) to determine the remaining available power which can be produced by 97 without exceeding the manufacturer's maximum output power specification(s). 99 is preferred to respond to one or more of load monitors 23*e-i* which respond to voltage and/or current from 97 to determine one or more timely power output, for example such as amps, active power in watts, apparent power in VA as well as power frequency in Hz 99 may additionally determine amps, watts and/or VA drawn by individual loads when powered by the grid via 96 or 98 and/or by 97. When determining power frequency and in particular for an internal combustion engine powered backup power source, 99 may respond to a single or multiple phases of output power, an engine position sensor such as a crankshaft sensor or camshaft sensor, or to a tachometer instead of or in addition to the above. Responding in this method can be particularly useful in determining the engine speed which for a direct drive alternator is directly related to power frequency.

Because engine tachometers usually provide many pulses per crankshaft revolution, it is possible to sense speed changes in less than one crankshaft rotation, giving a quick indication of an overload. Similarly, using ones of positive and negative zero crossings, peaks as well as phases of output power provides a plurality of events per crankshaft rotation as compared for example to using a single zero crossing. This is useful both to determine when the backup power source is up to speed after starting, but also to determine if its speed drops due to an overload. Load control processor 99 controls various loads in advance of connection to attempt to prevent overloading the backup power source 97, and also operates to disconnect one or more loads if the backup power source becomes overloaded, for example such as by an uncontrolled load turning on or a user adding a load which causes the power frequency to drop. It will be understood that overloads may be caused by uncontrolled loads.

The load control processor circuit 99 may also operate as described above with respect to 47 to disconnect one or more of 96, 97 and 98 e.g. by selecting the center off position of 100. This is useful for example in the selection of entire groups of loads to connect and disconnect and also to allow a smaller grid service to be used, such as in the fire pump example above. The use of center off may be done for various reasons which will be known to the person of ordinary skill from the teachings herein, e.g. protection of the loads such as during lightning storms or other severe weather, removing potential ignition sources during gas leaks, leaving another power source (e.g. solar, wind or battery) to power the loads, in the event of a fault, failure or other significant problem with one or more loads which cannot be otherwise disconnected, serious overload, fault or failure of 97, etc. This switching may help to prevent further problems, for example such as damage to 97 and/or its uncontrolled connected loads.

If use of the center off position is contemplated, it is desired that the power to the load control processor 99 (which is normally provided from the output of the transfer switch) should be provided by a source which contains reserve power (e.g. a battery backup) and will continue to provide power to 99 for the longest expected duration of use of center off. This may be aided by placing the load control processor in a standby or sleep operation which reduces power consumption while still allowing it monitor for the return of grid power. Otherwise the power to the load control 99 could be exhausted and the control's ability to sense the return of power from one or more of the power sources will be impaired. Additionally, or alternatively as desired, power may be taken from the grid or both inputs to the transfer switch with the load control processor 99 being shut down, with attendant loss of function, in a manner that allows it to automatically start up on power return, thus helping to ensure that upon return of its power, the load control processor can power up and resume its control operations. The same protection is desired to be used if the transfer switch is left in the backup power position, particularly if the backup power can fail such as when a generator shuts down because of low fuel. Alternatively, the load control 99 may take power from the transfer switch output and when both grid and backup power fail, sense when its stored power is low and return the contactors to the grid position.

Moving now to the measurement of power supplied by one of the various sources and power consumed by one or more loads, commonly, current is measured via a current transformer through which the current carrying conductor passes but is not in metallic, contact therewith. Voltage and frequency are commonly measured via metallic contact with conductors. It will be understood that while 23e-i are shown in FIG. 19 as having a singular location, the voltage, current and frequency may actually be sensed at different physical locations as convenient. There is no requirement that voltage and current be sensed at the precise location of 23e-i or at the same location. Current may be sensed at one location, for example on an insulated cable via a current transformer and voltage at another, for example at a metal lug, buss bar, contactor, etc. (or fastener thereof) which the cable electrically connects to. Additionally, ones of 23e-i may simply measure current and rely on a known and relatively steady voltage to provide load parameters to 99 e.g. current only, or use that voltage to determine watts or VA. Circuit 99 may use one or more voltage inputs via connections such as 107, 109, 125 and the transfer switch outputs, or use a known relatively steady voltage, along with current from one or more of 23e-i to determine power. 99 may also respond to individual power parameters, e.g. voltage, current and or frequency sensed at different points, and/or provided from the backup power source 97 via 107 in order to determine power output.

Of course, the sources of measurement used to determine power source loading should be a reasonably accurate version of that at the output, or any error is otherwise taken into account. It is possible to measure both voltage and current with or without electrical metal to metal contact. For example, voltage may be sensed and measured via an electrical contact such as used by a traditional voltmeter or with electric field sense technology (without electrical contact). Current may be measured via a shunt (electrical contact) or without electrical contact such as using a current transformer, Rogowski coil, Hall effect device, flux gate or magneto-resistive sensors. It will be realized from the teachings herein that 23e-i may utilize either contact or non contact sensing and measurements for voltage and/or current. In particular, it is envisioned that 23e-i may utilize non-contact measurements at a convenient point, like output(s) of the transfer switch or the attached cables, by incorporating field sense of voltage and inductive sensing of current.

Figure 20:
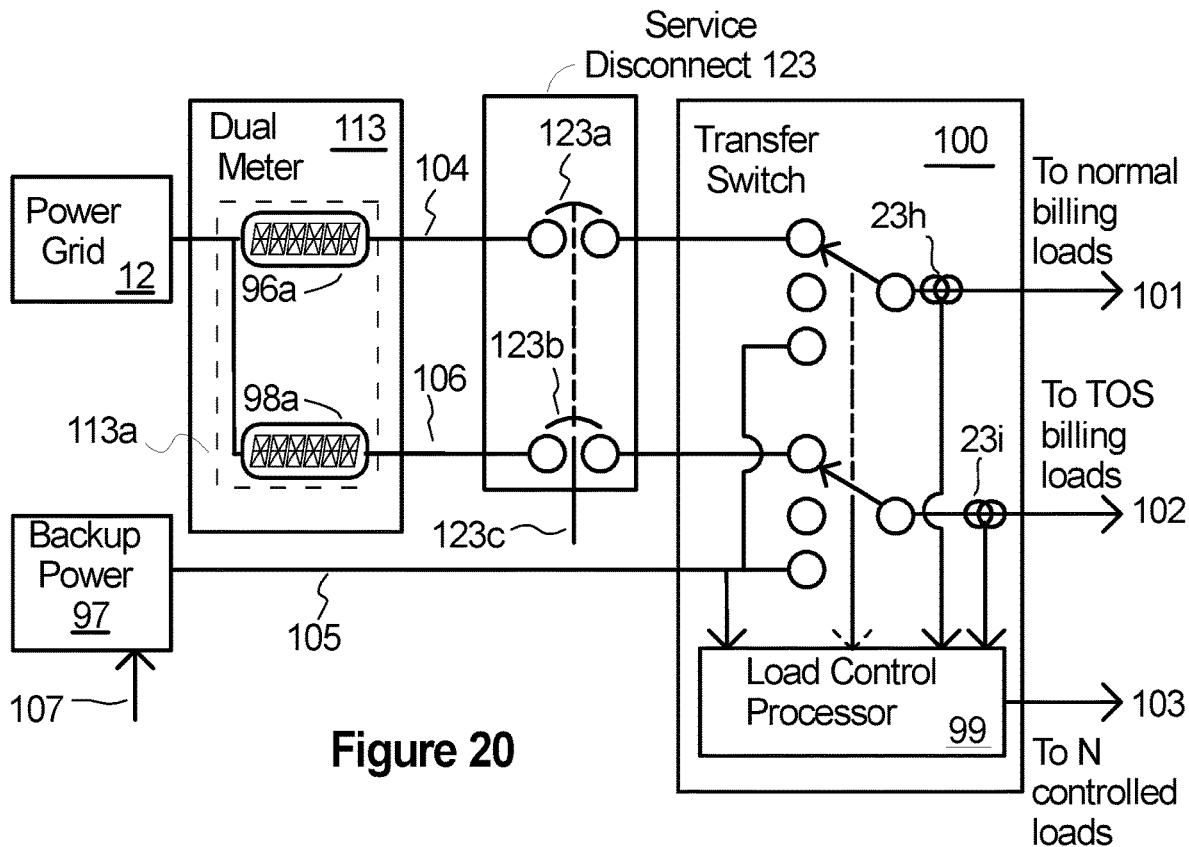
FIG. 20 shows an embodiment of the transfer switch 100 as used with a power grid 12 and including a novel dual meter 113 having a singular meter socket 113*a* the dual meter operating to receive power from the grid via a single input from the meter and provide two outputs 104 and 106 via the meter socket which outputs are metered respectively by watthour meters 96*a* and 98*a*. The two power outputs are coupled via a service disconnect 123 having service disconnect sections 123*a* and 123*b* with a common trip 123*c*, the novel transfer switch 100 having an input for receiving grid power from 104 via 123*a* and input for receiving grid power from 106 via 123*b* the transfer switch 100 having a single input for receiving power via 105 from a backup power source 97, which may be controlled via 107, and outputting power via 101 and 102 which are monitored by 23*h* and 23*i* respectively. The load control processor 99 is responsive to power from 97 via 105 in order to switch the transfer switch contactors as well as well as 23*h* and 23*i* to control controlled loads via 103.

FIG. 20 shows an embodiment of a novel dual meter device operating with a novel dual transfer switch 100 configured for use in a system which includes both normal revenue metering 96a and TOS revenue metering 98a of current provided from the same power grid 12. As with other Figures, details have been omitted from FIGS. 20 (and 21) for clarity, and additional capabilities, features and improvements may be practiced if desired as will be known to the person of ordinary skill from the teachings herein. Dual meter 113 operates to receive power from a power grid 12 and provides two metered outputs 104 and 106 via dual meter socket 113a, that is, a single socket for a dual meter. The novel dual meter socket 113a is part of the dual meter circuit not per se part of the dual meter 113, but rather mates to 113, or, stated another way the dual meter 113 plugs into the socket 113a. The socket is preferred to be physically mounted in an enclosure (not shown) which facilitates use of electrical raceway connections (e.g. conduit) to allow circuit connections between the socket 113a and other devices. The enclosure comprises a cover (and possibly a meter ring) which is used to hold in place, tamper proof and security seal the dual meter once it has been mated with the socket. The power flowing from the grid to each output is metered by a respective one of the watthour meters 96a and 98a. The dual meter socket 113a (sometimes called a meter base and not to be confused with the baseplate) is preferred to be a single socket for the dual meter, to which the power grid is connected via circuit 129 (FIG. 21), with the socket providing two power outputs via 104 and 106, from 96a and 98a respectively.

Power from one or both of the power grid inputs 104 and 106 may be monitored (not shown) by load control processor 99. Two transfer switch outputs 101 and 102 are preferred to be monitored via load monitors 23h and 23i which are physically and electrically configured to sense power flowing from outputs 101 and 102 respectively, the transfer switch further receiving power provided by the backup power source 97 via 105 with 99 operative to enable backup power via 107 and to switch the contactors of the transfer switch to connect the backup power to the outputs as described herein. One of ordinary skill will recognize from the teachings herein that monitoring both the normal and TOS grid inputs 104 and 106 would seem redundant, however some utilities are able to control delivery of power via one or the other or both of 104 and 106 using smart meters, the capabilities of which may be incorporated in 96a and/or 98a. It is envisioned that utilities will have such capability during high load conditions for load shedding. Thus, it is possible to lose power on one feed but not the other as controlled by the utility. In this situation it is desirable to provide backup power for only the lost feed and keep the other connected to the utility. This of course will require separate control of the contactors 111 and 112 via the load control processor circuit 99 (or a plurality of processors).

It is believed that the novel transfer switch, self contained with two power grid inputs provided via respective revenue meters, a single backup power input, two power outputs, one corresponding to each grid input and an internal load controller, with the transfer switch controlling (e.g. via 99) both enabling (e.g. starting) the backup power and switching thereto, as well as controlling external loads in response to one or more load monitors, is an excellent combination of features and capabilities with low cost and ease of installation as is taught herein. Additionally, including a load monitor on each output will provide the capability of characterizing loads connected to either output when powered by either the respective grid input or the backup power source. The inventive device can be used in a small backup power system which has a separate TOS revenue metering for various types of TOS qualified loads such as electric vehicle and/or backup energy storage chargers, as well as normal revenue metering for other loads.

Figure 21:
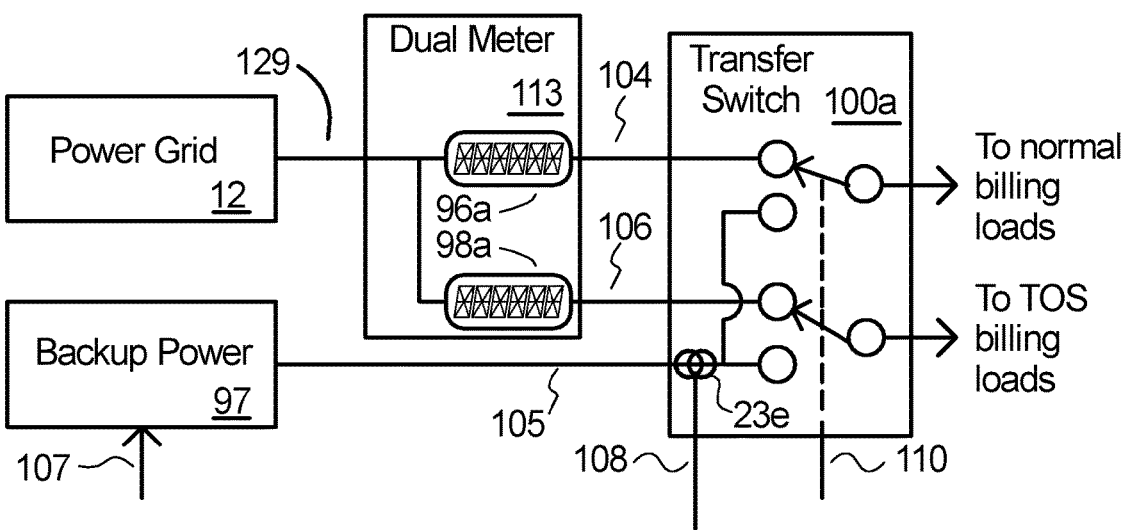
FIG. 21 shows an embodiment of the transfer switch 100*a* similar to 100, but without the center off positions, and including the grid power input circuit to the dual meter 129. As with FIG. 20, power flows from the power grid, through one of the dual meters, through the dual transfer switch 100*a* contacts of the contactors and flows out from the respective normal billing and time of service billing outputs to the normal and time of service loads. When grid power fails the load control processor switches the contactors to enable power to flow from the backup power source 97 through the respective contactors to the loads.

FIGS. 20 and 21, the utility and novelty of the dual meter 113 as well as the novelty of the transfer switches 100 and 100a may be further realized when one understands service circuitry is sealed by the utility and the NEC requires service circuitry to be protected in conduit, metal enclosures and the like, all of which must be watertight if used outdoors. Reducing the number of components is beneficial both to reduce complexity and installation time and to reduce cost, among other benefits. Further novelty may be recognized from the fact that for a multiple unit dwelling such as an apartment building, and in particular those with mechanical meters, an electric utility may wish to remove and replace the meter with a locking cover and thereby disconnect all power supplied to a particular apartment which is vacant or where the electric bill is seriously overdue. That in turn dictates that individual meters have for years been, and currently are, used to supply individual small backup power system customers.

By contrast, with the dual meter the two outputs are envisioned to have great utility serving the same customer and thus there is no need to physically and electrically separate them for purposes of disconnecting power. As used herein and in the claims, the term dual meter is defined as a device comprising a plurality of revenue metering circuits physically contained within a single case, the case comprising a cover and a baseplate and designed to provide electrical service to a single customer of an electric utility via each meter output, the watthour metering circuits being connected to meter blades protruding from the baseplate and disposed to connect with jaws of a single dual meter socket. A dual meter socket may be enclosed in an individual enclosure, or may be incorporated in an enclosure with a service disconnect for example such as 123 and/or a transfer switch 100 or 100a and/or a load center (not shown).

The two power outputs from 113 are coupled to a novel transfer switch 100a which switches both the normal billing feed and the TOS billing feed, thus saving switch enclosure costs and space, as well as installation and wiring costs and time as compared to using two transfer switches. Transfer switch 100a has two sets of contactors, but as compared to two transfer switches of the prior art it is preferred to only have one input for receiving power from backup power source 97, that input having terminals for single phase or multiple phase operation (instead of double that number of terminals for two separate transfer switches). Transfer switch 100a also has an input for receiving normal revenue metered power via 104, an input for receiving TOS revenue metered power via 106. The single input connection for backup power to the two separate transfer switch sections in the single enclosure is preferred to be provided by a buss bar or other low cost connection for each power phase. The contactors of the transfer switch 100a may be implemented with any of the devices described herein as well as others currently known or which may later become known to the person of ordinary skill to be suitable for the novel purposes as will be known to the person of ordinary skill from the teachings herein.

As set out above, a transfer switch 100 or 100a may be combined with ones of a service disconnect e.g. 123 and load centers (not shown) in a single enclosure to provide a device which has two service entrance connections, a single backup power connection, a normal billing power output and load center if desired and a TOS billing power output and load center if desired. It will be further appreciated that the service disconnect 123 may include breaker overload protection instead of or in addition to each disconnect switch 123a and 123b, the breakers also serving as the service disconnect, which is particularly well suited if being substituted and ganged to provide a common trip function. The breaker may be combined with a load center (breaker) panel, with the transfer switch electrically disposed between the output of the service disconnect (breaker or switch) and the load center bussing. A breaker may also be provided in the single enclosure for the backup power input from 105.

By incorporating load control and overload protection which is limited to a known maximum size backup power device, the cost of the transfer switch 100a may be further reduced because the internal bussing, wiring, contacts and the like may be designed to match that known size rather than to match the size of the service entrance. For example, a transfer switch 100 or 100a may be designed to accommodate a 400 amp service entrance but only a 100 amp backup power source knowing that the load connections will be managed so as not to draw more than 100 amps from the backup. Further, the transfer switch 100 or 100a may have different sized normal billing and TOS billing electrical paths, e.g. 400 amps for the normal billing service which may include several high demand loads like electric air conditioners, range and hot water heater. The TOS billing service may be sized for only 200 amps to power two 100 amp electric vehicle chargers and the backup power circuit sized at 100 amps. It should be recognized that these sizes are not required to be in any particular sequence, e.g. any of the power sources may be larger than the other. When the backup power is capable of delivering enough power, and the connected loads are capable of consuming enough power to overload a transfer switch input or output, care must be taken to prevent such overloads. The aforementioned 100 amp backup power connection will provide an efficient and cost effective arrangement. It is believed that the advantages of providing a dual transfer switch with unequal electrical size capabilities has heretofore not been known, appreciated or utilized in prior art transfer switches having a maximum output current design when either input is selected.

This novel configuration is cost effective, easy to install, reliable and smaller for a given amperage as compared to using two separate transfer switches. The benefits also including being able to use a single switching mechanism for the separate transfer sections if desired, as will be seen in respect to FIGS. 23A-E (discussed below), using a single transfer switch controller circuit 99 instead of two (or more), bussing of the backup power from the input to one switch and to the other(s) thus eliminating terminals and wiring for each phase as well as the associated enclosures, conduit, labor, etc. Because the two grid power connections 104 and 106 are on the customer side of the meters, many electrical code jurisdictions will permit the separate sets of cables to be run through a single conduit from 113 to 100a, thus saving installation time and cost.

Regarding the ease of installation, consider how the backup power source 97 would have to be wired to both of the contactors if there were no internal buss between them. Two cable sets (2 cables plus a neutral for single phase and 3 or more cables each for multi phase power) would have to be connected, one to the wiring terminals for each contactor. The other end of those two cable sets then have to be paralleled. They could be paralleled by wiring the cable set from one contactor to the other contactor, but then that contactor's terminals would have to be large enough for the two cables. Alternatively, a junction box and splices or lug strips could be used. All of the cables have to be properly protected, most commonly in conduit. All of this leads to extra cost and time for the installer. Using the internal buss bar greatly simplifies the cost and installation time, not to mention the additional savings of putting the two contactors in the same enclosure, allowing one control circuit and set of actuators to be used for both.

Additionally, when the backup power source outputs much less power than the utility service provides (hence the need to protect against overloads), the portion of the contactor and buss bar used for the backup power can be sized accordingly, thus giving additional savings. If the backup power input to the transfer switches are to be protected by fuses or a breaker (not shown for 100a) this can be easily incorporated in the single enclosure whereas for two separate transfer switches the single backup power breaker complicates installation, requiring an additional enclosure for the breaker or wiring one transfer switch to the load side of the fuses or breaker located in the other transfer switch.

Additionally, like the service entrance connections, the connections from the backup power source 97 usually must be protected by conduit, metal enclosures and the like which makes the single input to 100a with internal buss configuration easier and less expensive to install than having to connect backup power via 105 to two separate transfer switches, each with its own enclosure. The backup power source 97 outputs power via 105 which is coupled to the single backup power input to 100a. Power provided from the backup power source is monitored by 23e which communicates via 108 and the transfer switch 100a is controlled via communications link 110. 23e may thus provide a measure of power (or current) being output by the backup power.

Returning now to FIG. 19, in some systems the rates for electricity provided via both meters may change at different times and one or both of the first and second meters may be utilized to interrupt power to their respective loads, for example as controlled by the electric utility during heavy load conditions. The system of FIG. 19 (or FIG. 20 or 21) will operate to provide either grid power or backup power to the various loads when one or both of the grid power sources fails. While FIG. 19 shows a center off position for the contactors 111 and 112 which disconnect power to all loads such as with a service disconnect and whether or not incorporating all code requirements to be used as a true service disconnect it may be used and operate as described above. For example, in respect to 47 of FIG. 10, the center off position operates in much the same manner as described above and will not be discussed extensively in the example below. If desired the center off position may be eliminated from one or both contactors, as shown in FIG. 21. For purposes of the description of FIGS. 19 and 20 below it will be assumed that both first meter 96 and second meter 98 receive power from the same utility power grid, and the purpose of second meter 98 is to provide TOS metered power to electric vehicle chargers, home battery backups (e.g. FIG. 12) and the like whereby the rate charged by the utility for the supplied power is lower during the night and/or other low demand times.

The embodiment shown in FIG. 19 includes a normal billing power input 104 from first meter 96 and a TOS power input 106 from second meter 98, and a backup power source input 105 from a backup power source 97. Transfer switch 100 has contactor 111 which operates to normally couple power from 104 to 101 thereby providing power to normal billing rate loads. Transfer switch 100 also has contactor 112 which operates to normally couple power from 106 to 102 thereby providing power to TOS billing rate loads, in this example for one or more rapid (>20 A input current) chargers for electric vehicles, a home battery backup such as in FIG. 12 or the like. In this fashion the utility customer can elect to charge such loads at night or other times when the rates are lower.

The charger(s) may operate with a simple 24 hour clock or a more elaborate timer, and/or communications e.g. an internet connection, in order to automatically charge the vehicle(s) during time periods when lower cost power is available. As suggested above, (e.g. FIG. 12, 25b, 69, 70) the load control 25 or load control processor circuit 99 may also provide or assist with this functionality, allowing not only load management to minimize power consumption by devices, including power storage devices, from the grid during times when power costs are high but to provide power to such devices when costs are low. The functionality may also include capability to purchase and store power from the grid in response to internet provided information when it is cheap or generate and store power when fuel is cheap, and use that stored power when grid costs are high.

The load control processor (or chargers) may communicate with the utility or other sources to receive updated or real time rates and other information such as high grid loading and brownout potential and adjust charging in response thereto. With other utility arrangements the automatic charging control may interact via one or more communications links with power brokers who sell power to the customer, which power is then delivered via the local utility's power distribution system to the customer. In this manner the customer may manually or automatically (via internet connected computer) shop for the best power rates and times both from the local utility and from providers outside of the local utility. If the customer needs to have one or more vehicle charged quickly the automatic charging may supersede or be given a higher priority than other power uses. The use of an internet connection to obtain updated power rates vs. time will help to achieve low cost charging.

The transfer switch 100 couples the incoming power to the load control processor circuit 99 via a connection 109. This may be done directly, for example connecting the supplied power on 104 (e.g. 240 volts single phase, 60 Hz) to circuit 99, or by sensing and providing one or more power parameter (e.g. ones of voltage, frequency and within a desired tolerance) of the incoming power to circuit 99. Alternatively, the supplied power on 106 or power parameters may be coupled via 125 to circuit 99 instead of or with those from 104. The load control processor circuit 99 is responsive to the input(s) to determine if the power quality is acceptable and if not, it starts the backup power 97 via communications link 107 similar to 27a and 27c. When backup power source 97 has come up to speed and is providing acceptable backup power as load control processor circuit 99 determines via communications link 107, the transfer switch contactors 111 and 112 are controlled via 110 to switch from utility power to backup power. The control of 111 and 112 may be together or separately as desired and if separately 111 and 112 may be switched at different times. The load control processor circuit 99 may receive and utilize parameters such as those described for 27a, including one or more of peak voltage, RMS voltage, power (voltage or current) frequency, power current and for rotating machinery power sources RPM in order to compute backup power readiness or other backup power related information utilized by the processors 33a&b, 37 or circuit 99 instead of, in addition to or along with information from load monitors and current sense circuits 23a-i. The operation of starting the backup power and switching contactors 111 and 112, along with numerous alternative operations and variations in communications, components, combinations and connections, known to the person of ordinary skill from the descriptions herein.

After the power loss and switching the contactors 111 and 112, the load control processor circuit 99 is preferred to operate to sense one or more known parameter of the output power of the backup power source 97, to control one or more loads N. The N loads may be normal billing loads and/or TOS billing loads, the control processor operating in order to provide efficient operation while prevent overloading the backup power, and/or to remove an overload if one should occur, as described herein. When operating from grid power the load control processor circuit 99 is preferred to prevent overloading of either or both the normal billing supply and the TOS billing supply. When operating from backup power the load control processor circuit 99 is preferred to prevent overloading of either or both the normal billing supply output and the TOS billing supply output of the transfer switch (assuming the backup power has the capability of providing enough power to create such an overload) and to prevent overloading of the backup power source 97. Parameters of the output power include one or more of the instant and average: frequency, peak-peak and RMS current and peak-peak and RMS voltage of power being output by one or more of the hot output connections, hot being the two current outputs of a single phase system or the current phase outputs of a multi phase system. The load control processor may also communicate with environmental, user and miscellaneous devices 21 as described above.

As described herein, one or more instantaneous or non-instantaneous output parameter of the backup power (e.g. voltage, currents, VA, active power, apparent power, power factor or watts) may be compared to the maximum and/or currently available output parameter(s) of the backup power source to determine if a load can be connected without creating an overload. Of course, some backup power source manufacturers do not provide many parameter(s) so that must be taken into account. For some lower cost generators, only a steady state maximum parameter in watts or amps is provided, and then sometimes there is no identification of definition of how or under what conditions it is determined. For example, the manufacturer may just say it is a 5000 watt peak, 3500 watt continuous output. There may be no explanation as to what peak or continuous mean. Thus, at times it is desirable for load control processor 99 to further characterize the backup power source in its actual installed operation by recording instances of overload for known output loads.

The output of the backup power as determined in response to 23e (or ones of 23e-i) may be compared to a manufacturer's specified maximum available output, as derated (if used), for various environmental factors, to determine if the backup power is already overloaded and if so may also determine how much, by a numeric value, over a threshold, over an amount of time or another amount. When rotating machinery type backup power source is used, the frequency of the backup power can be sensed and used to determine overloads and if so, may also determine by one or more of how much by a numeric amount, over a threshold, for an amount of time, or another amount. One or more of these determinations may then be recorded, stored or otherwise taken into account in order more accurately characterize the capabilities, and in particular the maximum output capabilities of the backup power source. An intentional testing routine may also be utilized, either manually initiated by an operator or automatically upon the occurrence of one or more particular event e.g. at the start of a power outage, to perform characterization. The testing routine may intentionally increase loading of the power source to near or over its rated or previously determined maximum capability parameter with that parameter then being updated or more accurately detailed to reflect the backup power source response to the testing, thereby producing one or more improved backup parameter(s). This improved parameter may be utilized to control backup power connected loads.

FIG. 19 also shows alternate and optional additional load monitor locations 23f-i in the transfer switch 100. In particular, 23h and 23i are preferred to be utilized in place of 23e in order that current changes can be measured when powered from the grid or backup power via 101 or 102. When a given load is turned on and off whether powered by the grid or the backup power, that load may be characterized. Additionally, the characterization will be less susceptible to interference from load changes on the other output. That is, when measuring a load connected via 101, loads connected via 102 will not tend to interfere to a significant amount, if at all, with the characterization. Further, as taught above with respect to 23a, 23b and 23d, by having the ability to measure and characterize loads while being powered from grid 96 via 23h and 98 via 23i, the load may be characterized at any time. For example, characterization may be performed one time when powered from the stable power grid (e.g. at installation), or characterized repeatedly during normal use while powered by the grid.

The repeated characterization, as well as use of a testing routine, are particularly useful for loads which change due to environmental factors as described above e.g. an air conditioner may be characterized and recorded, stored or otherwise utilized during a hot summer afternoon and thus if grid power fails the load parameters will be up to date for that particular set of environmental parameters. Alternatively, 23e, 23h and 23i may be located outside of the transfer switch. And as desired to practice the invention in a particular embodiment to achieve a particular set of capabilities the load control processor circuit 99 may receive input from and provide optional output to: Environmental User & Misc. Devices 21 via 28c, Backup Power 97 via 107, load monitor 23e (and/or ones of 23f-i), input 109 from 96 via 104, providing output 110 to the contactors 111 and 112 and voltage and other backup power parameters via 125. In some backup power devices, the output current and/or other load related parameters are available directly to circuit 99 via communications link 107 thus eliminating the need for some of these devices and connections. The load control processor circuit 99 also has N output(s) 103 to N controlled normal and/or TOS loads. While it is preferred that both normal and TOS loads be controlled, the load control processor 99 may control one or the other.

In addition to the advantages above the preferred embodiment of FIG. 19 has novel, and believed commercially valuable features. The use of two mechanically linked electromechanical contactors 111 and 112 controlled by load control processor 99 give the ability to simultaneously switch both the normal and TOS billing loads from their metered power inputs to backup power. This mechanical linking may be provided by utilizing a common linkage or shaft which is actuated by two solenoids, one solenoid for normal operation and the other for backup power operation, will provide a quick and efficient latching operation which eliminates many problems arising by using two separate transfer switches, each with its own controller having operating parameters which must be set by the installer or operator, one or more contactors and associated actuator.

In some systems it will be desirable to switch one of contactors 111 and 112 a delay time after the other or to a different position as the other. This for example will reduce the loading on the power source being switched to, in order to reduce the instant loading thereon. In another example it will keep one switched load on one power source (e.g. such as the generator) while the other is switched to the other power source (e.g. such as the grid). This delay will be particularly useful to reduce the surge loading of the power sources when switching and if one of the loads being currently powered will be impacted by a switching transient, and the switching of the corresponding contactor 111 or 112 may be delayed until a more suitable time. If such delayed operation is desired the common mechanical linkage is preferred to be replaced with separate switching mechanisms, each operated independently of the other by a single, or separate controllers.

The operating parameters in two prior art controllers may interact with each other thereby causing problems. For example, many prior art transfer switch controllers are designed to send a start signal to a backup genset, wait to see if it starts and if it does start and its output within desired parameters the controller switches the contactor. If the genset does not start or provide a proper output it is turned off and the controller waits for a known time, e.g. two minutes, before attempting a restart. If only one of a plurality of prior art controllers is allowed to start and stop the genset, the other may not see power when it thinks it should and flag a failure. If both controllers are allowed to start the genset either controller may flag a failure because the other started or stopped the genset. Load control processor 99 may provide backup power source start and a plurality of independent contactor control capability which overcomes these prior art controller problems if desired.

The FIG. 20 one line drawing of the transfer switch 100 as described in respect to FIG. 19, and further includes a dual watthour meter 113 including watthour meters circuits 96a and 98a the inputs of which are internally bussed in 113 to receive grid power from 12 via a single set of connections (e.g. lugs). Each meter 96a and 98a has an output 104 and 106 respectively to a service connect device 123 having individual disconnects 123a and 123b. In this manner both service entrances from their respective meters may be simultaneously disconnected and reconnected via control 123c. If desired, individual disconnects may be utilized. This will be particularly useful if one or more critical load is fed by one of the services entrances, for example a fire pump wherein the disconnect should be locked (e.g. via a padlock) in the connected condition.

Figure 22:
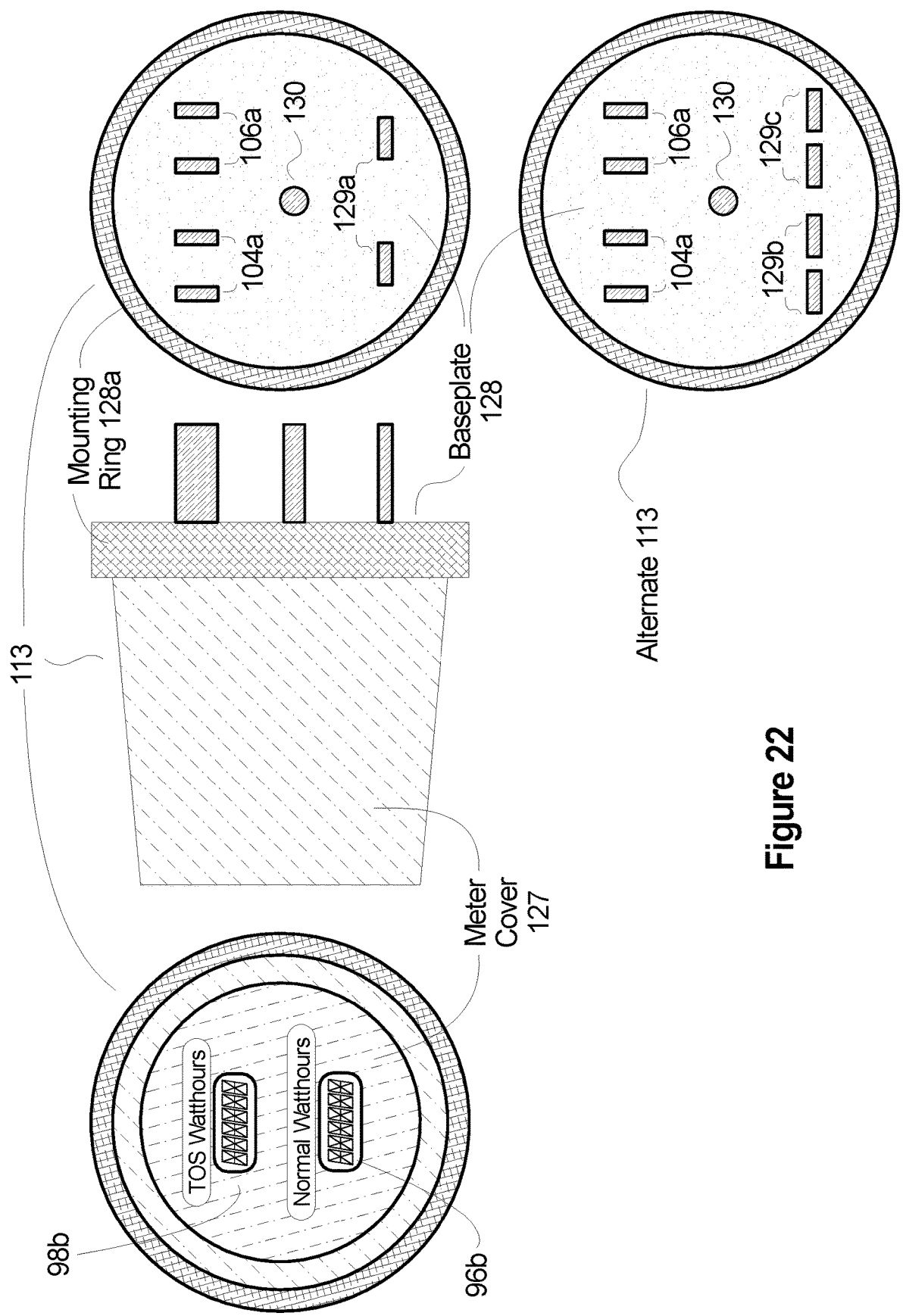
FIG. 22 shows front (or face), right side and back side (or base) views of the dual meter 113 including TOS and normal wattmeter readouts 96*b* and 98*b*, meter cover 127, baseplate 128, mounting ring 128*a*, input blades 129*a*, normal output blades 104*a*, TOS output blades 106*a* and common blade 130.

FIG. 22 shows an example embodiment of the dual watthour meter 113 including the front or face (left), right side (middle) and back side or base (right) views, including its case, as configured for use with single phase 240 volt power. Other voltages and/or power phases may be accommodated as desired. The meter consists of a case comprising a meter cover 127 and baseplate 128 as well as a mounting ring 128a from which conducting (e.g. metal) blades 104a, 106a and 129a extend. Rather than adopting a currently standardized meter blade pattern for a single circuit revenue meter, the blades are preferred to be arranged in novel patterns, for example as shown in FIG. 22, which patterns are believed to be unique as compared to standard revenue patterns, thus preventing a single circuit meter and the instant dual meter from being interchanged in each other's sockets and thereby creating a potentially hazardous situation. The baseplate is preferred to be of insulating material e.g. a plastic such as Bakelite. FIG. 22 includes the base view (right) of 113 showing baseplate 128 and mounting ring 128a with blade arrangement 129a via which power is input to both meters 96a and 98a, as well as Alternate 113 with blade arrangement 129b and 129c for power inputs to Normal meter 96a and TOS meter 98a respectively. The normal output blades 104a and TOS output blades 106a are also shown, as well as the common blade 130.

The meter sockets for 113 and for Alternate 113 are not shown but will have an arrangement of conducting meter jaws, which the blades of 113 plug into, which arrangement resembles the mirror image of the arrangement of blades of 113 (or Alternate 113 if used) as will be known in the art from the teachings herein. It is preferred that the overall size, dimensions and construction of 113 are similar to single smart revenue meters which are commonly finding use in U.S. electric utility systems, but with the novel inclusion of a plurality of revenue meters as will be known to the person of ordinary skill from the teachings herein. It will be understood that the particular details of dimensions, construction and design may be resorted to for use by a particular power utility as desired without departing from the inventive concepts herein.

The dual meter 113 has readouts 96b and 98b corresponding to and displaying measurements made by the two watthour meters 96a and 98a respectively. The readouts may be of mechanical types, for example such as analog vertical (like a Hobbs meter) or round dials or various digital types, but are preferred to be LED or backlit LCD digital (including color and/or graphic) types. The watthour meter readouts are preferred to be configured and labeled to facilitate reading by utility employees, for example by physical appearance e.g. arrangement, surrounding color and color display. If desired, the displays 96b and 98b may be combined into one display device showing a plurality of sets of numbers, or may utilize a single display which is cycled to display the readings of the plurality of watthour meters one or a few at a time. The dual meter 113 may share with, include, perform, control and display other functions as desired, and in particular smart meter capabilities as will be known to one of ordinary skill from the teachings herein. User interface controls may be achieved with devices included in 113 e.g. such as touch pads, switches, shaft encoders and the like or wirelessly. For example, wireless communications enabling meter reading and operating with various internal meter functions, e.g. load shedding, may be incorporated.

The middle view of FIG. 22 shows the dual meter case including a meter cover 127 which is preferred to comprise a transparent and weather proof material e.g. glass, polycarbonate plastic or the like for at least a portion of the face to facilitate viewing the readouts 96*b* and 98*b* with the entirety of the case being weatherproof. The middle view also shows a meter baseplate 128 (not to be confused with a meter base or socket) to which the meter cover is affixed and from which the meter blades protrude in order to facilitate mating with the jaws of the meter socket (113*a* of FIG. 20) as meter and socket mating is known in the art. The mounting ring 128*a* may be a part of the baseplate 128, or part of the meter cover 127 or a separate component as desired. The (upper) right view shows the meter blades 129*a* for receiving input power, and providing normal billing output via blades 104*a*, TOS billing output via blades 106*a* and common connection 130, e.g. the neutral in a 240 volt system. The meter enclosure (not to be confused with the meter case) is not shown but is preferred to be of metal construction meeting one of the various NEMA standards (e.g. 3R indoor & outdoor use) with the meter socket being suitably affixed in a position allowing the meter to be plugged into the jaws of the meter socket, the resulting position of the meter facilitating reading by the customer or utility.

The novelty and advantages of the dual meter 113 is further understood by comparison to physically and electrically separate revenue meters as commonly used in stacks and rows for apartment buildings, one for each customer. In 113 the separate metering capability is preferred to be combined into one physical device containing 96*a* & *b* and 98*a* & *b* which device mates with a single dual meter socket 113*a*, preferred to have a single grid input. The inputs of meters 96*a* and 98*a* are connected to meter blades 129*a* in the meter base and/or cover. The meter 113 is preferred to have two or more separately metered output blade sets, such as 104*a* and 106*a*, that is, it is preferred to have one set for each meter. This novel configuration is cost effective in that the internal buss or other connection (inside the meter case and/or baseplate) from the single grid input via 129*a* to the inputs of the meters (e.g. 96*a* and 96*b*) eliminates need for one or more a separate junction boxes to make connections from the grid service to the inputs of separately cased, socketed and enclosed meters, all of which are to be enclosed and wired according to code plus the attendant installation costs, as well as requiring sealing by the utility.

Alternatively, the dual meter may be one physical device having a single case including a cover and a baseplate with the baseplate and meter socket having an individual grid input and a corresponding output for each meter. This is shown in Alternate 113 where there are two inputs via blades 129*b* for normal meter 96 and 129*c* for TOS meter 98. It will be useful to buss or otherwise connect the plurality of grid inputs in the corresponding meter socket thus simplifying installation and reducing costs. For example, a single high current (e.g. 520 A continuous 600 A intermittent) grid feed can connect to high current lugs on the meter socket which busses that feed to a 320/400 A meter input and a 200 A meter input, with each meter having a corresponding output. The 320/400 A output may for example be connected to one or more vehicle chargers and the 200 A output connected to the normal loads. The load control processor 99 will control the loading to ensure that neither meter rating is exceeded and also that the total service rating (520 A continuous 600 A intermittent) is not exceeded. While these numbers may seem excessive for a home, it is envisioned that as battery charging capability for electric vehicles improve over the next several years, it will not be unusual to see the need for 240 volt single phase 320/400 A service for a plurality of, or even single vehicle, charging stations. While higher voltage three phase would be a much preferable service connection, three phase is not common for residential neighborhoods and switching entire neighborhoods, or even one house in a neighborhood, to three phase is very expensive. Nevertheless, it will be understood that the instant invention may be utilized with multi-phase power if available.

It will be understood that when currents reach continuous 400 amps and above, it is difficult to construct a reasonable size set of blades and jaws to handle that amount of current. Along with the large size, the necessary clamping pressure on the blades required to be provided by the jaws becomes difficult to deal with in terms of inserting and removing the meter. Larger blades, jaws and meter sizes as well as complex mechanical designs to deal with the pressures could be resorted to, however it will be understood that a more reasonable approach in terms of cost and efficiency is to use current sensing devices (e.g. current transformers) and voltage contacts in the meter socket for high current conductors with one set of input blades connecting only to the current sensing devices and voltage contacts for each high current circuit will be particularly useful. In this manner the high current conductors may simply pass through the meter enclosure without having to be routed through the meter itself. The corresponding watthour meter may then determine the power used in response to the current sensing devices and voltage contacts. High current Is defined in this respect as systems rated at continuous 400 amps and above for at least one meter. Another alternative consists of a set of input blades for each high current (≥400 A continuous) meter (responding to the current and voltage contacts for that circuit) and another set of blades for one or more lower current (<400 A continuous total) meters. Of course, If desired current sensing devices and voltage contacts may be located in the meter enclosure for all of the separately metered power feeds.

FIGS. 23A-E show an exemplary power switching device may be desirable to be utilized to practice various embodiments of the invention to achieve a particular set of functionality and cost. While various forms of power switching will be known to the person of ordinary skill from the teachings herein which may be utilized e.g. with the transfer switches 15, 47, 100 and 100*a*, to practice the invention with a desired degree of performance, reliability and cost, the power switching embodiments described herein with respect to FIGS. 23A-E will be desirable to be utilized to practice various embodiments of the invention, and in particular those utilizing a center off capability. FIGS. 23A-D show a simplified side view mechanical drawing demonstrating three states of a double throw with center off contactor 114 which along with FIG. 21E will aid in the understanding of novel features of the transfer switch 100. In FIG. 21A, the swinger portion of the contactor is shown in the center off position (stationary contacts A and B are not shown).

The contactor 114 includes a swinger 115 which pivots up and down about an insulated pivot point. The swinger serves as and has affixed to the right end the C contacts and is electrically conductive with a flexible cable attachment from below the pivot point to terminal C (not shown in 23A). As used herein in respect to transfer switch power circuits, contacts are the mechanical or solid state parts of the contactor which electrically switched to open and close high current power circuits. Power terminals are utilized for connecting a set of power carrying wires (or cables) and include screws, bolts or other fastening devices to allow an installer to make the wire connections. This is as compared to a manufactured connection such as a buss bar which is intended already be connected by the manufacturer before installation in the field. The conductivity thus extends from the terminal C via the flexible cable and continuing through and on to the right to the two C contacts at the right end of 115. As seen in FIG. 23B for the center off position the C contacts are mechanically positioned between the upper A1 contact and the lower B1 contact. These contacts are preferred to be made of silver layered on or plated on brass or other highly conductive metal construction which is resistant to pitting, corrosion and arcing as is well known in the art. In the particular embodiment shown, the swinger includes upper and lower arms between the pivot point and the contact, the arms passing respectively above and below an insulated cam 116 which is affixed to a shaft 117. The arms are preferred to be springy and somewhat flexible in order that when the cam holds the swinger contact against the A or B contact, the spring tension holds the contacts firmly together. The shaft rotates a short distance clockwise or counter clockwise to cause the small end of the cam to rotate upward and downward and thereby push against the upper or lower arm thus moving the swinger up or down as shown in FIGS. 21C and D respectively. Other arrangements of insulated and conductive portions and number of contacts of the swinger and contact(s) C may be resorted to as desired to achieve particular levels of performance, reliability and cost.

The swinger 115 further includes a telescoping, spring loaded or magnetically biased shaft 118 on the left end, the end of the shaft pressing against an insulated detent plate 119 to maintain the position of the swinger once it has been moved into position by the cam 116. While a spring is shown inside the telescoping shaft, it may be external to the shaft or replaced by opposing internal or external strong (e.g. Neodymium) magnets disposed at or near both ends of the telescoping shaft. The detent plate has three detents corresponding to the three ON-OFF-ON switch positions. If desired, the center off detent of 119 may be eliminated. Shaft 118 is preferred to cause swinger 115 remain in the current position without cam pressure until it is caused to change to another position. Alternatively, 118 may be spring or magnetically biased to return to the desired one of the three positions in the absence of being forced by the cam to a particular position by changing the design of the detent plate 119 such that without cam pressure the telescoping shaft 118 will force the swinger to the desired position. That change may require continuous cam pressure to hold the swinger in the other positions. If continuous cam pressure is undesirable, then one or more electromagnets may be disposed behind (on the left side of) the detent plate 119 to hold the swinger in position by attracting the magnet located at or near the left end of shaft 118. When power fails the electromagnet will no longer hold the swinger in that position and the telescoping shaft will return it to the desired (e.g. center off or grid) position.

It is preferred that the spring or magnetic force as well as the shape of the detent cooperate in order to flex the swinger's springy arms in order to hold the contacts firmly together with pressure when in the A and B contact positions, even if the power is removed from the solenoid accordingly conserving power and allowing it to return to an unpowered position. Other manners of holding pressure on the contacts when in the A and B contact positions may be utilized as desired to achieve a particular level of performance at a particular cost. The swinger, being electrically connected to a common contact C via a flexible cable, thus enables contactor 114 to connect terminal C to either the contact A or the contact B or neither depending on the position of the cam 116. FIG. 23C shows the contactor 114 swinger locked in the A contact position and 23D shows contactor 114 swinger locked in the B contact position.

FIG. 23E shows a simplified mechanical drawing of a view of the contactors and busses represented in the schematic diagram of the transfer switch 100a (which does not show a center off position), as viewed from the contact side. The individual single pole contactor 114 of 23A-D is similar to each contactor set (1-4) of 21E. That is, 23E shows two double pole, double throw contactors suitable for use with a single phase 240 volt transfer switch. The first two pole contactor comprises terminals A1, A2, B1, B2, C1 and C2 and the second comprises terminals B3, B4, C3 and C4. FIG. 21E buss bars 124 and 126 eliminate the second contactor need for terminals (A3 and A4) with a manufactured connection to the A contacts to reduce cost and installation time as discussed above. Alternatively busses 124 and 126 may be replaced with cables or other connections which are affixed in a low cost manner e.g. soldering, brazing or welding. Solenoids A 120 and B 121 are connected via one or more lever to the shaft 117 in order to rotate it to the A and B contact positions respectively. Although the contactors of transfer switch 100a are shown without a center off position, the contactor of FIG. 23E can be converted to include a center off position by using a plate 119 (not shown in 23E) with three detents and a center off solenoid 122, also connected to shaft 117 by a lever. Solenoids 120-122 may be replaced by a stepper motor if desired however it should be kept in mind that opening and closing contacts should be performed quickly and forcefully in order to minimize arcing.

Returning to the above teachings to convey the power source's timely power output from the power source to one or more load management devices. The use of power frequency to convey this and other power source information is taught above e.g. with respect to FIG. 18. Some of those teachings will be repeated or summarized below for convenience. Simply thought of, the AC output power frequency is controlled to have a predetermined frequency which corresponds to the power source loading. As a simple example a first frequency (e.g. 60 Hz) for no overload and a second frequency (e.g. 59 Hz) for an overload condition. Of course, the AC power frequency is carried throughout the distribution system. Even in systems utilizing extension cords, the timely power output is available everywhere the power goes.

It will be understood from the instant teachings that the speed and accuracy of control of output power parameters, e.g. frequency and voltage, utilizing an inverter or other electronic circuit, can be utilized to good benefit in communicating the loading (the timely power output) of the power source throughout the power distribution network and to the various loads. Similar communications between power source and loads are attempted in the prior art, e.g. by power line communication devices such as radio frequency, carrier current and wired wireless transmitters which add carriers to the power lines. These prior art approaches suffer from attenuation and even total loss of the communications with interference and as the AC power is transformed to different voltages, switched on and off and just run via various devices and routes from power source to load. When the power frequency carries the information, particularly in discrete frequency steps, that information is contained as a parameter of the power, and not something else (like a carrier) added to the power. The information is not lost unless the power is lost. The better signal to noise ratio of the power frequency as compared to power line communications carriers, as well as the more accurate and stable control of the frequency, allows easier and better measurement at the load control location.

It is noted that as used herein and, in the claims, the term AC power frequency and similar terms are used in the same manner as in the power generating and distribution industries as the frequency of the AC power sinusoid itself. It does not mean the frequency of any added carrier or other information riding on the AC power. Control, setting, adjusting and the like of the AC frequency means that the frequency is intentionally and actively controlled, and not by design of desired single frequency operation or the result of poor frequency control such as frequency variation with load as is a common problem with engine alternator types of power sources. It is also noted that the term power frequency and the like inherently refer to an AC power signal unless specifically known to be otherwise from the context of use.

Many power source and distribution systems such as those used in conjunction with a portable, temporarily connected or permanently installed power sources can benefit from this embodiment of the invention. These systems will typically include two circuits. First is the generating circuitry utilized to generate the AC power supplied by the power source. The frequency of that AC power is controlled in response to the timely power output of the power source. Second is the load management circuit which is responsive to the frequency of the power from the power source. The frequency is used as a communication of the load characteristics or data, for this example such as the timely power output expressed as a percentage of maximum power the power source can provide. The load management circuit can then accurately control the amount of power supplied to one or more loads to facilitate preventing overloads of the power source, or in the case where an overload has already occurred to reduce power consumption to alleviate that overload. As taught in respect to FIG. 18 above, a novel feature of load control circuit 25c is that it may be utilized both to control one or more parameter, such as frequency, of the power output from the genset in order to convey the timely power source output power to controllable loads and load controls. It can also be utilized as a load control, responding to the power frequency and controlling one or more loads to facilitate preventing or alleviating overloads. The load control 25c of FIG. 18, when used as a frequency control circuit for the power source, is described further below with respect to 25e.

This use of AC power output frequency is particularly useful with inverter generators. In inverter generators, there is an inverter circuit which inherently provides the output power with an accurate frequency that matches the standard frequency to be used by the loads, e.g. 60 Hz or 50 Hz depending on the country, 400 Hz for aircraft, etc. In these devices the object of using an inverter is to allow the internal combustion engine which converts fuel to electricity to operate at variable speeds which separates the generation of output AC power from engine RPM. This allows the engine to operate at a speed which is most efficient to match the load. The output AC power is generated by an electronic circuit, commonly referred to as an inverter, although it may not be a true inverter in the technical definition. The frequency of the power is inherently set by the electronic inverter circuit and tightly held to the standard frequency.

Inverter generators have many advantages as compared to traditional internal combustion engine with alternator power sources. Because of the absence of the heavy alternator spun by the engine at constant 1800 or 3600 RPM. While many still utilize an engine, they can operate at variable speeds with a small, lightweight poly phase alternator. This allows them to be lighter, quieter, more fuel efficient, require less cooling and be much easier to start. This makes them particularly suited for portable use. Because the output AC current is electronically generated and controlled by a processor, the voltage and frequency control of the output AC is much better than that of a rotating machinery device having similar maximum power capability. As will be recognized from the teachings herein below the inverter generator output AC generating circuitry can be modified to allow the output AC power frequency to be controlled by a frequency control signal which in turn is responsive to the amount of load thus providing the timely power output signal via the AC power frequency. It will be recognized from these teachings that other frequency control circuits may be utilized along with or instead of the invertor circuit which is being used and described below.

Figure 24:
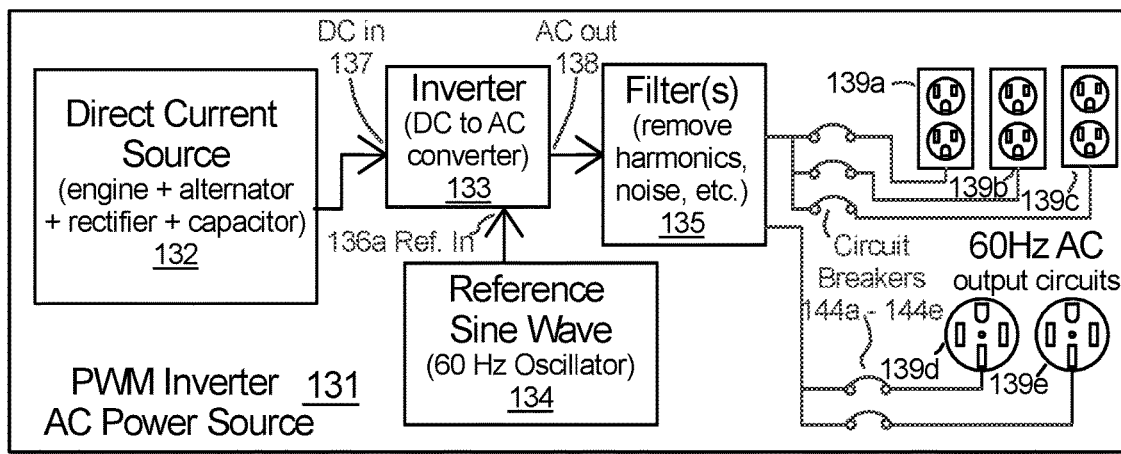
FIG. 24 shows a simplified block diagram of a prior art AC Power Source which utilizes a PWM (pulse width modulation) inverter, including a direct current source 132 providing DC via DC input 137 to a DC to AC inverter 133 having an AC power output circuit 138 which may comprise a filter 135 to filter the output AC power from 133, a reference sine wave circuit 134 which provides a reference sine wave to inverter 133 via reference input 136*a* in order to facilitate production of sine wave output power coupled to power connectors 139*a*-139*e* via circuit breakers 144*a*-144*e* respectively. It is noted that the reference sine wave is held at a steady frequency to match the output AC power frequency to the standard power frequency of the intended loads.
Figure 25:
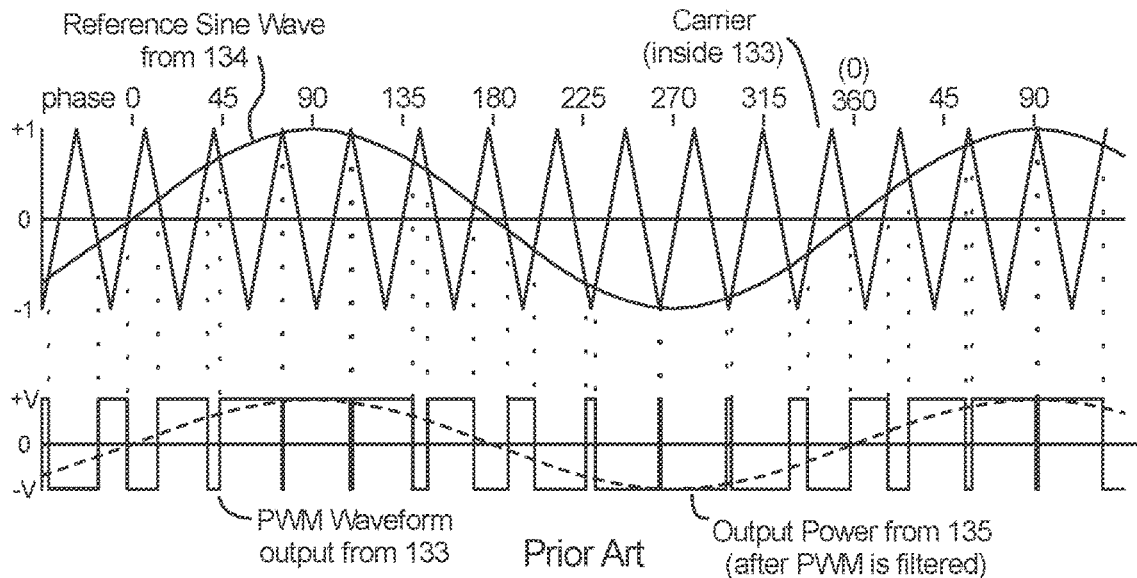
FIG. 25 shows prior art signal waveforms, the top being the reference sine wave provided by 134, superimposed over a carrier signal which is provided within 133 and on the bottom shows the resulting PWM waveform created within and output from 133, and superimposed thereon the resulting in an accurate output power sine waveform provided via filter 135.

FIGS. 24-25 show a simplified block diagram and associated signal waveforms of a prior art pulse width modulation (PWM) inverter based AC power source. Briefly, in FIG. 24, DC power from 132 is supplied to inverter 133 which electronically converts the DC power to AC power. The AC power is then "cleaned" by filtering in 135 and output to the loads via outlets 139a-e. The frequency of the AC power output is inherently set by the design of inverter 133 at the desired standard frequency. The AC output power frequency is unrelated to any rotating machinery. This is a significant difference between inverter generators and rotating machinery generators, particularly in small inverter generator sizes under 55 kW.

Accordingly, Applicant uses the term inverter generator in the specification and claims in the commonly used meaning in the art of small backup power generation equipment. That is, an AC power source wherein the generation of the output AC power, and in particular its frequency, is done by an electronic circuit having an electric power input (AC or DC). This is as compared to a rotating electricity generating machine powered by a mechanical force such as that provided by a motor, engine or turbine. Similarly, Applicant, as his own lexicographer, uses the term non-rotating in relation to power sources in this specification and in the claims, to exclude power sources where the AC output power frequency is dependent on the speed of rotation of some machine, e.g. an alternator. These definitions are not meant to exclude inverter generators and the like which incorporate a rotating machine to generate power, (e.g. DC power from 132), which is provided to the circuit which in turn electrically generates the output AC power. Applicant defines a small as used with inverter and rotating machinery power sources and the like as one having a maximum continuous power output of 55 kW or smaller (or if rated only in kVA 55 kVA or smaller). Small power source may be portable, non-portable and be part of a small backup power system as defined above.

Hashimoto et al. Patent Application Publication 2010/0019507, ('507) incorporated herein by reference for its prior art teachings, discloses a FIG. 24 type device. Instant FIG. 24 is a simplified diagram generally showing an inverter type of power generator (power source) devices, including that of Hashimoto et al. That FIG. 24 is very simplified for purposes of explanation, can be easily seen by comparing it to the '507 FIG. 1. FIG. 24 shows a direct current power source 132 which provides the underlying power, in this example DC power, provided to the inverter circuit 133 and utilized therein to create AC power which is filtered and output from 131. This DC power may be provided in any manner suitable for providing power to the inverter 133, which is known to the person of ordinary skill. In Hashimoto et al. the DC power is provided by a three phase alternator (shown in part by 14 of '507 FIG. 1) which would be part of 132, the three phase output being rectified and filtered ('507 element 20 and FIG. 1, element 24) to provide the DC power. This DC power is provided to the input 137 of inverter circuit 133 ('507 element 26) which performs DC to AC (in this example PWM AC power) conversion and outputs the AC power at 138. The AC power signal is then filtered by 135 ('507 elements 30, 32) to remove harmonics, noise, etc. and provide a clean sine wave power output which is coupled to and standard outlets 139a-139e via circuit breakers 144a-144e and then on to loads plugged into the outlets. It will be understood that such an inverter may be utilized for 67 of FIG. 12. It will also be understood that 132 engine and alternator may comprise a battery and/or supercap (also known as a supercapacitor or ultracapacitor) instead of or in addition to the engine, alternator, etc.

FIG. 25 shows how inverter 133 converts DC power from 132 to AC power by use of the inverter circuit. In this example a reference sine wave signal is provided by 134 and input to 133 via reference input 136a. For purposes of the explanation the reference sine wave will be described as a 60 Hz sinusoidal signal thus matching the standard power frequency and waveform. The reference sine wave is primarily used to create an accurate sinusoidal AC output. Inverter 133 utilizes the reference sine wave labeled in the upper half of FIG. 25 and a carrier (the labeled triangular waveform) and compares the two. The inverter creates a pulse width modulated signal (labeled PWM in the lower half of FIG. 25) having transitions between +V and −V at every point where the carrier crosses the reference sine wave. Stated another way, the PWM signal is created by switching from one voltage (+V) to another (−V) as the carrier crosses the reference sine wave.

The crossings are shown in FIG. 25 by the vertical dotted lines. Following the carrier from left to right (the time axis) it can be seen that as the carrier passes above the sine wave the PWM signal switches to a low voltage −V and when the carrier crosses below the sine wave the PWM signal switches to a high voltage. Thus, the PWM signal is low corresponding to the entire time each of the triangular carrier cycles is above the reference sine wave and it is high corresponding to the entire time each of the triangular carrier cycles is below the reference sine wave. Generally, the high and low voltages can be any two values but for purposes of the present explanation they can be assumed to be some positive voltage (+V) and an equal and opposite negative voltage (−V).

For ease of understanding, +V can be thought of as corresponding to the high voltage of the 240 volt output power and −V corresponds to the low voltage. Again, for ease of understanding, the PWM power waveform output from 133 can be thought of as having a very strong 60 Hz energy component and it is that energy which will become the AC output power. That is, much of the PWM energy is contained in the 60 Hz fundamental, plus some harmonics, noise, switching spikes and other extraneous energy. Thus, the PWM output from 138 is shown as an AC signal in the lower half of FIG. 25 and while not a true sinusoid waveform does have appropriate energy of two polarities and could be considered to be one type of modified sine wave. It could be coupled directly to some loads which are primarily responsive to the current. It is preferred however to have an AC output signal which is, or is very close to, a true sinusoid. Accordingly, the PWM signal output from 138 is coupled to the filter 135 to filter extraneous high frequency energy leaving the fundamental 60 Hz energy which is output from the filter. It will be understood that these descriptions are oversimplifications and are for purposes of understanding the instant invention. They are not rigorously accurate or detailed. The design and operation of direct current sources, inverter circuits and filters are complex, but certainly well within the capability of the person of ordinary skill, and numerous details of design and construction may be resorted to while adhering to the inventive concepts as claimed.

Figure 26:
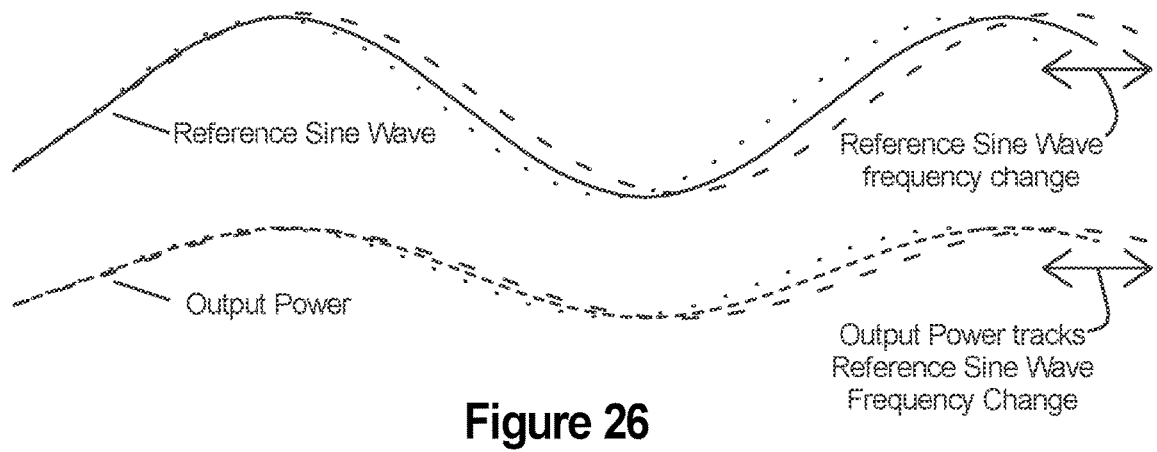
FIG. 26 shows waveforms corresponding to FIGS. 25 and 24 including on the top three superimposed waveforms showing the inventive use of creating three different frequencies of the reference sine wave from a modified version of 134 and on the bottom three corresponding superimposed waveforms of three different frequencies of the output power provided via 135.

FIG. 26 shows sine waves of different frequencies in order to further explain the inventive modification and use of the inverter circuit 138 as part of the instant embodiment of the invention. It will be recognized from the teachings herein that if the frequency of the reference sine wave is changed, the points where the carrier crosses the sine wave will correspondingly change, which in turn causes the PWM waveform to change. This changes the energy content in a manner which causes the output power from the filter to change as well. It is seen in FIG. 26 that as the reference sine wave changes frequency, shown by a solid line for 60 Hz, long dash line for lower than 60 Hz and dotted line for higher than 60 Hz, the resulting output power tracks the frequency. The output power short dash corresponding to 60 Hz, long dash corresponding to lower than 60 Hz and dotted for higher than 60 Hz. It will be understood that because the frequency is controlled electronically, these frequency changes may be made in steps, that is jumping from 60 Hz to a lower frequency. As his own lexicographer, applicant defines jumping as going directly from one frequency to the other without sweeping through any or all of the frequencies in between. By contrast, making that frequency change in an engine alternator power source requires that the rotating components be slowed down, thus inherently sweeping through the entire range of frequencies. Thus, frequency jumps are not possible. Make frequency jumps is a useful feature of the instant invention as will be described below.

Importantly, by varying the frequency of the reference sine wave the output power frequency is varied. It will be further recognized from these teachings that, unlike the prior art which strives to hold a constant 60 Hz frequency, the modification and control to intentionally achieve different, non-standard output power frequencies is a very useful embodiment of the instant invention. Further, this inventive control of output power frequency is all electronic and thus very quick and accurate, can be stable both short term and long term and facilitates use of the invention. That speed and accuracy is particularly apparent when compared to the frequency of AC power produced by an internal combustion engine driving an alternator, which have difficulty holding steady frequency, particularly in the short term as loading changes. Clearly utilizing electronic control of frequency facilitates quicker and more accurate operation of the instant invention, particularly when it comes to quickly and accurately detecting those frequencies. It will be known herein and in the claims, when referring to the frequency of AC power output from an inverter generator, the terms controlled frequency, frequency control, frequency responsive to a frequency control signal and the like, do not apply to or include unintentional or uncontrolled frequency and changes thereto arising from changing rotating machine RPM, e.g. slowing of an engine driven alternator, with load changes.

While the Hashimoto et al. device, and other prior art inverter generators, are designed to output power at only a standard frequency utilized by the loads they are intended to power, it will be recognized and understood from the present teachings that the instant invention utilizing different frequencies may be practiced by modifying the device described in '507 (e.g. modifying the reference sine wave circuit) and modifying other prior art power generation devices as will be known from the teachings herein. While the particular signal shown being output from the DC to AC inverter circuit 133 is a PWM signal created by switching devices, for example the SCR/DI Bridge 20 of '507, and then filtered, the AC signal may be of any type which is or can be further modified to produce a power sine wave, or an approximation thereto commonly known as a modified sine wave. The signal can be created by numerous types of electronic circuitry and devices including multipliers, amplifiers, digital circuits and even software circuits, without departing from the teachings of the inventive concepts herein as well as the appended claims. In particular the circuitry utilized for driving electric motors to achieve soft start, motor speed and other electric motor control, circuitry utilized in the photovoltaic (PV) systems and circuitry utilized in types of inverter generators other than that shown in FIG. 24 may be utilized.

Figure 27:
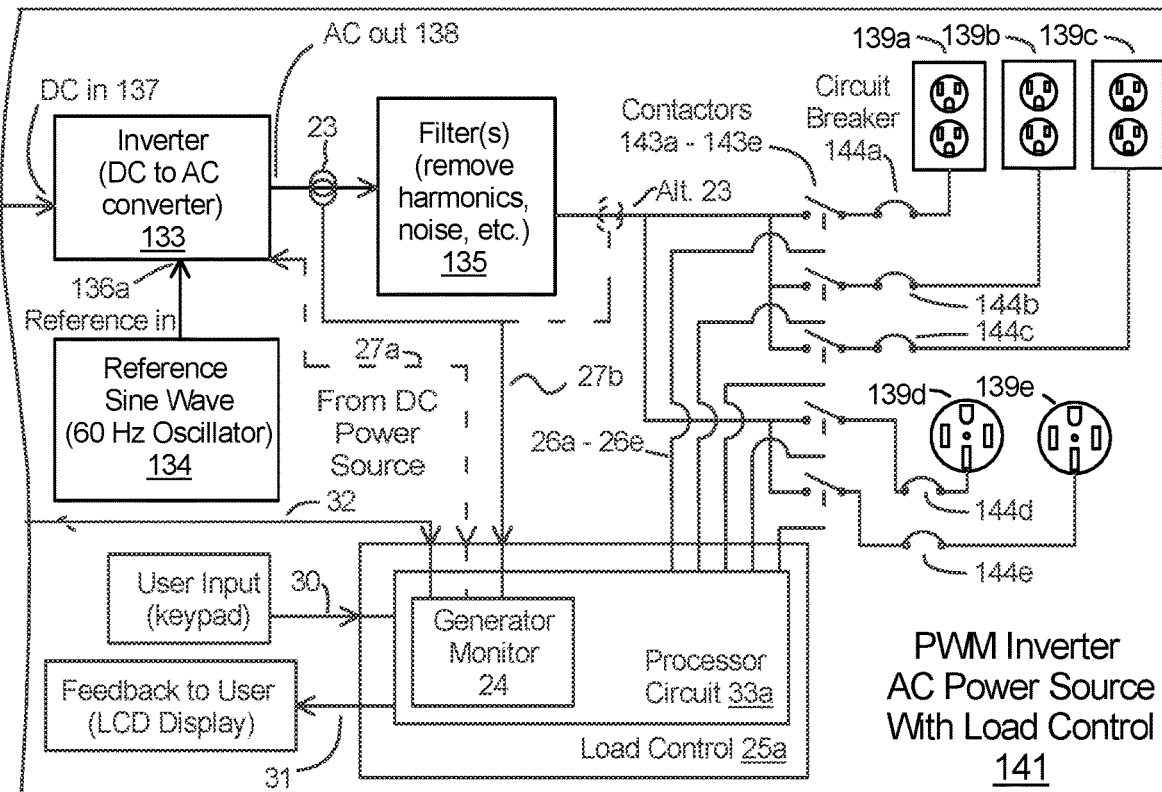
FIG. 27 shows a block diagram of a PWM inverter AC power source with load control embodiment 141 of the instant invention having a DC power input 137 to inverter 133 which converts the DC power to PWM AC which is then output from output circuit 138 which may include filter 135 which reduces harmonics, noise etc., the output AC being provided via load monitor 23 (or alt. 23) to outlets 139*a*-139*e* via load modules 143*a*-143*e* e.g. contactors, and circuit breakers 144*a* and 144*e* respectively. Inverter 133 also has a reference input 136a which receives a reference sine wave from 134.

FIG. 27 shows a novel power source embodiment which can be utilized with the present invention and in particular shows how an inverter generator power source can be utilized with the inventive load control. Many inverter devices like the Hashimoto et al. device, deal with overloads by temporarily shutting off all output current (see '507 FIG. 1, 40, 40h and par. 35). The instant invention can automatically prevent connecting a load which would cause an overload. Further, it can operate quickly enough to sense an overload and disconnect one or more loads before the inverter device shuts off the entire output (in the order of a few seconds after the start of the overload for many inverter devices). It will be understood that while the embodiment shown in FIG. 27 uses an inverter power source with output current shutoff, the teachings are applicable to other power sources, including rotating machinery devices, which do not have overload current shutoff, temporary or otherwise (except for circuit breakers). Applicant's invention can be incorporated into an inverter's processor, added with a separate circuit, or in other configurations, and operate to limit particular ones of the attached loads, rather than shutting down power to all loads as is done in the prior art devices. Reference sine wave circuit 134 is not shown In FIG. 27 to be modified to change output power frequency, however that change may be included as desired according to the teachings herein, particularly to accommodate the use of remotely located load management as discussed below.

FIG. 27 is an AC power source 141 having circuits 133-135 described above. Load control 25a, processor circuit 33a, generator monitor 24, user input, feedback to user, load modules 143a-e (e.g. contactors or other devices as taught herein) which are controlled by the load control circuit 25a are shown in 141, all as taught above. As described above, 25a is preferred to operate with power source information such as maximum output power and instant output, as well as load information such as maximum load current and load priority, to facilitate prevention of overloads and facilitate mitigation of overloads. Generator monitor 24 may be responsive to: DC power source 32, inverter 133, filter 135, load monitors 23, alt 23, or combinations thereof, in order to provide information of timely power output data and information responsive to the amount of AC output power being supplied to the loads. While it is preferred that 23 is responsive to desired parameters including the full amount of power being provided at its circuit location, that is not an absolute requirement and 23 may for example measure only a portion of that power, for example only that portion utilized by one or more controlled loads. It is however desired with respect to current overloads that the load monitor be responsive to the lowest current capability in the system. For example, if the DC input supply to input 137 is limited to providing 20 A, the inverter 133 is limited to converting 22A and the filter 135 limited to filtering 25A, the load monitor is preferred to respond to DC input at 137. The processor circuit 25a modules 143a-e via communications links 26a-e, which in this example are shown as wired circuits connecting 25a to the contactor control inputs, to manage loads as described herein, including by user entry of, and/or measuring, the current a load draws and storing that information to be utilized in determining if the load will cause an overload when comes on or is turned on.

In keeping with the desire for a portable power source to have standard outlets, standard 120 volt outlets 139a-139c and standard 240 outlets 139d & 139e, along with individual circuit breakers 144a-144e, are shown. These outlets and associated protection and load modules may be modified or replaced as desired to couple the output power to loads in a particular system or at a particular desired cost and level of performance as will be known to the person of ordinary skill. It is noted in passing that in keeping with good electrical design, not to mention most electrical codes, the circuit breakers 144a-e are intended to protect the wiring and loads, not to mention the people using them, which are connected to the outlets 139a-e. Protection of the various components of the power source is done by use of internal fuses, circuit breakers, shut down circuitry and the like. Accordingly, combination ground fault and arc fault type breakers are preferred. This is particularly true for any power source which is or may become grounded or wet.

Figure 28:
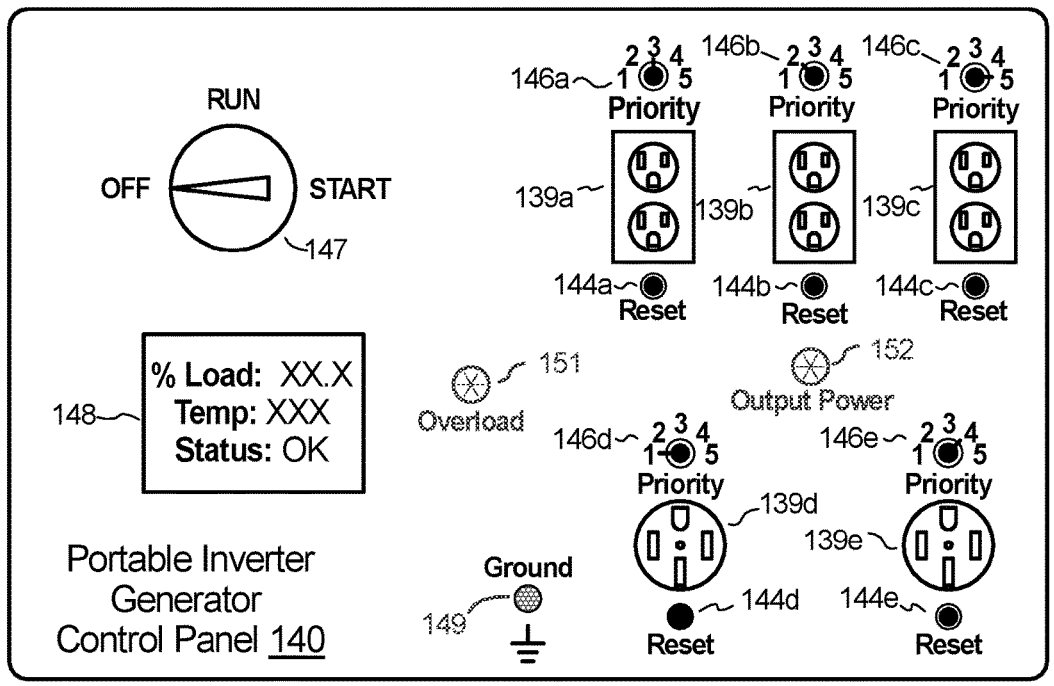
FIG. 28 shows a diagram of a novel inverter generator control panel 140 which may be utilized with 141 or 142a, comprising AC power outlies 139a-139e, one or more of which have a corresponding user priority selector 146a-146e and corresponding circuit breaker reset 144a-144e. The control panel 149 also includes an off, run, start switch 147, user feedback display 148, ground terminal 149, overload indicator 151 and output power available indicator 152.
Figure 29:
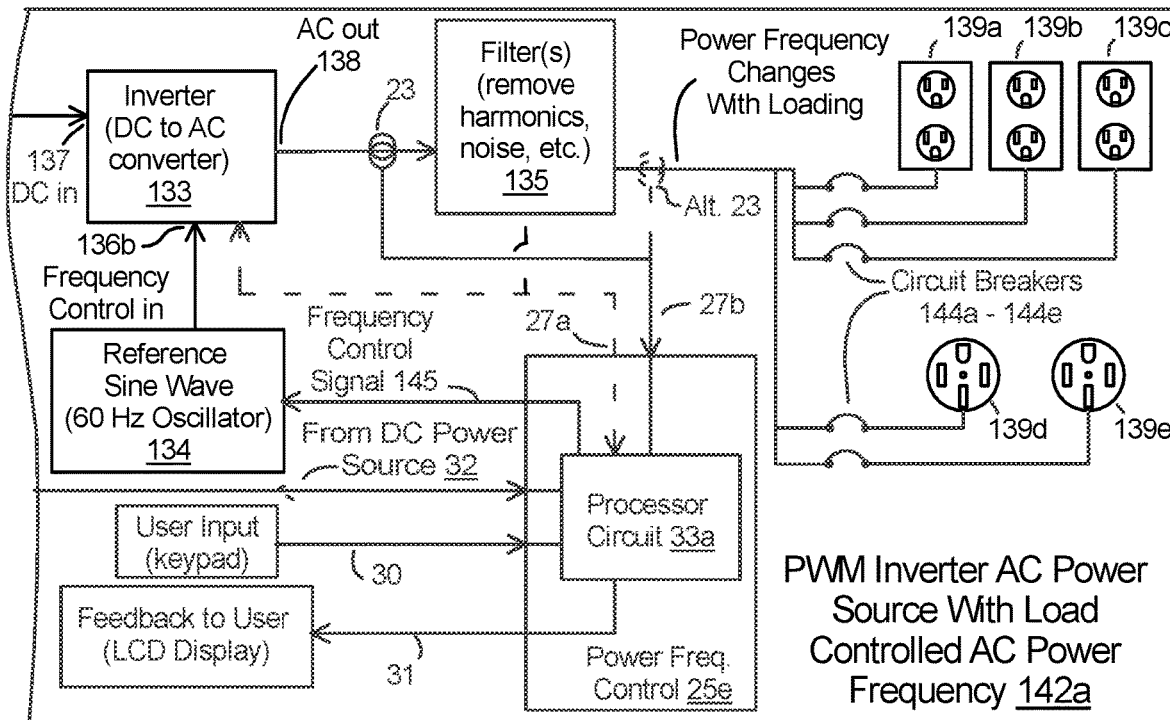
FIG. 29 shows a block diagram of a PWM inverter AC power source with load controlled AC power frequency embodiment 142a of the instant invention having 23, alt. 23, 133, 135, 136b, 137, 139a-e and 144a-e, as described in respect to FIG. 27. In that the FIG. 29 embodiment may utilize remote load modules 143a-e, these are not shown in the wiring to the outlets. Frequency control input 136b in this example receives a reference sine wave from 134, the frequency of which is controlled by frequency control signal 145 which thereby also controls and change the AC output frequency at 138.

FIG. 28 shows a control panel drawing 140 for a portable inverter generator, e.g. 141 of FIGS. 27 and 142a of FIG. 29. In addition to standard outlets 139a-139e, and resets for the circuit breakers 144a-144e, FIG. 28 includes priority switches 146a-e, e.g. rotary switches, part of user input circuitry 30, for setting user determined priorities for the loads connected to the standard outlets. Or the outlet current rating (e.g. 15A) may be used for the max load current. If desired, similar user load current switches (not shown) may be utilized whereby the user inputs the load's maximum current draw. The switch may be a two level switch, e.g. where the user pushes the switch in to set the current and pulls the switch out to set load max current. Further, one of the priority switch or load current positions, for example position 5 in the priority switch, may be used to indicate that a remotely located load controller(s) (e.g. at the end of an extension cord) with switches and load management device (s) are being used on that circuit. Thus, the control of the corresponding load module 143a-e may be altered to slow down and/or increase overload tolerance in favor of the remote load control. A display 148, which may be a touch screen display, is included for displaying information to the operator as described herein. If a touch screen is utilized it may replace or supplement one or more of the priority switches 146 and/or load current switches as desired. A ground terminal 149 is also included for safety. Additionally, the panel 149 includes an off, run, start switch 147 for starting and stopping the internal combustion engine, or other power source which creates or stores and provides power to the inverter. For devices which start automatically this may simply be an off/on switch. Output power indicator 152 will be enabled when output power is being supplied by 133 for use by the loads.

The overload indicator 151 will indicate whenever an overload is sensed, commonly via a load monitor 23 indicating excessive current at one of the circuits 133-135. Rotating machinery devices typically utilize a thermal-magnetic circuit breaker for overload protection. The amount of time it takes for the breaker to trip depends on the amount of overload, but typically takes 10's of seconds for overloads less than 150%. This time delay provides a good capability for starting large loads such as motors. This also allows for prior art devices discussed above time to sense a substantial frequency drop caused by the slowing of an overloaded rotating machinery device, and disconnect all of the loads before the breaker trips. Power semiconductors overheat much faster than a rotating electrical steel and copper wire alternator. Inverter generators do not have a frequency drop with overload so those prior art devices that sense overload frequency drops won't work with them. Inverter generators are also much more susceptible to damage from overloads, thus the length of time an overload can be tolerated, and hence the inverter generator delay between sensing an overload and shutting off power, is necessarily much shorter than that of a rotating machinery device. Inverter generators must operate to keep their power semiconductors from overheating which will destroy them. Some prior art inverter generators use delays in the range of 3 to 7 seconds from the initial detection of overload to shutting off output power. Then the user must turn off the generator, remove the load(s) causing the overload (or otherwise cure the problem) and restart the generator.

If desired the instant invention can operate to prevent such overloads in the first place. If an overload does occur, the instant invention can be configured to detect and disable or otherwise restrict the low priority device(s) to remove the overload within three seconds, thereby preventing the turn off of output power and subsequent required shutdown and restart. If desired, it will be known to the person of ordinary skill from the teachings herein to configure the instant invention to interact with the inverter generator overload circuitry to reset the overload power shutdown in the event it should happen. These features are very useful, particularly for roofing, construction and other workers using a inverter generator to power an air compressor which powers their tools. In one instance a worker has to climb down from the work site and walk a good distance back to the generator to restart it. In the other instance the air compressor is top priority and the load control prevents and/or takes care of overloads.

The embodiment of FIGS. 27 and 28 the internal overload controller which otherwise would simply shut down all of the loads when an overload is sensed, is modified to incorporate a load control circuit 25a, or a separate load control circuit 25a. As taught herein the load control circuit is preferred to perform various load control functions which are desired to achieve a particular level of protection for the power source at a particular desired cost. It is preferred that this control take place according to the following example. In the event the load control circuit 25a determines to disconnect a load, it is desired that it start with the lowest priority load (as selected by the operator using 146a-e) and continue disconnecting loads in increasing levels of priority until a until 25a had determined that a desired level of safe operation has been achieved. When it is determined that unused power capability is available from the power source, 25a will cause loads to be connected according to priority. Without enough available power to connect the next highest priority load, then 25a determines if the next lower priority load can be connected and so on until all possible loads that can be safely powered are connected. Of course, these operations may be modified in respect to the teachings herein as will be known to one of ordinary skill to achieve a desired level of performance.

FIGS. 29-33 demonstrate novel ways in which accurate control and use of AC power frequency can convey loading information (responsive to the timely AC output power being supplied to the loads) for an inverter AC power source to load controls in order to control the amount of power consumed by one or more loads to thereby facilitate preventing (or eliminating if necessary) overloads. The components in FIGS. 29 and 30 include ones of those in FIG. 27, the primary difference being that the power frequency control 25e controls the AC power frequency by providing a frequency control signal 145 to the reference sine wave circuit. In some embodiments of the invention the reference sine wave circuit 134 may be included in the inverter 133. Other types of inverter frequency control circuitry may also be utilized in or with 133 and controlled directly by application of the frequency control signal 145 to frequency control input 136b. The inverter frequency control circuitry of FIGS. 29-33 may likewise be utilized with the respective inverter connected sources and control circuitry of the previously disclosed systems of FIGS. 4-21.

Figure 30:
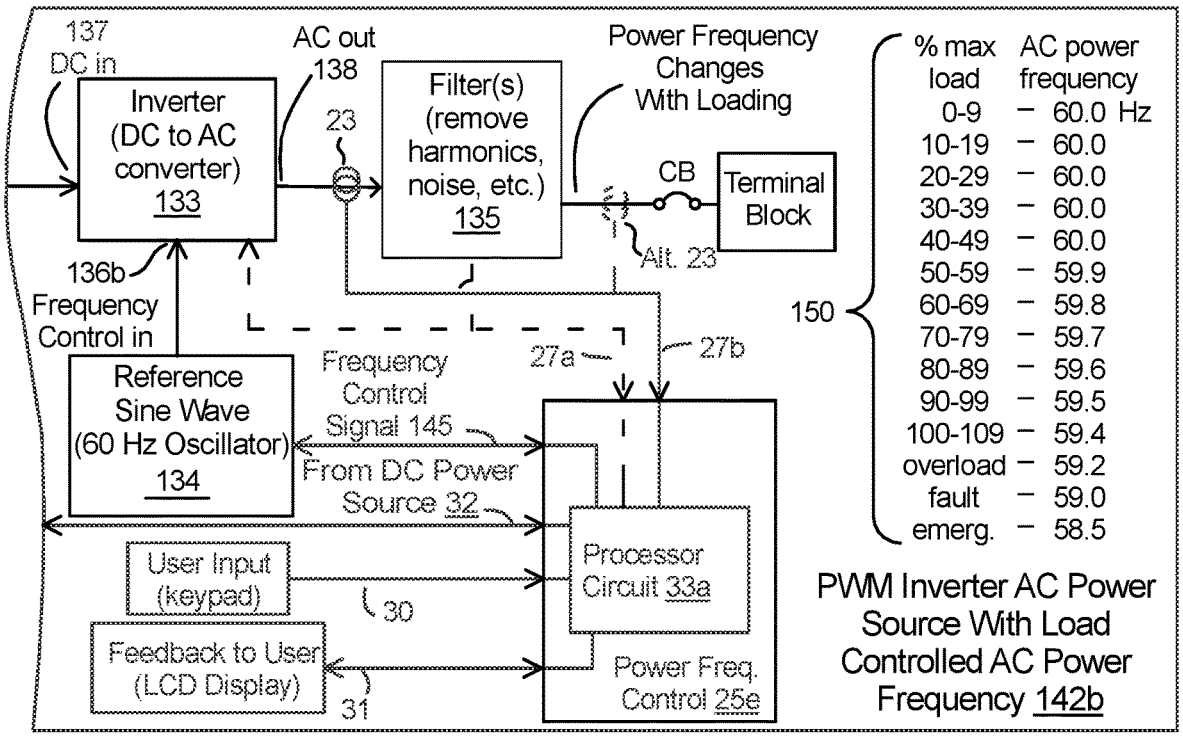
FIG. 30 shows a block diagram of a stationary PWM inverter AC power source with load controlled AC power frequency embodiment 142b of the instant invention. Because of the intended stationary use, e.g. as a backup power source, the individual outlets 139a-e and their corresponding circuit breakers 144a-e are replaced with a single circuit breaker CB and terminal block for hard wiring into an electrical system such as a home or small business.

The control of, and resulting AC output power frequency is preferred to be timely responsive to the frequency control signal in order to facilitate speed of load control operations. Given low AC power frequencies, it is possible to utilize a digital sine wave generation circuit where an immediate jump of clock frequency can provide an instant jump of generated AC power frequency. While the jump can be made at any time, it is preferred to do so at a zero crossing or peak of the sine wave to keep high frequency transients in the output power to a minimum. Similarly, a load control can count cycles of a known frequency clock between AC power zero crossings to quickly obtain a measure of frequency. Of course, there will be some noise, +/−one clock and other errors, but this can be dealt with in known ways, for example by filtering out high frequency noise and averaging several counts. The accuracy of sine wave generation will facilitate quick and accurate frequency measurement, particularly due to the ability to keep harmonics, jitter and phase noise low as compared to rotating machinery power sources. FIGS. 29 and 30 show inverter power sources 142a and 142b similar to 27, but configured to quickly and accurately change the output power frequency in response a frequency control signal input at 136b which in turn is responsive to the power source load.

It is noted that 25e, being used with an inverter as shown in FIGS. 29 and 30, does not include the frequency measurement 90 which would be preferred to be utilized with control of the frequency of a rotating power source. This absence is because the inverter frequency control does not utilize rotation machinery and accordingly does not suffer from the rotating machinery errors as taught for example with respect to FIG. 18. The inverter output AC power frequency can be accurately achieved without having to monitor the output frequency to ensure that the desired frequency is being output. The frequency control may also be accomplished by any of those circuits known in the art for controlling the frequency of a signal, or generating a reference signal at a desired frequency, such circuits including variable frequency oscillators (VFO), numerically controlled oscillators (NCO), variable modulus counters (MOD), phase locked loops (PLL) and various software implemented and software controlled generators to name just a few. Nevertheless, frequency measurement 90 may be utilized with any of the electronic embodiments if desired, to check and verify that the frequency of the output power and thus verify proper operation and/or improve accuracy. Corrections may then be made if errors should be encountered.

Further, the inverter 133 and the PWM filter 135 may be replaced with a DC or AC powered circuit which creates the output power signal at a known frequency, rather than inverting the DC via PWM waveforms and filters and the like. A circuit such as described in U.S. Pat. No. 4,816,830 can be modified to produce AC power by simply replacing resistors 2*a* with positive and negative current sources, shifting a one clock pulse through the register and taking the sine wave power from the alternate output. Ferrite chokes may be utilized to remove unwanted high frequency energy such as the clock frequency energy as taught therein. A different clock frequency and more register outputs will be desirable.

As taught herein, the power frequency control 25*e* receives timely power output information. Power frequency control 25*e* then utilizes that information to determine timely power output, in this example as a percentage of the maximum power rating(s). The reference sine wave circuit is then provided with a frequency control signal 145 to causes the AC power output frequency to correspond to the predetermined known value corresponding to that percentage. The frequency may vary linearly in response to the timely load, or in steps as discussed by example with respect to FIG. 30. For a simple system the frequency may be caused to take on only a small number of discrete known values. For example, different frequencies may be set which represent that the power source is below overload (60.0 Hz), near overload (59.9 Hz), slightly overloaded (59.8 Hz), significantly overloaded (59.5 Hz) or highly overloaded (59.0 Hz). Or, just two frequencies may be used, 60.0 Hz for normal, below overload, operation and 59.0 Hz for overload conditions. It is preferred however that frequencies be utilized to indicate amounts of loading less than overload to facilitate determining if there is enough available power capacity to connect one or more loads and thereby facilitate prevention of overloads. In general, the more frequencies that are used, the more loads will be able to be connected without an overload since the margin of error is reduced. For example, using just two frequencies, not overloaded and overloaded, the margin of error is 100%, that is if there is no overload it can't be known if connecting a load, no matter how small, will cause an overload.

FIG. 29 shows an embodiment of an inverter power source 142*a* which has standard outlets by which one or more loads utilizing the power may incorporate or otherwise be controlled by a load control to facilitate preventing or curing overloads. This configuration is well suited for portable or non-permanent. Just by plugging in the load using a common extension cord, the power and timely power output frequency information, is conducted to the load. Unlike the systems discussed above, which utilize a drop in power frequency due caused by an overload to detect that overload, but only after it happens, the instant invention may be utilized with accurate power frequency which allows each load to have timely power output information which is utilized to greatly reduce load management problems such as preventing overloads as well as preventing false triggering and slow triggering of overloads. The embodiment shown in 142*a* is suitable for use with both portable and stationary applications. In portable locations extension cords and the like can be plugged into outlets 139 to provide power as needed. In a stationary application a cable with connector which is plugged into 139*d* or 139*e* is utilized to couple power via a transfer switch or other type of isolation from utility power into a home, small business or other relatively fixed wiring system.

FIG. 30 shows an inverter power source 142*b* similar to and having the same elements as 142*a* except that the outlets 139 and corresponding circuit breakers 144 are removed. 142*b* is more useful with stationary (relative to the loads it powers) installations as compared to a portable power source which may be hauled to different locations such as job sites and configured differently, for example by use of extension cords with the power source 142*a* of FIG. 29. With 142*b* of FIG. 30, power is coupled via the terminal block into a permanently wired system, e.g. a residence, small business, motorhome, boat, aircraft or other vehicle. The coupling from the power source to the permanently wired system can be made via a transfer switch or other type of isolation from the main (utility) power if the power source is to be utilized as a backup power system.

FIG. 30 also shows 150, an example of a chart of frequency parameters, e.g. the relation between the frequency and its meaning. In this example the frequency corresponding to blocks of percentage of maximum output power which this power source is capable of handling and extra messages. For example, up to a 49% level of output power the frequency is kept at 60.0 Hz. Starting at 50% the frequency drops 0.1 Hz for every 10% increase in timely power output, up to 99% with a corresponding frequency of 59.9 Hz. This is a normal operation range where the power source is operating entirely within its specifications. The chart also shows an operating block from 100 to 109%, discussed below. Following 109% an absolute overload, signaled with a frequency jump to 59.2 Hz, is defined herein as one which needs immediate mitigation by removal of one or more loads, as well as not connecting any new loads during the overload. This action is intended to bring the output power back under a known amount, for example its maximum output capability, to return to normal operation. When the output power has returned to normal operation for a desired amount of time, the output frequency is changed from the overload setting to the corresponding normal operation frequency. This action will for example help to prevent a thermal overload.

The reason for including an output block for 100-109% with a corresponding frequency of 59.4 Hz is, as discussed above, that many generators can sustain overloads for short periods of time. These overloads do not require an immediate action as it is expected that the overload will go away within a few seconds. If, however the output remains in the 100-109% range for too long, or starts to, or rises above this range, then the power frequency control 25*e* can very quickly jump from 59.4 to overload 59.2. Overloads which are signaled by 59.2 Hz are not singularly related to output power but rather allows for signaling an overload for a desired variety of environmental and other operating conditions like overheating, as discussed in more detail elsewhere herein.

A fault is signaled with a frequency jump to 59.0 Hz and Fault frequencies are defined herein as an undesired or abnormal condition, e.g. a direct current source 132 temperature trend upward toward overheating, low oil, low fuel and other condition which will require an upcoming reduction of available power or possible shutdown. Fault frequencies may be utilized for example to allow critical equipment such as computers to gracefully shut down, or prevent loads like cooking appliances and elevators, which once started should not be stopped, from being connected as long as the fault is active.

An emergency shutdown command is shown as having a corresponding frequency of 58.5 Hz. As with overloads, emergency shutdowns are not singularly related to output power but rather allows for signaling for a desired variety of operating conditions such as direct current source 132 out of fuel or oil, component failures and the like. An emergency shutdown is defined here as one where it is necessary to immediately disconnect all controlled loads. This action is desirable with inverter generators which require a quick removal of load to immediately stop the temperature rise of overheating electronic circuitry. This must be done before the generator's internal control shuts down the supply of output power as described above. By immediately disconnecting all controlled loads before the generator progresses to its own shutoff, the generator can cool, facilitated by cooling air from the direct current source 132. After cooling, determined by a time period or internal temperature measurements of generator circuitry, normal operation of the power source can return. The power frequency control 25e can change the output power frequency to a setting to allow the load controls to be automatically bring loads back on line in an orderly fashion, preferred to include connecting loads in order of priority.

If desired for power sources which have even higher overload tolerance, or particular needs related to operating characteristics or timely power output, additional or expanded frequency blocks may be utilized. The load control response to one or more of each frequency may be arranged in order to provide particular amounts of protection and the like. For example, at 59.2 Hz begins the sequence of disconnecting loads in reverse order of priority (lowest priority connected load is first) but if maintained after the first load is dropped also signals quicker speed. Or it may signal simultaneously dropping of all loads.

As will be known to the person of ordinary skill, other numbers of frequencies, range(s) thereof, mapping of frequencies to timely power output and other data as well as particular responses to one or more of the individual frequencies may be resorted to as well, as desired. If desired the AC output frequencies may correspond to output power or remaining available power and power in amps or watts. The frequencies may be monotonically or even linearly related to the desired measure of loading, for example 60.0 Hz at no load, continuously decreasing to 59.0 Hz at 100% load and continuing beyond if desired. There is, no requirement to start at 60.0 Hz, to decrease frequency with increasing loads. Other mapping may be used to as desired.

Figure 31:
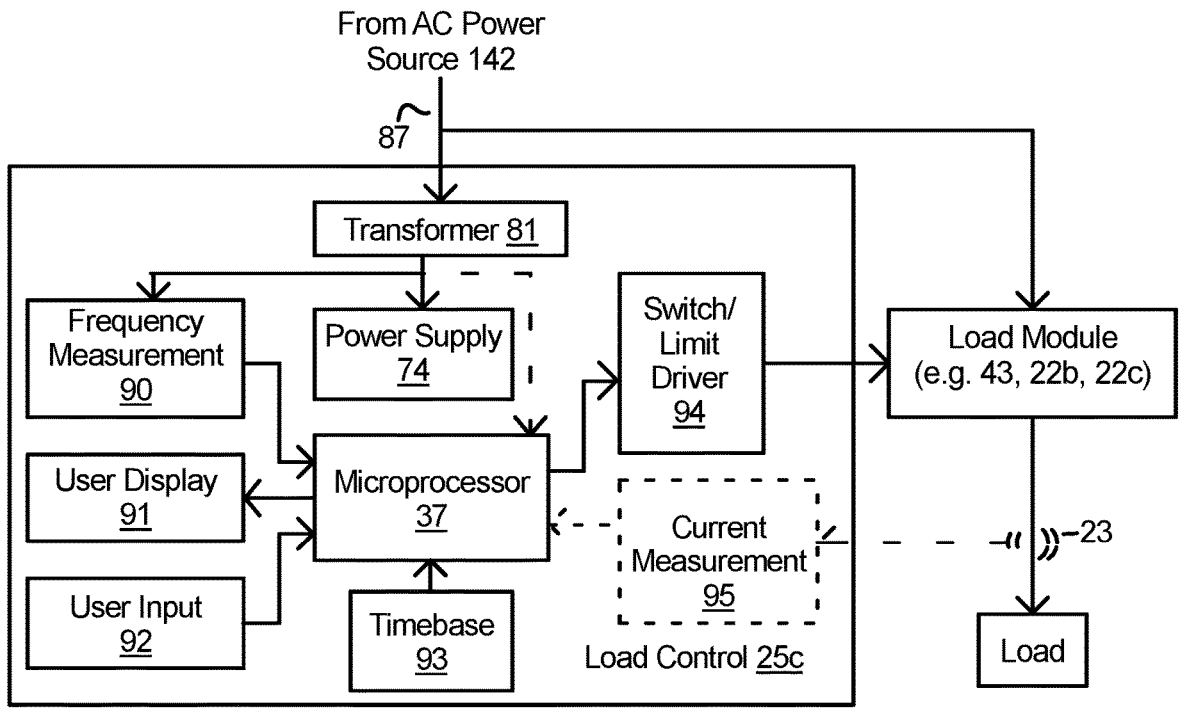
FIG. 31 shows a load control 25c similar to that of FIG. 18, receiving AC Power from 142, which is coupled via transformer 81 to power supply 74 which provides power to various components of 25c. Power from 81 is also coupled to frequency measurement circuit 90 which provides power frequency information to microprocessor 37. A user input 92 accommodates user inputs to micro 37 with 37 providing information to the user via display 91. A timebase 93 provides timing information to micro 37. An optional load monitor 23 provides information for the load to a current measurement circuit 95 which in turn provides this load parameter to the micro 37. The micro 37 operates via a switch/limit driver circuit 94 to control the coupling of AC power from power source 142 to the load via a load module.

FIG. 31 shows a load control 25c for use with an individual load. It utilizes many of the same elements as used in FIGS. 27, 29 and 30 and may also have a load sensor 23 to sense and send power consumed by the load via a communications link to the micro 37. The load sensor may be utilized to generate load parameters e.g. such as maximum long term load current, starting current and whether the load is presently turned on. If 23 is not utilized, load parameters will need to be provided to 25c by an operator, installer programming or otherwise. Determining if the load is on can be performed by the processor 37 storing the load control current (or last) control commands sent to the load module via driver 94 and communications link to the load module as a load parameter. It would also be possible to just turn off the load again which will ensure it is in the off state. The load control 25c will operate in response to the frequency of the power as determined by 90, as well as the amount of consumed power by the load, in order to reduce or eliminate power consumption by the load. As taught herein, it is preferred that the load control have a user input 92, a user display 91 and a timebase 93 facilitating timing measurements, in order to enter specific load related and load shedding information and/or data in order that the load may be handled as desired in response to power frequency indication of loading on the power source. It will be appreciated that 25c may be utilized, with or without load control, for monitoring to display on 91 load status and the timely AC output power as the percentage of full load, watts, amps or other desired quantity as a text, graphic or combinations thereof.

As compared to detecting the frequency of a rotating machinery power source, some of which can vary by several Hz with environmental changes, the present invention is capable of use with much smaller frequency changes. That in turn makes the accuracy of the reference oscillator (or other type frequency control) circuit 134 of FIGS. 29 and 30, as well as the accuracy of the timebase 93 of FIGS. 31 and 32, more critical for inverter generator than rotating machinery use. In order to lessen the requirements for accuracy and attendant costs of 134 and 93 a larger range of frequencies than that previously mentioned here can be used. However, it is preferred that 93 include circuitry to calibrate the timebase to the standard frequency (e.g. 60 Hz) being used. For example, if the power frequency is intended to be 60 Hz with no load, but is instead measured as 60.3 Hz because of inaccuracies in 134 and/or 93, circuitry to take that variation into account will be desirable. This can be done by periodic testing to compare the no load frequency to the desired frequency and storing a correction factor for microprocessor 37 to use in its operations, or in the case of the frequency set of FIG. 30 by keeping a running (recursive) average of the highest measured frequency during operations and using that as a correction factor. Correction of the frequency reference utilized in 133 or 134 can also be utilized, and in instances where very tight frequency tolerances are desired, measurement and correction against an external frequency reference, e.g. WWV, WWVB, WWVH or GPS standard 10 MHz can be utilized, the latter being particularly applicable to vehicle use of the invention. Other circuitry and methods of ensuring proper frequency calibration and/or correction may be utilized as well.

Figure 32:
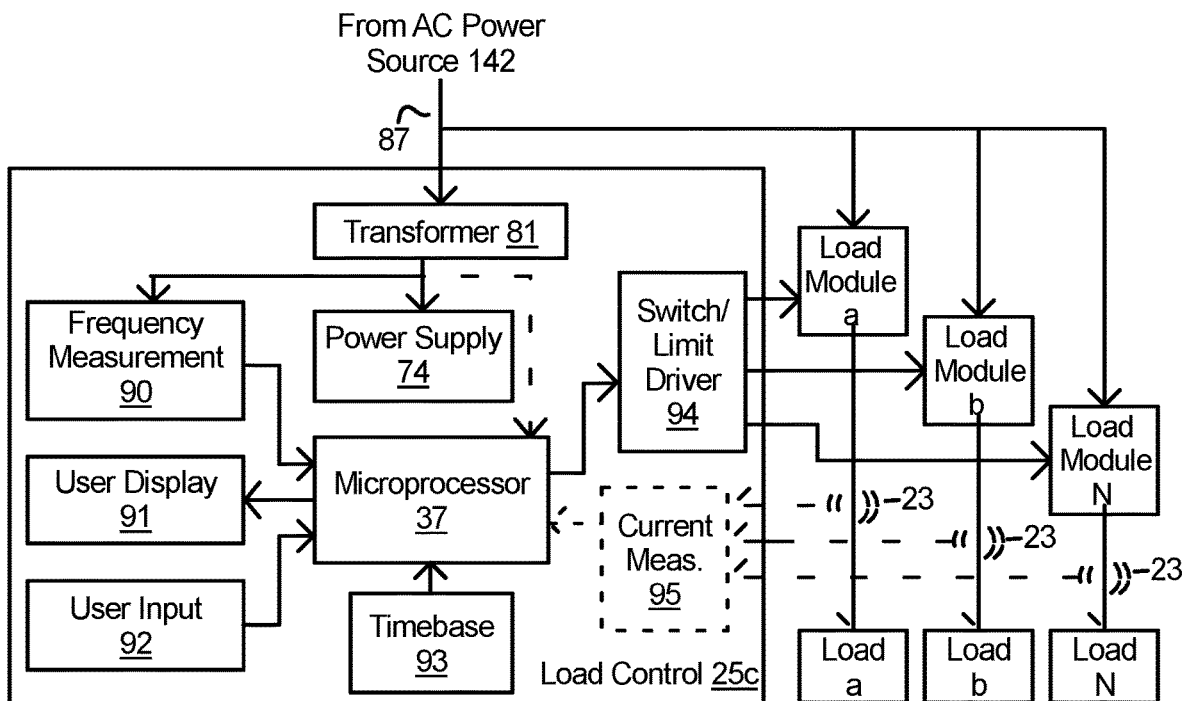
FIG. 32 shows a load control 25c similar to that of FIG. 18, receiving AC Power from 142, which is coupled via transformer 81 to power supply 74 which provides power to various components of 25c. Power from 81 is also coupled to frequency measurement circuit 90 which provides power frequency information to microprocessor 37. A user input 92 accommodates user inputs to micro 37 with 37 providing information to the user via display 91. A timebase 93 provides timing information to micro 37. A plurality of optional load monitors 23 provide load parameters for a plurality of loads to a current measurement circuit 95 which in turn provides load parameters to the micro 37. The micro 37 operates via a switch/limit driver circuit 94 to control the coupling of AC power from power source 142 to the plurality of loads via respective ones of a plurality of load modules.

FIG. 32 shows a load control 25c similar to that in FIG. 31, but having a switch/limit driver 94 and current measurement 95 modified to accommodate and control a plurality of loads a-N. As with that in FIG. 31, the load control 25c will operate in response to the frequency of the power as determined by 90 as well as the amount of consumed power for each load a-N in order to reduce or eliminate power consumption by the respective load as taught herein. It is also preferred that the load control have a user input 92, a user display 91 in order to enter specific load related and load shedding information and/or data for each of the loads in order that the corresponding load may be handled as desired in response to the power frequency indication of loading on the power source. FIG. 32 also includes timebase 93 facilitating timing measurements as discussed elsewhere herein.

Figure 33:
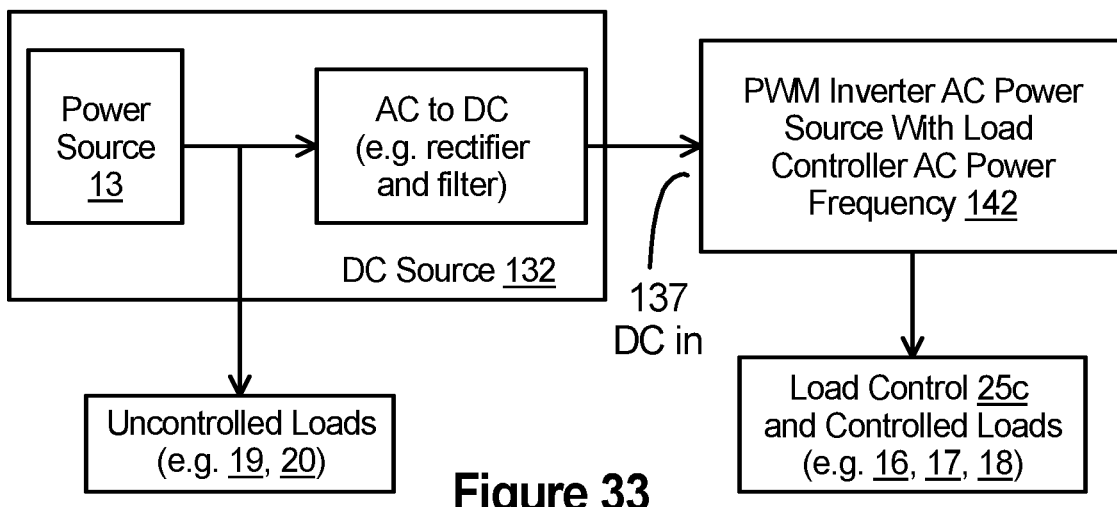
FIG. 33 shows a PWM inverter AC power source with load controller AC power frequency 142 as used in a system having a DC power source 132 comprising a power source 13 operating via an AC to DC power conversion circuit with DC power for 142 being output from 137. The power source 13 also directly powers uncontrolled loads e.g. 19 and/or 20 and load control 25c controls various loads, e.g. 16, 17 and/or 18.

FIG. 33 shows a system diagram demonstrating a particular DC source 132 which consists of an AC power source 13 operating at a standard power frequency and powering uncontrolled loads, for example such as 19 and/or 20. The power source 13 also includes an AC to DC converter 132 with the DC power being supplied to the input 137 of DC to AC inverter 142. The AC power from 142 is coupled to a load control 25c (or alternatively 25e) which controls power to controlled loads 16, 17 and/or 18. Inverter 142 can be sized smaller than if all loads were powered by it. High priority large load such as medical devices, heating and cooling for perishable goods, etc. when power source 13 is a backup source. Appropriate transfer switch(es) such as those in FIGS. 19-23 may be needed. In this embodiment, the monitoring of output power may include all power supplied from and operating conditions for power soured 13, or it may only include power supplied by and operating conditions of the AC to DC inverter of 132, or it may only include power supplied by and operating conditions of the inverter of 142 or combinations thereof, depending on which portion or portions of 132 and 142 are desired to be protected by management of the loads.

Although this invention has been described in its preferred embodiment with a certain degree of particularity, with specific advantages and various embodiments it is understood that the invention is not so limited and the present disclosure of the preferred embodiment with its various benefits, features and capabilities has been made by way of example and other technical advantages will become apparent to one of ordinary skill after review of the Figures and description. The several exemplary simplifications and operational related drawings and written descriptions of exemplary embodiments of the invention used herein are not to be considered limiting of the invention as will be known to the person of ordinary skill. The principles and inventive concepts of the present disclosure may be implemented using any number of techniques, whether currently known or which may later become known.

Numerous changes in the details of construction and the combination and arrangement of parts including some or all of the enumerated advantages may be resorted to and components arranged separately or integrated together as well as performing steps in any suitable sequence in order to meet a particular level of performance, reliability and cost without departing from the spirit and the scope of the invention as hereinafter claimed.

To aid the Patent Office and readers the patent(s) issued based on this application in interpreting the claims appended hereto, applicant wishes to note that he does not intend any of the appended claims or claim elements to invoke 35 U.S.C. 112(f) unless the words "means for" or "step for" are explicitly used in the particular claim.

The invention claimed is:

1. A method of operating an AC power system, the method comprising steps of:
  a) coupling DC power stored in a battery in a vehicle to an inverter circuit which is located in the vehicle, coupling the inverter circuit to the AC power system, and controlling the inverter circuit to provide output power having a controlled standard AC frequency to the AC power system to power one or more loads not located in the vehicle;
  b) when the vehicle is coupled to the AC power system and AC power from an AC source is available and of acceptable quality, coupling the input of a battery charger located in the vehicle to the AC power system and drawing an amount of the AC power from the AC source, which is controlled to not exceed a known maximum amount, to charge the battery;
  c) during or after charging the battery in step b), measuring an amount of output power from the inverter circuit while supplying the one or more loads, comparing the measured amount of output power with a threshold value, wherein the threshold value is a maximum output power of the inverter circuit or a known offset from the maximum output power of the inverter circuit,
    controlling the inverter circuit output power to be the controlled standard AC frequency when the measured amount of output power is less than the threshold value, and
    controlling the inverter circuit output power to be a known different frequency when the measured amount of output power is greater than the threshold value.

2. The method of claim 1 wherein the steps are performed by one or more microprocessors executing a program stored in a non-transitory digital memory.

3. The method of claim 1 wherein the AC power source is a power grid.

4. The method of claim 1 wherein the AC power source is not a utility power grid.

5. The method of claim 1 wherein the AC power source is a solar panel system which is not part of a utility power grid.

6. The method of claim 1 wherein the AC power source is a wind turbine system which is not part of a utility power grid.

7. The method of claim 1 wherein the AC power source is an internal combustion power source which is not part of a utility power grid.

8. The method of claim 1 wherein the AC power source is an engine driven generator which is not part of a utility power grid.

9. The method of claim 1 wherein the AC power source comprises one or more of a solar panel system, an internal combustion power source, and an engine driven generator which are not part of a utility power grid.

10. The method of claim 1 wherein the AC power source is a power grid, and when the vehicle is coupled to the AC power system and grid power from the power grid, which is normally provided at the controlled standard AC frequency to the one or more loads when the grid power is available and of acceptable quality, is not of suitable quality or is not available, controlling the inverter circuit to provide output power having the controlled standard AC frequency of the power grid to power the one or more loads.

11. The method of claim 1 wherein the known different frequency is lower than the standard AC frequency.

12. The method of claim 1 wherein the threshold value is the known offset less than the maximum output power of the inverter circuit that can be provided without being overloaded.

13. The method of claim 12 further comprising, in response to detecting the known different frequency, controlling a given load of the one or more loads to reduce or stop power drawn from the inverter circuit to the given load.

14. The method of claim 1 wherein the threshold value is the maximum output power of the inverter circuit or the known offset greater than the maximum output power of the inverter circuit that can be continuously provided without being overloaded.

15. The method of claim 14 further comprising, in response to detecting the known different frequency, controlling a given load of the one or more loads to reduce or stop power drawn from the inverter circuit to the given load.

16. The method of claim 1 further comprising, in response to detecting the known different frequency, controlling a given load of the one or more loads to reduce or stop power drawn from the inverter circuit to the given load.

17. The method of claim 1 further comprising selectively determining to provide a given load of the one or more loads with output power from the inverter circuit based on measurements of the timely amount of output power being provided to other loads of the one or more loads by the inverter circuit as well as the maximum output power of the inverter circuit.

18. The method of claim 1 wherein the inverter circuit and the battery charger are combined into one instrument located in the vehicle and controlled to either receive the AC power from the AC power source to charge the battery or receive DC power from the battery and provide the output power of the inverter circuit to the AC power system.

19. The method of claim 1 wherein the inverter circuit and the battery charger are combined into one instrument located in the vehicle and controlled to either receive the AC power from the AC power source to charge the battery or receive DC power from the battery and provide the output power of the inverter circuit to the AC power system, wherein the instrument has a first set of contacts which receives the AC power from the AC power source when the instrument is controlled to charge the battery and a second set of contacts which connect to the battery to output DC power to the battery, and when the instrument is controlled to operate as an inverter, the instrument receives DC power from the battery via the second set of contacts and provides output power to the one or more loads via the first set of contacts.

20. A method of operating an AC power system, the method comprising steps of:
a) coupling DC power stored in a battery which is utilized in a vehicle, which is an electric or hybrid vehicle, to an inverter circuit coupled to the AC power system, and controlling the inverter circuit to provide output power having a controlled known AC frequency to the AC power system to power one or more loads not located in the vehicle;
b) when the vehicle is coupled to the AC power system and AC power from an AC power source is available and of acceptable quality, coupling the input of a battery charger located in the vehicle to the AC power system and drawing an amount of the AC power from the AC power source, which is controlled to not exceed a known maximum amount, to charge the battery;
c) during or after charging the battery in step b), measuring an amount of output power from the inverter circuit while supplying the one or more loads, comparing the measured amount of output power with a threshold value, wherein the threshold value is a maximum output power of the inverter circuit or a known offset from the maximum output power of the inverter circuit, controlling the inverter circuit output power to be the controlled standard AC frequency when the measured amount of output power is less than the threshold value, and controlling the inverter circuit output power to be a known different frequency when the measured amount of output power is greater than the threshold value.

21. The method of claim 20 wherein the steps are performed by one or more microprocessors executing a program stored in a non-transitory digital memory.

22. The method of claim 20 wherein the AC power source is a power grid.

23. The method of claim 20 wherein the AC power source is not a utility power grid.

24. The method of claim 20 wherein the AC power source is a solar panel system which is not part of a utility power grid.

25. The method of claim 20 wherein the AC power source is a wind turbine system which is not part of a utility power grid.

26. The method of claim 20 wherein the AC power source is an internal combustion power source which is not part of a utility power grid.

27. The method of claim 20 wherein the AC power source is an engine driven generator which is not part of a utility power grid.

28. The method of claim 20 wherein the AC power source comprises one or more of a solar panel system, an internal combustion power source, and an engine driven generator which are not part of a utility power grid.

29. The method of claim 20 wherein the AC power source is a power grid, and when the vehicle is coupled to the AC power system and grid power from the power grid, which is normally provided at the controlled standard AC frequency to the one or more loads when the grid power is available and of acceptable quality, is not of suitable quality or is not available, controlling the inverter circuit to provide output power having the controlled standard AC frequency of the power grid to power the one or more loads.

30. The method of claim 20 wherein the known different frequency is lower than the standard AC frequency.

31. The method of claim 20 wherein the threshold value is the known offset less than the maximum output power of the inverter circuit that can be provided without being overloaded.

32. The method of claim 31 further comprising, in response to detecting the known different frequency, controlling a given load of the one or more loads to reduce or stop power drawn from the inverter circuit to the given load.

33. The method of claim 20 wherein the threshold value is the maximum output power of the inverter circuit or the known offset greater than the maximum output power of the inverter circuit that can be continuously provided without being overloaded.

34. The method of claim 33 further comprising, in response to detecting the known different frequency, controlling a given load of the one or more loads to reduce or stop power drawn from the inverter circuit to the given load.

35. The method of claim 20 further comprising, in response to detecting the known different frequency, controlling a given load of the one or more loads to reduce or stop power drawn from the inverter circuit to the given load.

36. The method of claim 20 further comprising selectively determining to provide a given load of the one or more loads with output power from the inverter circuit based on measurements of the timely amount of output power being provided to other loads of the one or more loads by the inverter circuit as well as the maximum output power of the inverter circuit.

37. The method of claim 20 wherein the inverter circuit and the battery charger are combined into one instrument located in the vehicle and controlled to either receive the AC power from the AC power source to charge the battery or receive DC power from the battery and provide the output power of the inverter circuit to the AC power system.

38. The method of claim 20 wherein the inverter circuit and the battery charger are combined into one instrument located in the vehicle and controlled to either receive the AC power from the AC power source to charge the battery or receive DC power from the battery and provide the output power of the inverter circuit to the AC power system, wherein the instrument has a first set of contacts which receives the AC power from the AC power source when the instrument is controlled to charge the battery and a second set of contacts which connect to the battery to output DC power to the battery, and when the instrument is controlled to operate as an inverter, the instrument receives DC power from the battery via the second set of contacts and provides output power to the one or more loads via the first set of contacts.

39. A method of operating a vehicle AC power system, the method comprising steps of:
   a) coupling DC power stored in a battery of an electric or hybrid vehicle to an inverter circuit coupled to an AC power system, and when the battery has at least a predetermined sufficient charge, controlling the inverter circuit to provide output power having a controlled standard AC frequency of a power grid to the AC power system to power to one or more loads not located in the vehicle;
   b) when the vehicle is coupled to the AC power system and grid power from the power grid is available and of acceptable quality, coupling the input of a battery charger to the AC power system to receive the grid power and controlling the battery charger to charge the battery;
   c) when the vehicle is coupled to the AC power system and the grid power is available and of acceptable quality, controlling the output power supplied by the inverter circuit to have the standard AC frequency which is synchronized to the frequency of the grid power, and providing the output power of the inverter circuit to the one or more loads;
   d) further controlling the inverter circuit to send output power into the power grid when an available output power of the inverter circuit exceeds an amount of power necessary to power the one or more loads while preventing and/or mitigating overloading the inverter circuit;
   e) measuring an amount of output power from the inverter circuit while supplying the one or more loads, comparing the measured amount of output power with a threshold value, wherein the threshold value is a maximum output power of the inverter circuit or a known offset from the maximum output power of the inverter circuit,
      controlling the inverter circuit output power to be the controlled standard AC frequency when the measured amount of output power is less than the threshold value, and
      controlling the inverter circuit output power to be a known different frequency when the measured amount of output power is greater than the threshold value.

40. The method of claim 39 further including the steps of:
f) when the grid power is not available, decoupling the AC power system from the power grid thereby leaving the output power of the inverter circuit available for powering the one or more loads.

41. The method of claim 39 further including the steps of:
f) when the grid power is not available, decoupling the AC power system from the grid thereby leaving the output power of the inverter circuit available for powering the one or more loads and controlling coupling of power to, or a controlled amount of power to, a given load of the one or more loads to prevent and/or mitigate overloading of the inverter circuit.

42. The method of claim 39 wherein step c) further includes coupling of the output power of the inverter circuit to the output of a transfer switch which the one or more loads are also coupled to, and when the grid power is available and of acceptable quality, controlling the transfer switch to couple the grid power to the transfer switch output.

43. The method of claim 42 wherein the transfer switch has a first input coupled to the power grid and a second input coupled to the inverter circuit and when the grid power is available and of suitable quality, controlling the transfer switch to select the first input to couple the grid power to the transfer switch output and when the grid power is not available or not of acceptable quality, controlling the transfer switch to select the second input to couple the inverter circuit output power to the transfer switch output.

44. The method of claim 39 wherein step c) further includes coupling the output power of the inverter circuit to the output of a transfer switch which the one or more loads are also coupled to, and when the grid power is available and of acceptable quality, controlling the transfer switch to couple the grid power to the transfer switch output, and in step d) controlling the inverter circuit to provide more output power than the one or more loads are consuming thereby providing extra output power which is sent into the power grid.

45. The method of claim 44 wherein the transfer switch has a first input coupled to the power grid and a second input coupled to the inverter circuit and when the grid power is available and of suitable quality, controlling the transfer switch to select the first input to couple the grid power to the transfer switch output and when the grid power is not available or not of acceptable quality, controlling the transfer switch to select the second input to the transfer switch to couple the inverter circuit output power to the transfer switch output.

46. The method as in claim 39 wherein the inverter circuit and the battery charger are combined into one instrument and controlled to either receive the grid power to charge the battery or receive the DC power from the battery and provide the output power of the inverter circuit.

47. The method as in claim 39 wherein the inverter circuit and the battery charger are combined into one instrument and controlled to either receive the grid power to charge the battery when the battery has insufficient charge or receive the DC power from the battery and provide the output power of the inverter circuit when the battery has sufficient charge, with the instrument having a first set of contacts which are coupled to the AC power system and a second set of contacts which connect to the battery, and when the instrument is controlled to charge the battery the instrument is further controlled to receive the grid power via the first set of contacts and output DC power to the battery via the second set of contacts, and when the instrument is controlled to operate as an inverter, the instrument is further controlled to receive the DC power from the battery via the second set of contacts and provide output power via the first set of contacts.

48. The method as in claim 39 wherein the steps are executed via a single or multiple microprocessors operating to communicate with the battery and inverter circuit via a wired communications network, and in step a) the charge on the battery is monitored to ensure predetermined sufficient charge is available for driving the vehicle.

49. The method of claim 39 wherein in step a) discharge of the battery to provide the DC power stored therein to power the inverter circuit is controlled to take into account an amount of power needed for driving the vehicle.

50. The method of claim 39 wherein in step a) discharge of the battery to provide the DC power stored therein to power the inverter circuit is controlled to take into account a timing and amount of power needed for driving the vehicle.

51. The method of claim 39 wherein the vehicle includes a generator for charging the battery and wherein step a) further comprises charging of the battery from the generator controlled to take into account a timing and an amount of power needed for driving the vehicle, and in step b) the charging of the battery with grid power is controlled to take into account the timing and the amount of power needed for driving the vehicle.

52. The method of claim 39 wherein in step b) the charging of the battery is controlled to take into account a timing and an amount of battery power needed for driving the vehicle.

53. The method of claim 39 wherein in step b) the charging of the battery is controlled to take into account an amount of battery power needed to be stored for the inverter circuit in the event of grid power outages of the power grid.

54. The method of claim 39 wherein the vehicle includes an operating system and management of the battery, battery charger and inverter circuit is controlled at least in part by the operating system.

55. The method of claim 39 wherein the vehicle includes an operating system and management of the battery, battery charger and inverter circuit is controlled at least in part by the operating system via a communications network of the operating system.

56. The method of claim 39 wherein the vehicle includes an operating system and management of the battery, battery charger and inverter circuit is responsive to the operating system.

57. The method of claim 39 wherein the vehicle is utilized for backup power in a home and control of the backup power operation is combined with a home operating system of the home.

58. The method of claim 39 wherein the vehicle is utilized for backup power in a home and the control of the backup power operation is responsive to a home operating system of the home.

59. A method of operating a vehicle AC power system, the method comprising steps of:
a) when the vehicle which is a hybrid or electric vehicle is coupled to an AC power system and no grid power from a power grid is available, operating an inverter type power source which is installed in the vehicle to receive stored DC power from a vehicle battery when the vehicle battery has a predetermined sufficient amount of charge, to provide AC power having a controlled standard frequency to the AC power system to power one or more loads not located in the vehicle;
b) when the vehicle is coupled to the AC power system and the grid power is available and of acceptable quality, controlling a battery charger to charge the vehicle battery using the grid power;
c) when the vehicle is coupled to the AC power system and the grid power is available and of acceptable quality, controlling the inverter type power source to receive DC power from the vehicle battery and provide power to the one or more loads in parallel with the power grid or without supplying power from the power grid to reduce consumption of the grid power;
d) when the vehicle is coupled to the AC power system where the grid power is normally available, and the grid power fails or is not of acceptable quality, disconnecting, if not already disconnected, the grid from the AC power system, provide output power from the inverter type power source to at least one of the one or more loads, measuring an amount of output power from the inverter type power source while supplying the at least one of the one or more loads, comparing the measured amount of output power with a threshold value, wherein the threshold value is a maximum output power of the inverter type power source or a known offset from the maximum output power of the inverter type power source,
controlling the inverter type power source output power to be the controlled standard AC frequency when the measured amount of output power is less than the threshold value, and
controlling the inverter type power source output power to be a known different frequency when the measured amount of output power is greater than the threshold value.

60. The method of claim 59 wherein the one or more loads include at least one load which is connected to the inverter type power source via plugging the load into an electrical outlet.

61. The method of claim 59 wherein the predetermined sufficient amount of charge is based on an amount of power needed to be available to drive the vehicle.

62. The method of claim 59 wherein the inverter type power source and the battery charger are combined into one instrument and controlled to either receive the grid power to charge the battery or receive the stored DC power and provide the AC power of the inverter type power source.

63. The method of claim 59 wherein the inverter type power source and the battery charger are combined into one instrument and controlled to either receive the grid power to charge the battery when the battery does not have the predetermined sufficient amount of charge, or controlled to receive the stored DC power and provide the AC power of the inverter type power source when the battery has the predetermined sufficient amount of charge, with the instrument having a first set of contacts which are coupled to the AC power system when the grid power is available and a second set of contacts which connect to the battery and when the instrument is charging the battery, the instrument is further controlled to receive the grid power via the first set of contacts and output DC power to the battery via the second set of contacts, and when the instrument is controlled to operate as an inverter, the instrument is further controlled to receive the stored DC power via the second set of contacts and provide the AC power of the inverter type power source via the first set of contacts.

64. The method of claim 59 including the further step: e) after the power grid has been disconnected in step d), controlling a load module to selectively disconnect or reduce the power supplied to at least one of the one or more loads to mitigate an actual and/or potential overload of the inverter type power source.

65. The method of claim 59 including the further step: e) after the power grid has been disconnected in step d), controlling a load module to selectively disconnect or reduce the power supplied to at least one of the one or more loads to permit a different one of the one or more loads to be powered by the inverter type power source without an actual and/or potential overload.

66. The method of claim 59 including the further step: e) disconnecting one of the one or more loads from the inverter type power source while leaving already powered other ones of the one or more loads connected in response to monitoring of the inverter type power source indicating an actual and/or potential one or more of: overheating of the inverter type power source, an electrical overload of the inverter type power source, a departure from specifications of the AC power provided by the inverter type power source for longer than a known time period, a loss of AC power provided by the inverter type power source, excessive heating of the inverter type power source, or damage to the inverter type power source.

67. The method of claim 59 wherein the vehicle includes a generator for charging the battery and wherein step a) further includes charging of the battery from the generator when the battery is below the predetermined sufficient amount of charge.

68. The method of claim 59 wherein in step b) the charging is controlled to take into account a timing and an amount of stored DC power needed for driving the vehicle.

69. The method of claim 59 wherein in step b) the charging is controlled to take into account an amount of stored DC power needed for the inverter type power source in the event of grid power outages.

70. The method of claim 59 wherein the vehicle includes an operating system and management of the battery charger and the inverter type power source is controlled at least in part by the operating system.

71. The method of claim 59 wherein the vehicle includes an operating system and management of a charge level of the battery is controlled at least in part by the operating system.

72. The method of claim 59 wherein the vehicle includes an operating system and management of the battery charger and the inverter type power source is responsive to the operating system.

73. The method of claim 59 wherein the stored DC power is utilized for backup power in a home and the management of backup power operation is combined with a home operating system of the home.

74. The method of claim 59 wherein the stored DC power is utilized for backup power in a home and the control of backup power operation is responsive to a home operating system of the home.

75. A method of controlling a battery of a hybrid or electric vehicle the method including the steps of:
  a) controlling a battery charger to utilize grid power from a service connection connected to a power grid, to charge the battery to a predetermined known level based on a detected charge level of the battery;
  b) coupling stored DC power from the battery to a DC to AC type inverter coupled to an AC power system and controlling the AC power output of the inverter to provide AC power to the AC power system in parallel with the grid power to supply a plurality of loads connected to the AC power system and the service connection, to at least partially power the plurality of loads from the inverter;
  c) in response to a loss of the grid power from the power grid, disconnecting the power grid from the AC power system and powering at least part of the plurality of loads with AC power from the inverter;
  d) managing one or more of the plurality of loads while being powered by the inverter to prevent or alleviate a potential or actual overload of the inverter; and
  e) measuring an amount of output power from the inverter while powering at least part of the plurality of loads, comparing the measured amount of output power with a threshold value, wherein the threshold value is a maximum output power of the inverter or a known offset from the maximum output power of the inverter, controlling the inverter output power to be a controlled standard AC frequency when the measured amount of output power is less than the threshold value, and controlling the inverter output power to be a known different frequency when the measured amount of output power is greater than the threshold value.

76. The method of claim 75 wherein in step d) the managing one or more of the plurality of loads is performed by coupling and uncoupling individual ones of the plurality of loads from the inverter in response to the timely amount of AC power being output by the inverter.

77. The method of claim 76 wherein before a given load is coupled to receive AC power from the inverter a determination is made, in response to the timely amount of AC power being output by the inverter, of whether or not the given load can be coupled without overloading the inverter.

78. The method of claim 77 wherein when the given load can be coupled to receive AC power from the inverter without overloading the inverter, the coupling is done.

79. The method of claim 77 wherein when the given load cannot be coupled to receive AC power from the inverter without overloading the inverter, the coupling is not done.

80. The method of claim 77 wherein when the given load cannot be coupled to receive AC power from the inverter without overloading the inverter, a different load of the plurality of loads is first decoupled from the inverter to cause sufficient inverter power to be available for the given load, followed by coupling of the given load to the inverter.

81. The method of claim 75 wherein in step d) selective coupling of a given load of the plurality of loads to the inverter is responsive to the frequency of the AC power which is output from the inverter such that the coupling is prevented in order to prevent an overload or potential overload of the inverter.

82. The method of claim 75 wherein in step d) selective coupling of a given load of the plurality of loads to the inverter is responsive to the frequency of the AC power which is output from the inverter such that the coupling is made when the inverter has sufficient power available to power the given load without an overload of the inverter.

\* \* \* \* \*